United States Patent
Sahraei et al.

(10) Patent No.: US 11,611,379 B2
(45) Date of Patent: Mar. 21, 2023

(54) PRECODING TECHNIQUES FOR WIRELESS COMMUNICATIONS

(71) Applicant: QUALCOMM Incorporated, San Diego, CA (US)

(72) Inventors: Saeid Sahraei, San Diego, CA (US); Gokul Sridharan, Sunnyvale, CA (US); Shimman Arvind Patel, San Diego, CA (US); Krishna Kiran Mukkavilli, San Diego, CA (US); June Namgoong, San Diego, CA (US); Taesang Yoo, San Diego, CA (US); Renqiu Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/246,374

(22) Filed: Apr. 30, 2021

(65) Prior Publication Data

US 2021/0359731 A1    Nov. 18, 2021

Related U.S. Application Data

(60) Provisional application No. 63/023,982, filed on May 13, 2020.

(51) Int. Cl.
*H04B 7/04* (2017.01)
*H04B 7/0456* (2017.01)
*H04W 72/14* (2009.01)
*H04B 7/06* (2006.01)

(52) U.S. Cl.
CPC ........ *H04B 7/0465* (2013.01); *H04B 7/0634* (2013.01); *H04W 72/14* (2013.01)

(58) Field of Classification Search
CPC .. H04B 7/0465; H04B 7/0634; H04B 7/0456; H04B 7/0426; H04W 72/14; Y02D 30/70
See application file for complete search history.

(56) References Cited

U.S. PATENT DOCUMENTS

| 2013/0058296 | A1* | 3/2013 | Jitsukawa | H04L 5/0044 370/329 |
| 2014/0010197 | A1* | 1/2014 | Wang | H04B 7/0617 370/329 |
| 2018/0102819 | A1* | 4/2018 | Nishimoto | H04B 7/0456 |

* cited by examiner

*Primary Examiner* — Hashim S Bhatti
(74) *Attorney, Agent, or Firm* — Holland & Hart LLP

(57) ABSTRACT

Methods, systems, and devices for wireless communications are described in which a base station may identify a null space matrix that lies within a null space of an effective channel matrix for communications between the base station and a user equipment (UE). An indication of the null space matrix may be provided to the UE, and the null space matrix used to determine modifications to a precoding matrix. The base station and UE may determine a redistribution matrix that provides a reduced variance of transmission powers for a number of transmission channels, where a product of the null space matrix and the redistribution matrix may be computed and added to the precoding matrix to generate a modified precoding matrix. The modified precoding matrix may be used to generate the communications from the base station and UE with reduced power variance across channels.

30 Claims, 27 Drawing Sheets

- ▓ DL Transmission(s) 215
- ▨ Precoding & Null Space Indication 220
- ▒ UL Transmission(s) 225

US 11,611,379 B2

PRECODING TECHNIQUES FOR WIRELESS COMMUNICATIONS

CROSS REFERENCE

The present Application for Patent claims the benefit of U.S. Provisional Patent Application No. 63/023,982 by SAHRAEI et al., entitled "PRECODING TECHNIQUES FOR WIRELESS COMMUNICATIONS," filed May 13, 2020, assigned to the assignee hereof, and expressly incorporated by reference herein.

FIELD OF TECHNOLOGY

The following relates generally to wireless communications and more specifically to precoding techniques for wireless communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some cases, base stations and UEs may use multiple antenna elements for communications in what may be referred to as multiple-input multiple-output (MIMO) communications. Such multiple antenna elements may allow for transmission of signals using different antenna elements that can have different amounts of amplification and phase shifts to provide for signal beamforming. Such techniques may enhance the resultant transmission to provide for a higher likelihood of reception at a receiving device. In some cases, a transmitting device, such as a base station or a UE, may use a precoding matrix to determine parameters for signal transmissions via multiple antenna elements. In some cases, a base station may provide an indication of a precoding matrix that is to be used at a UE for uplink transmissions from the UE to the base station. Efficient techniques for identifying and transmitting communications based on indicated precoding matrices may be desirable in order to further enhance MIMO communications.

SUMMARY

The described techniques relate to improved methods, systems, devices, and apparatuses that support precoding techniques for wireless communications. In accordance with various aspects, a base station may identify a precoding matrix for communications with a user equipment (UE), and modify the precoding matrix to provide for enhanced transmission powers for communications. In some cases, the base station may identify a null space matrix that lies within a null space of an effective channel matrix for communications between the base station and the UE. The base station may determine a redistribution matrix that provides a reduced variance of transmission powers for a number of transmission channels, and a product of the null space matrix and the redistribution matrix may be added to the precoding matrix to generate a modified precoding matrix that has reduced power variance at the number of transmission channels. The modified precoding matrix may be used to generate the communication to the UE.

In some cases, the base station may identify the null space matrix, and provide an indication of the null space matrix to one or more UEs that are in communication with the base station. Each of the one or more UEs may determine a redistribution matrix that provides a reduced variance of channel transmission powers at the UE, and compute a product of the null space matrix and the redistribution matrix, which may be added to an indicated precoding matrix for use in an uplink communication from the UE to the base station. Such techniques may allow for relatively efficient power amplifier usage at the UEs and base station, such that one or more power amplifiers avoid non-linear operation while also operating at a relatively high level of amplification.

A method of wireless communications at a UE is described. The method may include receiving, from a base station, an uplink grant that indicates a precoding matrix and a null space matrix associated with a channel between the UE and the base station, determining, based on the precoding matrix and the null space matrix, a redistribution matrix for redistribution of transmission power of an uplink communication associated with the uplink grant across a set of transmit chains of the UE, adding a product of the null space matrix and the redistribution matrix to the precoding matrix to generate a modified precoding matrix, and applying the modified precoding matrix to the set of transmit chains for uplink transmission of the uplink communication to the base station.

An apparatus for wireless communications at a UE is described. The apparatus may include a processor, memory coupled with the processor, and instructions stored in the memory. The instructions may be executable by the processor to cause the apparatus to receive, from a base station, an uplink grant that indicates a precoding matrix and a null space matrix associated with a channel between the UE and the base station, determine, based on the precoding matrix and the null space matrix, a redistribution matrix for redistribution of transmission power of an uplink communication associated with the uplink grant across a set of transmit chains of the UE, add a product of the null space matrix and the redistribution matrix to the precoding matrix to generate a modified precoding matrix, and apply the modified precoding matrix to the set of transmit chains for uplink transmission of the uplink communication to the base station.

Another apparatus for wireless communications at a UE is described. The apparatus may include means for receiving, from a base station, an uplink grant that indicates a precoding matrix and a null space matrix associated with a channel between the UE and the base station, determining, based on the precoding matrix and the null space matrix, a redistribution matrix for redistribution of transmission power of an uplink communication associated with the uplink grant across a set of transmit chains of the UE, adding a product of the null space matrix and the redistribution matrix to the precoding matrix to generate a modified precoding matrix, and applying the modified precoding matrix to the set of transmit chains for uplink transmission of the uplink communication to the base station.

A non-transitory computer-readable medium storing code for wireless communications at a UE is described. The code may include instructions executable by a processor to receive, from a base station, an uplink grant that indicates a precoding matrix and a null space matrix associated with a channel between the UE and the base station, determine, based on the precoding matrix and the null space matrix, a redistribution matrix for redistribution of transmission power of an uplink communication associated with the uplink grant across a set of transmit chains of the UE, add a product of the null space matrix and the redistribution matrix to the precoding matrix to generate a modified precoding matrix, and apply the modified precoding matrix to the set of transmit chains for uplink transmission of the uplink communication to the base station.

In some examples of the method, apparatuses, and non-transitory computer-readable medium described herein, the redistribution matrix provides reduced power variance across the set of transmit chains relative to a power variance based only on the precoding matrix. Some examples of the method, apparatuses, and non-transitory computer-readable medium described herein may further include operations, features, means, or instructions for identifying a precoding matrix codebook associated with the indication of the precoding matrix, and a null space matrix codebook associated with the indication of the null space matrix.

Some examples of the method, apparatuses, and non-transitory computer-readable medium described herein may further include operations, features, means, or instructions for receiving, from the base station, configuration information for performing power redistribution based on the null space matrix indication. In some examples of the method, apparatuses, and non-transitory computer-readable medium described herein, the configuration information may be received in RRC signaling that configures the precoding matrix codebook and the null space matrix codebook.

In some examples of the method, apparatuses, and non-transitory computer-readable medium described herein, the determining further may include operations, features, means, or instructions for performing an iterative algorithm to generate the redistribution matrix. In some examples of the method, apparatuses, and non-transitory computer-readable medium described herein, the performing the iterative algorithm may include operations, features, means, or instructions for normalizing each row of a set of rows of the precoding matrix to generate a set of normalized rows, adjusting each row of the precoding matrix based on a difference between the corresponding row of the precoding matrix and the associated normalized row to generate a set of adjusted rows, evaluating a vector norm for each row of the set of adjusted row to determine if a variance of the vector norms is within a threshold variance value, and repeating, based on the variance of the vector norms being greater than the threshold variance value, the normalizing, adjusting, and evaluating.

In some examples of the method, apparatuses, and non-transitory computer-readable medium described herein, the null space matrix lies within a null space of an effective channel matrix associated with an estimated effective channel between the base station and the UE. In some examples of the method, apparatuses, and non-transitory computer-readable medium described herein, the modified precoding matrix provides uplink transmissions that are indistinguishable at the base station from an unmodified precoding matrix. Some examples of the method, apparatuses, and non-transitory computer-readable medium described herein may further include operations, features, means, or instructions for receiving, from the base station, periodic updates to the null space matrix.

A method of wireless communications at a base station is described. The method may include determining, based on an estimated channel between the base station and a UE, a precoding matrix for communications with the UE and a null space matrix that represents a null space of the estimated channel, transmitting, to the UE, an uplink grant that includes a precoding matrix indication that identifies the precoding matrix and a null space matrix indication that identifies the null space matrix, and receiving an uplink communication from the UE responsive to the uplink grant.

An apparatus for wireless communications at a base station is described. The apparatus may include a processor, memory coupled with the processor, and instructions stored in the memory. The instructions may be executable by the processor to cause the apparatus to determine, based on an estimated channel between the base station and a UE, a precoding matrix for communications with the UE and a null space matrix that represents a null space of the estimated channel, transmit, to the UE, an uplink grant that includes a precoding matrix indication that identifies the precoding matrix and a null space matrix indication that identifies the null space matrix, and receive an uplink communication from the UE responsive to the uplink grant.

Another apparatus for wireless communications at a base station is described. The apparatus may include means for determining, based on an estimated channel between the base station and a UE, a precoding matrix for communications with the UE and a null space matrix that represents a null space of the estimated channel, transmitting, to the UE, an uplink grant that includes a precoding matrix indication that identifies the precoding matrix and a null space matrix indication that identifies the null space matrix, and receiving an uplink communication from the UE responsive to the uplink grant.

A non-transitory computer-readable medium storing code for wireless communications at a base station is described. The code may include instructions executable by a processor to determine, based on an estimated channel between the base station and a UE, a precoding matrix for communications with the UE and a null space matrix that represents a null space of the estimated channel, transmit, to the UE, an uplink grant that includes a precoding matrix indication that identifies the precoding matrix and a null space matrix indication that identifies the null space matrix, and receive an uplink communication from the UE responsive to the uplink grant.

In some examples of the method, apparatuses, and non-transitory computer-readable medium described herein, the null space matrix provides a null space within the estimated channel in which channel power at multiple antennas can be redistributed for the precoding matrix, which can be exploited to reshape transmission power across multiple transmission antennas through a modified precoding matrix. In some examples of the method, apparatuses, and non-transitory computer-readable medium described herein, the precoding matrix indication is mapped to a first codebook entry associated with the precoding matrix, and null space matrix indication is mapped to a second codebook entry associated with the null space matrix. Some examples of the method, apparatuses, and non-transitory computer-readable medium described herein may further include operations, features, means, or instructions for configuring the UE to perform a power redistribution procedure based on the null space matrix, where the power redistribution procedure reduces a power variance across a set of channels for the uplink communication relative to a power variance associated with the precoding matrix. In some examples of the method, apparatuses, and non-transitory computer-readable medium described herein, the configuring further may include operations, features, means, or instructions for transmitting, via RRC signaling configuration information for a precoding matrix codebook and a null space matrix codebook.

Some examples of the method, apparatuses, and non-transitory computer-readable medium described herein may further include operations, features, means, or instructions for determining, based on the precoding matrix and the null space matrix, a redistribution matrix that distributes transmission power of a downlink communication to the UE across a set of transmit chains of the base station, adding a product of the null space matrix and the redistribution matrix to the precoding matrix to generate a modified precoding matrix, and applying the modified precoding matrix to the set of transmit chains for downlink transmission of the downlink communication to the UE. In some examples of the method, apparatuses, and non-transitory computer-readable medium described herein, the determining the redistribution matrix may include operations, features, means, or instructions for performing an iterative algorithm to generate the redistribution matrix. In some examples of the method, apparatuses, and non-transitory computer-readable medium described herein, the performing the iterative algorithm may include operations, features, means, or instructions for normalizing each row of a set of rows of the precoding matrix to generate a set of normalized rows, adjusting each row of the precoding matrix based on a difference between the corresponding row of the precoding matrix and the associated normalized row to generate a set of adjusted rows, applying the set of adjusted rows to the null space matrix based on the estimated channel and a pseudo-inverse of the estimated channel to generate a new precoding matrix, evaluating a vector norm for each row of the new precoding matrix to determine if a variance of the vector norms is within a threshold variance value, and repeating, based on the variance of the vector norms being greater than the threshold variance value, the normalizing, adjusting, applying, and evaluating.

Some examples of the method, apparatuses, and non-transitory computer-readable medium described herein may further include operations, features, means, or instructions for determining, based on an updated estimated channel, an updated number of UEs that transmit communications, or any combinations thereof, an update to the null space matrix, and transmitting an updated null space matrix indication to the UE. In some examples of the method, apparatuses, and non-transitory computer-readable medium described herein, the updated null space matrix may be a sub-matrix with one or more fewer columns than the prior null space matrix based on one or more additional UEs that are to be served by the base station, or the updated null space matrix may be an expanded matrix with one or more additional columns than the prior null space matrix based on one or more fewer UEs that are to be served by the base station.

A method of wireless communications at a transmitting device is described. The method may include identifying an estimated channel matrix for a wireless communication with a receiving device, determining, based on the estimated channel matrix, an initial precoding matrix for the receiving device and a null space matrix for the receiving device, determining, based on the initial precoding matrix and the null space matrix, a redistribution matrix that distributes transmission power of the wireless communication across a set of transmit chains of the transmitting device, adding a product of the redistribution matrix and the null space matrix to the initial precoding matrix to generate a modified precoding matrix, applying the modified precoding matrix to the set of transmit chains for transmission of the wireless communication to the receiving device, and transmitting, responsive to the applying, the wireless communication to the receiving device.

An apparatus for wireless communications at a transmitting device is described. The apparatus may include a processor, memory coupled with the processor, and instructions stored in the memory. The instructions may be executable by the processor to cause the apparatus to identify an estimated channel matrix for a wireless communication with a receiving device, determine, based on the estimated channel matrix, an initial precoding matrix for the receiving device and a null space matrix for the receiving device, determine, based on the initial precoding matrix and the null space matrix, a redistribution matrix that distributes transmission power of the wireless communication across a set of transmit chains of the transmitting device, add a product of the redistribution matrix and the null space matrix to the initial precoding matrix to generate a modified precoding matrix, apply the modified precoding matrix to the set of transmit chains for transmission of the wireless communication to the receiving device, and transmit, responsive to the applying, the wireless communication to the receiving device.

Another apparatus for wireless communications at a transmitting device is described. The apparatus may include means for identifying an estimated channel matrix for a wireless communication with a receiving device, determining, based on the estimated channel matrix, an initial precoding matrix for the receiving device and a null space matrix for the receiving device, determining, based on the initial precoding matrix and the null space matrix, a redistribution matrix that distributes transmission power of the wireless communication across a set of transmit chains of the transmitting device, adding a product of the redistribution matrix and the null space matrix to the initial precoding matrix to generate a modified precoding matrix, applying the modified precoding matrix to the set of transmit chains for transmission of the wireless communication to the receiving device, and transmitting, responsive to the applying, the wireless communication to the receiving device.

A non-transitory computer-readable medium storing code for wireless communications at a transmitting device is described. The code may include instructions executable by a processor to identify an estimated channel matrix for a wireless communication with a receiving device, determine, based on the estimated channel matrix, an initial precoding matrix for the receiving device and a null space matrix for the receiving device, determine, based on the initial precoding matrix and the null space matrix, a redistribution matrix that distributes transmission power of the wireless communication across a set of transmit chains of the transmitting device, add a product of the redistribution matrix and the null space matrix to the initial precoding matrix to generate a modified precoding matrix, apply the modified precoding matrix to the set of transmit chains for transmission of the wireless communication to the receiving device, and transmit, responsive to the applying, the wireless communication to the receiving device.

In some examples of the method, apparatuses, and non-transitory computer-readable medium described herein, the product of the redistribution matrix and the null space matrix is within a null space of the channel estimation matrix. In some examples of the method, apparatuses, and non-transitory computer-readable medium described herein, the redistribution matrix provides reduced power variance across the set of transmit chains relative to a power variance based only on the initial precoding matrix. In some examples of the method, apparatuses, and non-transitory computer-readable medium described herein, the redistribution matrix may be selected to provide a variability in norms across a set of rows of the modified precoding matrix that is less than a variability threshold. In some examples of the method, apparatuses, and non-transitory computer-readable medium described herein, the redistribution matrix may be selected to provide a maximum norm across a set of rows of the modified precoding matrix that is less than a maximum norm threshold.

In some examples of the method, apparatuses, and non-transitory computer-readable medium described herein, the redistribution matrix may be determined based on a convex optimization problem that provides, relative to the initial precoding matrix, a reduced maximum energy value for each row of the modified precoding matrix, or a reduced amount of variance for each row of the modified precoding matrix. In some examples of the method, apparatuses, and non-transitory computer-readable medium described herein, the redistribution matrix provides a data-independent modification of the initial precoding matrix. In some examples of the method, apparatuses, and non-transitory computer-readable medium described herein, the redistribution matrix provides a similar power amplifier backoff parameter for each of the set of transmit chains.

In some examples of the method, apparatuses, and non-transitory computer-readable medium described herein, the determining the redistribution matrix may include operations, features, means, or instructions for performing an iterative algorithm to generate the redistribution matrix. In some examples of the method, apparatuses, and non-transitory computer-readable medium described herein, the performing the iterative algorithm may include operations, features, means, or instructions for normalizing each row of a set of rows of the initial precoding matrix to generate a set of normalized rows, adjusting each row of the initial precoding matrix based on a difference between the corresponding row of the initial precoding matrix and the associated normalized row to generate a set of adjusted rows, applying the set of adjusted rows to the null space matrix that may be based on the estimated channel matrix and a pseudo-inverse of the estimated channel matrix to generate the modified precoding matrix, evaluating a vector norm for each row of the modified precoding matrix to determine if a variance of the vector norms is within a threshold variance value, and repeating, based on the variance of the vector norms being greater than the threshold variance value, the normalizing, adjusting, applying, and evaluating.

DETAILED DESCRIPTION

Figure 1:
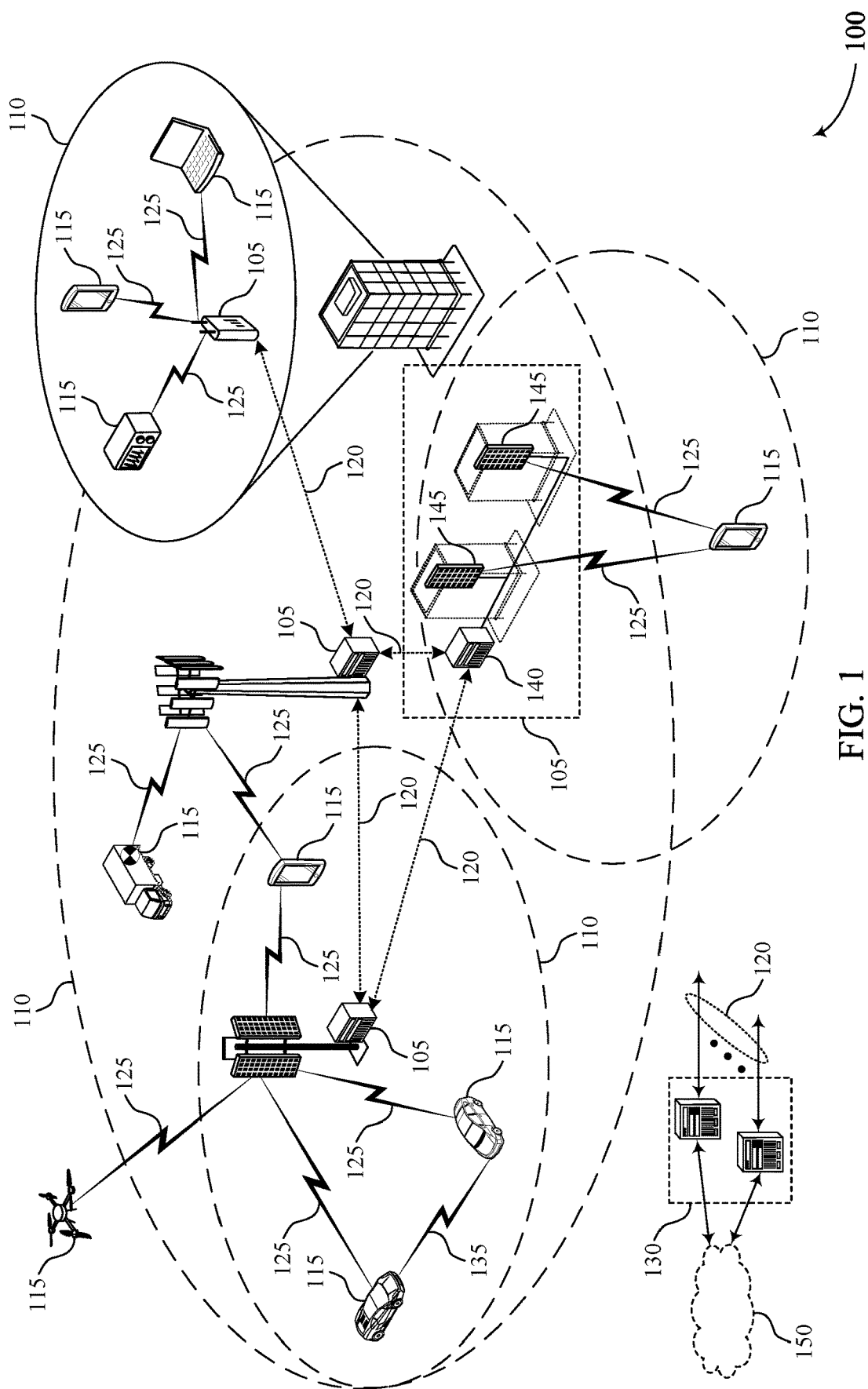
FIG. 1 illustrates an example of a system for wireless communications that supports precoding techniques for wireless communications in accordance with aspects of the present disclosure.

Various aspects of the present disclosure provide techniques for modifying a precoding matrix to provide enhanced transmission power uniformity across multiple transmission channels in multiple-input multiple-output (MIMO) communications. In accordance with various aspects, a base station may identify a precoding matrix for communications with a user equipment (UE), and modify the precoding matrix to provide for enhanced transmission powers for communications. In some cases, the base station may identify a null space matrix that lies within a null space of an effective channel matrix for communications between the base station and the UE. The effective channel matrix may be estimated based on one or more measurements of reference signal(s), and is a multiplication of a combiner matrix at the base station and the propagation channel between the base station and the UE. In some cases, the base station may determine a redistribution matrix that provides a reduced variance of transmission powers for a number of transmission channels, and a product of the null space matrix and the redistribution matrix may be computed and added to the precoding matrix to generate a modified precoding matrix that has reduced power variance at the number of transmission channels. The modified precoding matrix may be used to generate the communication to the UE, and communications using the modified precoding matrix may be indistinguishable at a receiving device from communications using an unmodified precoding matrix. Further, the redistribution matrix may be independent of data that is transmitted, and thus applied across multiple data transmissions.

In some cases, the base station may identify the null space matrix, and provide an indication of the null space matrix to one or more UEs that are in communication with the base station. Each of the one or more UEs may determine a redistribution matrix that provides a reduced variance of channel transmission powers at the UE, and compute a product of the null space matrix and the redistribution matrix, which may be added to an indicated precoding matrix for use in an uplink communication from the UE to the base station. Such techniques may allow for relatively efficient power amplifier usage at the UEs and base station, such that one or more power amplifiers avoid non-linear operation while also operating at a relatively high level of amplification. Various techniques as discussed herein may be used in cases with codebook-based precoding or non-codebook precoding. In cases where codebook-based precoding is used, the base station may provide an indication of a precoding matrix (e.g., as a precoding matrix indicator (PMI)) with the null space matrix, and the UE may modify the indicated precoding matrix based on the product of the null space matrix and the redistribution matrix. In cases where non-codebook precoding is used, the UE may determine precoding based on an estimated channel, and modify the precoding based on the product of the null space matrix and the redistribution matrix. The base station, in such cases, may calculate the null space matrix for each UE by considering the signal space of all served UEs. In some cases, the base station may provide a per sub-band null space matrix for use in different sub-bands.

Such techniques may be advantageous in massive MIMO deployments where power amplifiers (PAs) operate at different levels of amplification based on a determined precoding matrix. Such precoding matrices may provide efficient beamforming properties, and may be computed in accordance with established techniques (e.g., singular value decomposition (SVD) or SVD-signal-to-leakage ratio (SVD-SLR techniques). However, when transmitting to multiple different UEs, PA(s) at the transmitting device may operate at different levels of amplification based on the determined precoding matrix. In order to provide that the PA(s) do not operate in a non-linear portion of the PA, a backoff value may be used to provide amplification in a linear range of the PA. The backoff value (which may be referred to as input backoff (IBO)) for communications with multiple UEs in MIMO may be set based on highest amplification value in order to avoid operation in the non-linear portion of the PA, which may result in some transmit chains being transmitted at a relatively low amplification and which may reduce the likelihood of a successful communication.

As indicated, some commercial PAs have a non-linear behavior if operated at relatively high input power. This non-linearity may result in in-band and out-of-band distortion of the signal, and degraded error vector magnitude (EVM) at the receivers. In some cases, to avoid the non-linearity, the PA must be operated at a mean input power that is several dB lower than the saturation point. If a signal has a peak to average power ratio (PAPR) of x dB, an IBO of x dB is necessary to avoid the non-linearity at the peak of the input signal. Further, orthogonal frequency division multiplexing (OFDM) signals are known to exhibit significant PAPR that grows rapidly by the size of the block that is transmitted in an OFDM symbol. In systems, such as 5G NR systems, in which relatively high data-rates are desired, the OFDM block-size may be relatively large, thus further increasing the PAPR. Additionally, existing PAPR reduction techniques are data-dependent and computationally intensive, which may make them poor candidates for a real-time implementation. As a result, clipping and filtering (CF) may be implemented, which may result in in-band distortion and may not be guaranteed to converge to a desirable solution.

Additionally, in some cases, different PAs of different RF chains at a UE may have different saturation points. In some cases, a UE may transmit an indication of the different PA saturation points to the base station. The base station, based on the indication of the different PA saturation points, may select an unequalized precoder, may provide a null space matrix to the UE that may be used at the UE to modify the precoder to account for the different PA saturation points, or any combinations thereof.

In accordance with various techniques as discussed herein, operation within PA linear regions of operation may be provided through the addition of the product of the null space matrix and redistribution matrix to a determined precoding matrix. Due to the null space matrix lying within a null space of the effective channel, the product of the null space matrix with the effective channel matrix results in a cancellation of the modifications to the precoding matrix from the perspective of the receiving device, and thus enhanced transmission power uniformity may be achieved while also utilizing the selected precoding matrix. In many cases, a transmitting device may have more antennas than the number of layers that are to be transmitted, and such additional antennas may provide additional degrees of freedom for designing the precoder. Precoder design algorithms as discussed herein may exploit these degrees of freedom to help resolve the tension between PA under-utilization and precoder distortion, while also providing communications using a precoding matrix that is selected based on established algorithms.

Aspects of the disclosure are initially described in the context of wireless communications systems. Examples of precoding techniques in accordance with various examples are then discussed. Aspects of the disclosure are further illustrated by and described with reference to apparatus diagrams, system diagrams, and flowcharts that relate to precoding techniques for wireless communications.

FIG. 1 illustrates an example of a wireless communications system 100 that supports precoding techniques for wireless communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol)

and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier.

One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

In some cases, in accordance with techniques as discussed herein, a base station 105 may identify a precoding matrix for communications with a UE 115, and modify the precoding matrix to provide for enhanced transmission powers for communications with the UE 115. In some cases, the base station 105 may identify a null space matrix that lies within a null space of an effective channel matrix for communications between the base station 105 and the UE 115. For downlink communications, the base station 105 may determine a redistribution matrix that provides a reduced variance of transmission powers for a number of transmission channels, and a product of the null space matrix and the redistribution matrix may be added to the precoding matrix to generate a modified precoding matrix that has reduced power variance at the number of downlink transmission channels. The modified precoding matrix may then be used to generate the downlink communication to the UE 115.

For uplink communications, the base station 105 may identify the null space matrix, and provide an indication of the null space matrix to one or more UEs 115 that are in communication with the base station 105. Each of the one or more UEs 115 may determine a redistribution matrix that provides a reduced variance of channel transmission powers at the UE 115, and compute a product of the null space matrix and the redistribution matrix, which may be added to an indicated precoding matrix for use in an uplink communication from the UE 115 to the base station 105. Such techniques may allow for relatively efficient power amplifier usage at the UEs 115 and base station 105, such that one or more power amplifiers avoid non-linear operation while also operating at a relatively high level of amplification.

Figure 2:
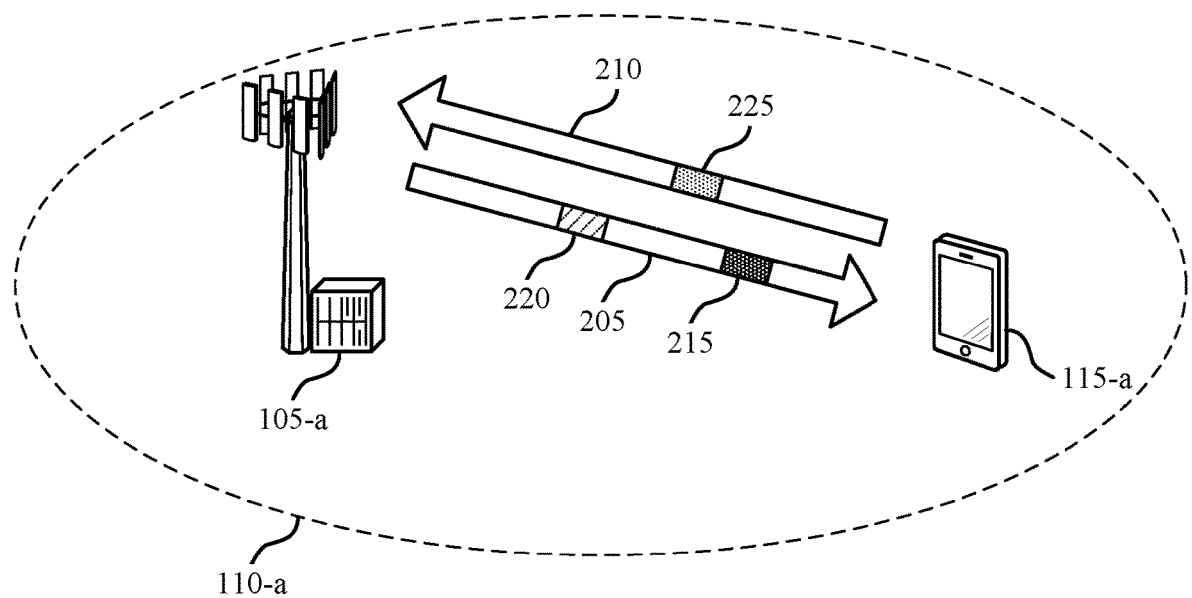
FIG. 2 illustrates an example of a portion of a wireless communications system that supports precoding techniques for wireless communications in accordance with aspects of the present disclosure.

FIG. 2 illustrates an example of a wireless communications system 200 that supports precoding techniques for wireless communications in accordance with aspects of the present disclosure. In some examples, wireless communications system 200 may implement aspects of wireless communications system 100. Wireless communications system 200 may include base station 105-a and UE 115-a, which may be respective examples of a base station 105 and a UE 115 as described herein.

UE 115-a and base station 105-a may communicate via downlink carrier 205 and uplink carrier 210. In some cases, carriers 205 and 210 may be the same carrier, or may include multiple component carriers. In the example of FIG. 2, the base station 105-a may determine a modified precoding matrix based on an initial precoding matrix and a product of a null space matrix and a redistribution matrix as discussed herein. The base station 105-a may transmit downlink transmissions(s) 215 using the modified precoding matrix. In some cases, the base station 105-a may also provide a precoding matrix and null space matrix indication 220 to the UE 115-a for use in transmission of uplink transmission(s) 225 from the UE 115-a. In such cases, the UE 115-a may determine its own redistribution matrix, and may compute a product of the null space matrix and redistribution matrix, add the product to the indicated precoding matrix to determine a modified precoding matrix, and use the modified precoding matrix for uplink transmission(s) 225.

In some cases, the modified precoding matrices that are determined at the base station 105-a and UE 115-a may provide for modifications to a given MIMO precoder in such a way that the new precoder has reduced or minimized power variance across all the output chains. Such a precoder design may exploit the null space of the effective channel matrix in such a way that, from the perspective of the receiving device, the two precoders are indistinguishable. Providing a similar transmission power across all the transmit chains may allow the transmitting device to operate all the antennas at the same IBO, and thereby take advantage of the linear region of the PA(s) while operating at a relatively high amplification level. Examples of IBO and linear versus non-linear regions of the PA(s) are discussed in more detail with reference to FIG. 3. In some cases, the modified precoding matrix may be formulated as the solution to a convex optimization problem that can be solved efficiently, and that may be applied in a manner that is independent of data that is transmitted.

Various techniques as discussed herein may be used in cases with codebook-based precoding or non-codebook precoding. In cases where codebook-based precoding is used, the base station 105-a may provide an indication of a precoding matrix (e.g., as a precoding matrix indicator (PMI)) with the null space matrix, and the UE 115-a may modify the indicated precoding matrix based on the product of the null space matrix and the redistribution matrix. In cases where non-codebook precoding is used, the UE 115-a may determine precoding based on an estimated channel, and modify the precoding based on the product of the null space matrix and the redistribution matrix. The base station 105-a, in such cases, may calculate the null space matrix for each UE 115-a by considering the signal space of all served UEs. In some cases, the base station 105-a may provide a per sub-band null space matrix for use in different sub-bands.

Additionally, in some cases, different PAs of different RF chains at UE 115-a may have different saturation points. In some cases, the UE 115-a may transmit an indication of the different PA saturation points to the base station 105-a. Such an indication may be provided, for example, in a report (e.g., un uplink control information (UCI)) that provides an indication of PA saturation points of each PA (e.g., a 26 dBm saturation point for a first antenna of a first RF chain, a 23 dBm saturation point for a second antenna of a second RF chain, etc.). In other cases, the UE 115-a may transmit an indication that different PAs have different saturation points (e.g., a one-bit indication), that may signal the base station 105-a that the null space matrix may be needed to provide an unequalized precoder. The base station 105-a, based on the indication of the different PA saturation points, may select an unequalized precoder, may provide the null space matrix to the UE 115-a that may be used to modify the precoder to account for the different PA saturation points, or any combinations thereof.

As used in various examples herein, the precoding matrix may be referred to as W, the null space matrix may be referred to as K, the redistribution matrix may be referred to as R, and the effective channel matrix may be referred to as H. In some cases, in order to receive communications from multiple UEs 115, the base station 105-*a* may transmit the precoding and null space indication 220, specifying a precoder (e.g., that is mapped to a precoding matrix indicator) for transmitting data, and a null-space (e.g., that is mapped to a null space indicator) for reshaping the precoder. The UE 115-*a* (and any other UEs that are to transmit data to the base station 105-*a*) may use the null-space in order to reshape the precoder depending on the characteristics of the PA(s) of the UE 115-*a*. In some cases, the UE 115-*a* can choose any redistribution matrix R and reshape its precoder to be a modified precoder as W+KR.

In some cases, an iterative algorithm may be used for constructing the modified precoder that achieves the described properties. Such an algorithm may take as input any given precoder and produce an auxiliary precoder whose rows are normalized to have similar or equal norms. The modified precoder may then be determined as a linear combination of the original precoder and the auxiliary precoder. The matrices involved in the linear transformation are chosen such that the auxiliary precoder is mapped to the null space of the effective channel matrix. The algorithm may iterate with the modified precoder taking the place of the prior precoder until the variance of the norms of the rows of the modified precoder is sufficiently low.

Due to the null space matrix being used in the product of the null space matrix and the redistribution matrix, such techniques may provide modified precoders that are indistinguishable at a receiving device from an initial precoder. For example, a transmitting device may transmit using m layers over n antennas, and the effective channel resulting from the multiplication of the physical channel and a combiner at the receiver(s) is H. If the transmitting device starts with an ideal precoder W which has been designed to enhance the end-to-end performance disregarding the PA limitations, then W is an n by m matrix which maps the m layers to the n output chains. Furthermore, W could be different for every tone, to match the corresponding per-tone channel. The null space matrix K may be an n by n−m matrix representing the null-space of H. In other words, H·K=0, where 0 is a vector of all zeros of length m. Application of the null space matrix and the redistribution matrix to a precoding matrix will be discussed in more detail with reference to FIG. 4.

Figure 3:
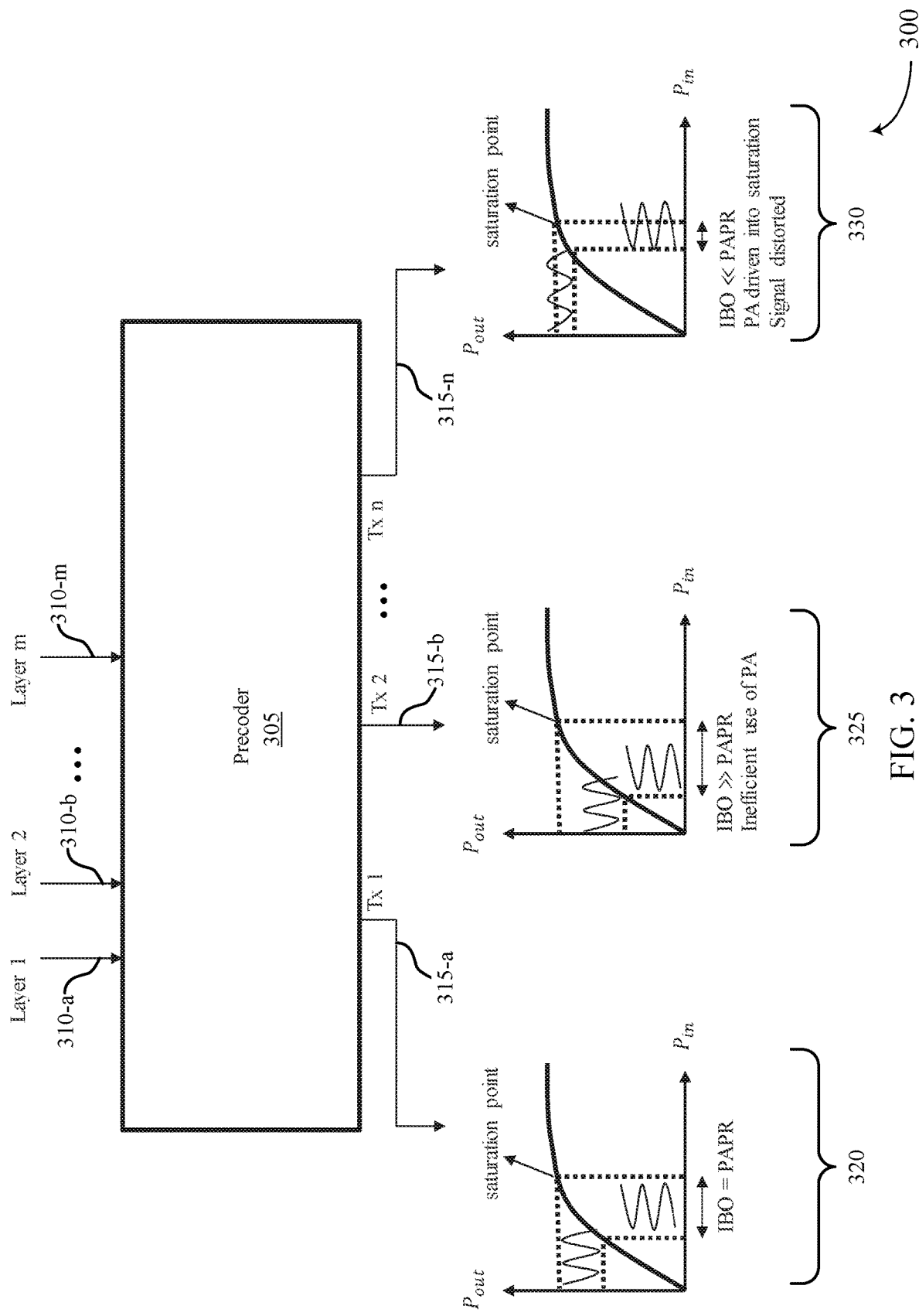
FIG. 3 illustrates an example of a precoder and power amplifier properties that support precoding techniques for wireless communications in accordance with aspects of the present disclosure.

FIG. 3 illustrates an example of a precoder and power amplifier properties 300 that support precoding techniques for wireless communications in accordance with aspects of the present disclosure. In some examples, precoder and power amplifier properties 300 may implement aspects of wireless communications system 100 or 200. In this example, a precoder 305 may receive inputs from a first number of layers 310, which include m layers in this example, the precoder 305 outputs a second number of transmit channels 315, which may include n output channels in this example. Thus, the precoder 305 may operate to apply a m by n precoding matrix (W) to input data of m transmission layers.

In some cases, a transmitting device (e.g., a UE or base station as discussed with reference to FIG. 1 or 2) may identify a precoding matrix (W) based on an estimated channel between the transmitting device and a receiving device. The precoding matrix may then be modified to reduce a variance in a transmit power across then transmit channels 315. Such techniques may provide for efficient usage of PA capabilities without driving the PA(s) into saturation. Such techniques avoid underutilization of the PA(s), such as may occur when different transmission chains have different powers, resulting in different IBOs for different transmission chains. The second possibility is to scale all the chains with the same value to avoid distorting the precoder. In this case, if one chain operates at an IBO of x dB, the remaining chains will either underutilize the PA such as illustrated at 325 by operating at larger IBOs, or they push the PA to saturation such as illustrated at 330, by operating at lower IBOs than x dB. Techniques for using the product of the null matrix and the redistribution matrix may allow for most or all transmit channels 315 to operate with an IBO that corresponds to the PAPR as illustrated at 320.

Figure 4:
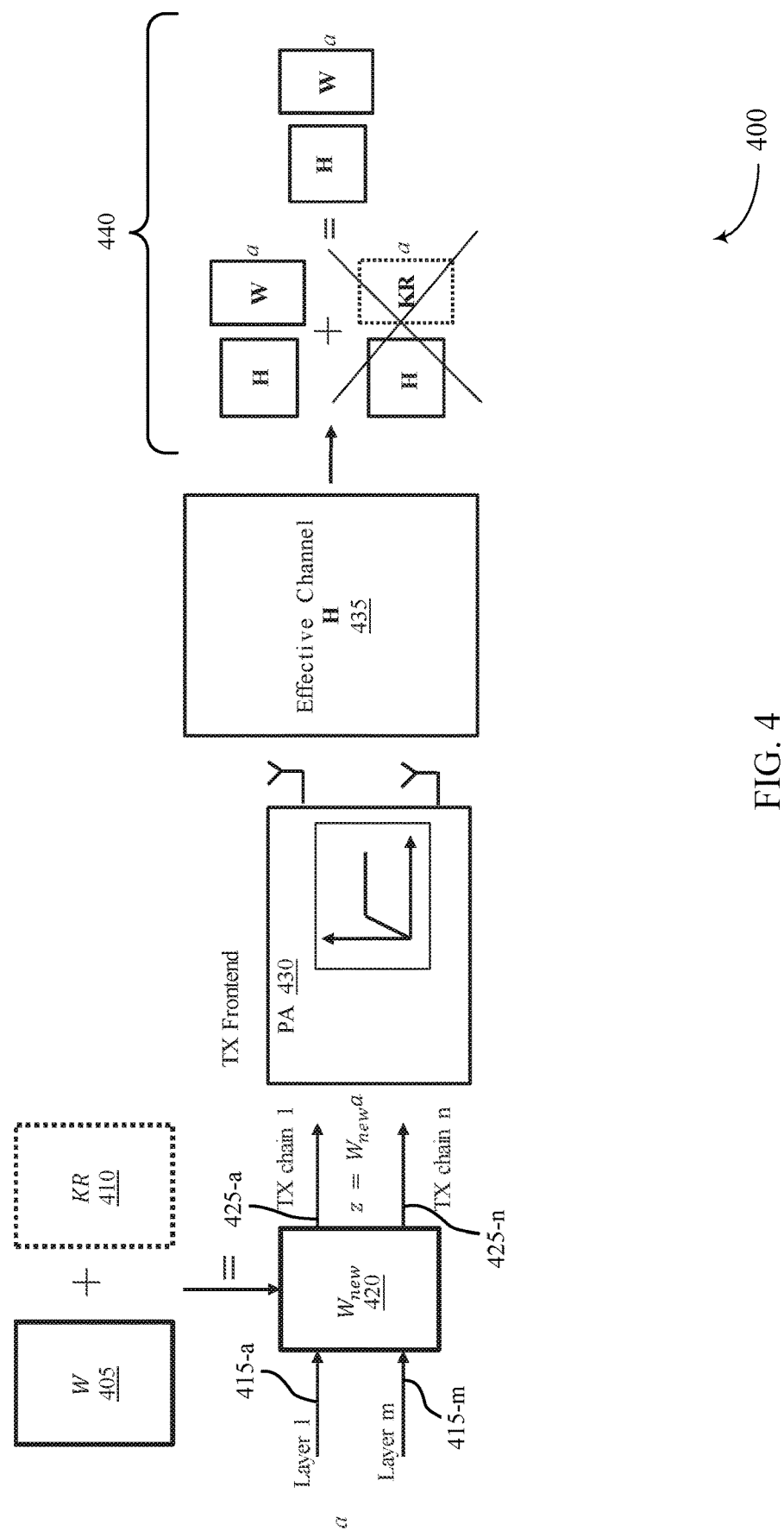
FIG. 4 illustrates an example of a redistribution matrix applied to a precoding matrix for wireless communications in accordance with aspects of the present disclosure.

FIG. 4 illustrates an example 400 of applying a modification to a precoder matrix in accordance with aspects of the present disclosure. In some examples, such a modification may implement aspects of wireless communications system 100 or 200. In this example, a precoding matrix (W) 405 may be modified as a linear combination of a product 410 of a null space matrix (K) and a redistribution matrix (R) to generate a modified precoding matrix 420 ($W_{new}$).

Thus, in this example, the transmitting device (e.g., UE or base station) may modify the precoding matrix 405 (W) to obtain $W_{new}$=W+KR where $W_{new}$ is the new modified precoding matrix 420 and is of the same dimensions as W, and R is an n−m by in matrix that is designed to satisfy a certain number of properties for downlink communications from a base station to a UE. In cases where a redistribution matrix is applied to a null space matrix for uplink communications from a UE to a base station, the UE may not be able to fully utilize the null space at is may interfere with other UEs, and in such cases R may be an s by in matrix, K may be a n by s matrix, and W will be an n by m matrix. In such cases, the value of s may be less than or equal to n−m (e.g., for a single UE that is transmitting, s=n−m in a similar manner as for downlink, but for multiple UEs s would be less than n−m). Note that from the perspective of the receiving device(s), $W_{new}$ and W are indistinguishable, as discussed in this example. In this example, the effective channel matrix (H) 435 (e.g., the product of the combiner matrix at the receiving device and the propagation channel) conveys data (a) that has m layers 415 that are transmitted using n transmit chains 425. Transmit chains 425 include PA(s) 420 that have linear and non-linear regions, which transmit over effective channel H 435. Because the null matrix K lies within the null space of H, the product of HK is zero. Thus, as indicated at 440, from the perspective of the receiving device:

$$HW_{new}a=H(W+KR)a=HWa+HKRa=HWa+0a=HWa.$$

In some cases, the redistribution matrix R may be selected to satisfy certain properties. One such property may be that the variation of the norms across the rows of $W_{new}$=W+KR is less than a threshold or is minimized. In such cases:

$$c_i=\|W_{new,i}\|$$

where $W_{new,i}$ is the i'th row of $W_{new}$. The value of Var(c) may be selected to be below the threshold value or as small as possible, where Var(c)=$1/n\Sigma(c_i-\text{mean}(c))^2$. Another such property may be that the maximum norm across all the rows of KR is below a threshold value or as small as possible. This is to ensure that the amount of energy that is transmitted in the null-space of H remains low.

The problem can thus be formulated as a convex optimization problem as follows. $R^*=\text{argmin}_R \max_i\|W_{new,i}\|^2$, or $R^*=\text{argmin}_R \text{Var}(\|W_i+K_iR\|)$, which can be solved with any convex optimization method to find R*. As long as W is highly aligned with the kernel of H, the two optimization problems may be expected to result in very similar solutions, since minimizing the maximum norm implies the redistribution of energy across different rows of the precoder matrix which reduces the variance.

In the example of FIG. 4, the modified precoder 420 may be used to obtain $z=W_{new}\alpha$ where $\alpha$ is the per-tone OFDM symbol of length m and z is the per-tone output of the precoder, of length n. If the number of transmission antennas is large, and if the data is generated in an independent and identically distributed (i.i.d.) at random with zero mean, the output power for each chain can be approximated as $\|z_i\| \approx \|W_{new,i}\| \times \alpha$ where $\alpha$ depends on the input power of the signal. For the PA 430 IBO, if all the rows of $W_{new}$ have similar norms, it can be expected that all the rows of z will have similar norms. As a result, all the chains will have similar powers. Therefore, all the chains can operate the PA 430 at similar IBO, taking the most advantage of the linear region of the PA 430. Such a technique has an advantage in that the power equalization is data-independent. One only needs to modify the precoder once to achieve similar mean output power across all the transmit chains, and no further modification is necessary per OFDM symbol, which may free time-sensitive resources of the transmitting device for more critical tasks.

In some cases, an iterative algorithm may be used to determine the modified precoder $W_{new}$. One exemplary iterative algorithm for constructing $W_{new}$ is as follows. Assume a starting precoder $\|W\|_F=1$ where $\|\cdot\|_F$ is the Frobenius norm. If this constraint does not hold, W can be first normalized with $\|W\|_F$ to satisfy this property. Let $H^+$ be the Moore-Penrose pseudo-inverse of the matrix H, thus $H^+$ has the property that $HH^+H=H$. The algorithm may operate as:

(1) normalize each row of W to obtain $\hat{W}$: for $i \in [n]$, $\hat{W}_{i,:}=W_{i,:}/\|W_{i,:}\|$.

(2) $W_{new}=(I-H^+H)(\hat{W}-W)+W$.

(3) Iterate with $W=W_{new}$ until all the rows of W have similar norms within an acceptable margin or a threshold value.

It is noted that $(I-H^+H)$ corresponds to K in the discussions above, and that $(\hat{W}-W)$ corresponds to R in the discussions above. It also may be noted that the modification to W is within the null space of H. In other words:

$$H(W_{new}-W)=H(I-H^+H)(\hat{W}-W)=(H-HH^+H)$$
$$(\hat{W}-W)=0\times(\hat{W}-W)=0.$$

As a result, from the perspective of the receiver, $HW_{new}=HW$. Therefore, the receiver is unable to distinguish between the two precoder matrices. On the other hand, from the perspective of the transmitter:

$$W_{new}=(I-H^+H)(\hat{W}-W)+W=(I-H^+H)\hat{W}+H^+HW.$$

Therefore, the transmitter sees a combination of $\hat{W}$ and W. Further, as $\hat{W}$ is an ideal matrix: it has zero-variance across all its rows, and $W_{new}$ falls somewhere between $\hat{W}$ and W. After several iterations, $W_{new}$ will still be indistinguishable from W by the receiver, while it converges to a desired solution with minimal variance across all the rows for the transmitting device.

Such techniques may be applied in both downlink and uplink communications. However, in cases where multiple transmitters (e.g., multiple UEs) are simultaneously sending data on the same time and frequency resources to a common receiver (e.g., a base station), the null space matrix for each of the transmitters may be based on the effective channel at the receiver. For example, a number of UEs (e.g., L UEs) may each transmit m layers in the uplink, each using n antennas. Further, a number of receive antennas at a serving base station may be larger than mL. In this case, if one UE exploits all his n–m degrees of freedom to transform the precoder as described herein, its transmission may interfere with the other UEs, since the effective channel is different for each UE. For example, if the base station indicates that the precoder matrix for UE1 is $W_1=[1; 0; 1; 0]$ while the precoder matrix for UE2 is $W_2=[0; 1; 0; 1]$, then each UE transmits one layer over 4 antennas. Further, the effective channel from UE1 to the base station may be $C_1H_1$ where $C_1$ is the combiner that the base station uses for UE1, and $C_2H_2$ may be the effective channel from UE2 to the base station. In such cases, UE1 may rely on techniques described herein earlier to transform its precoder into $W^*_1=[0.5; 0.5; 0.5; 0.5]$ to minimize IBO, knowing that $W^*_1-W_1$ lies in the null-space of the effective channel (i.e., $C_1H_1(W^*_1-W_1)=0$). On the other hand, the base station receives $C_2H_2W_2x_2+C_2H_1W^*_1x_1$. While $C_2$ is designed to minimize the interference resulting from $C_2H_1W_1$, there is no guarantee that $C_2H_1(W^*_1-W_1)$ is small.

In some cases, the base station may indicate, to each served UE, a designated null space which the UE is allowed to use for modifying its precoder, depending on its PA characteristics. In such cases, the base station may indicate to each UE, a precoder matrix $W_i$ and a null-space matrix $K_i$. Each UE will be able to find its desired $R_i$ and use $W_i+K_iR_i$ instead of $W_i$. The matrix $K_i$ may be chosen by the base station in such a way that $C_jH_jK_i=0$ for every i,j. The null space for different UEs may overlap, and in some cases the base station may periodically update the UEs if the null-space is shrunk (e.g., if the null space matrix has one or more fewer columns) or expanded (e.g., if the null space matrix has one or more additional column) depending on the number of active UEs that are being served by the base station.

Figure 5:
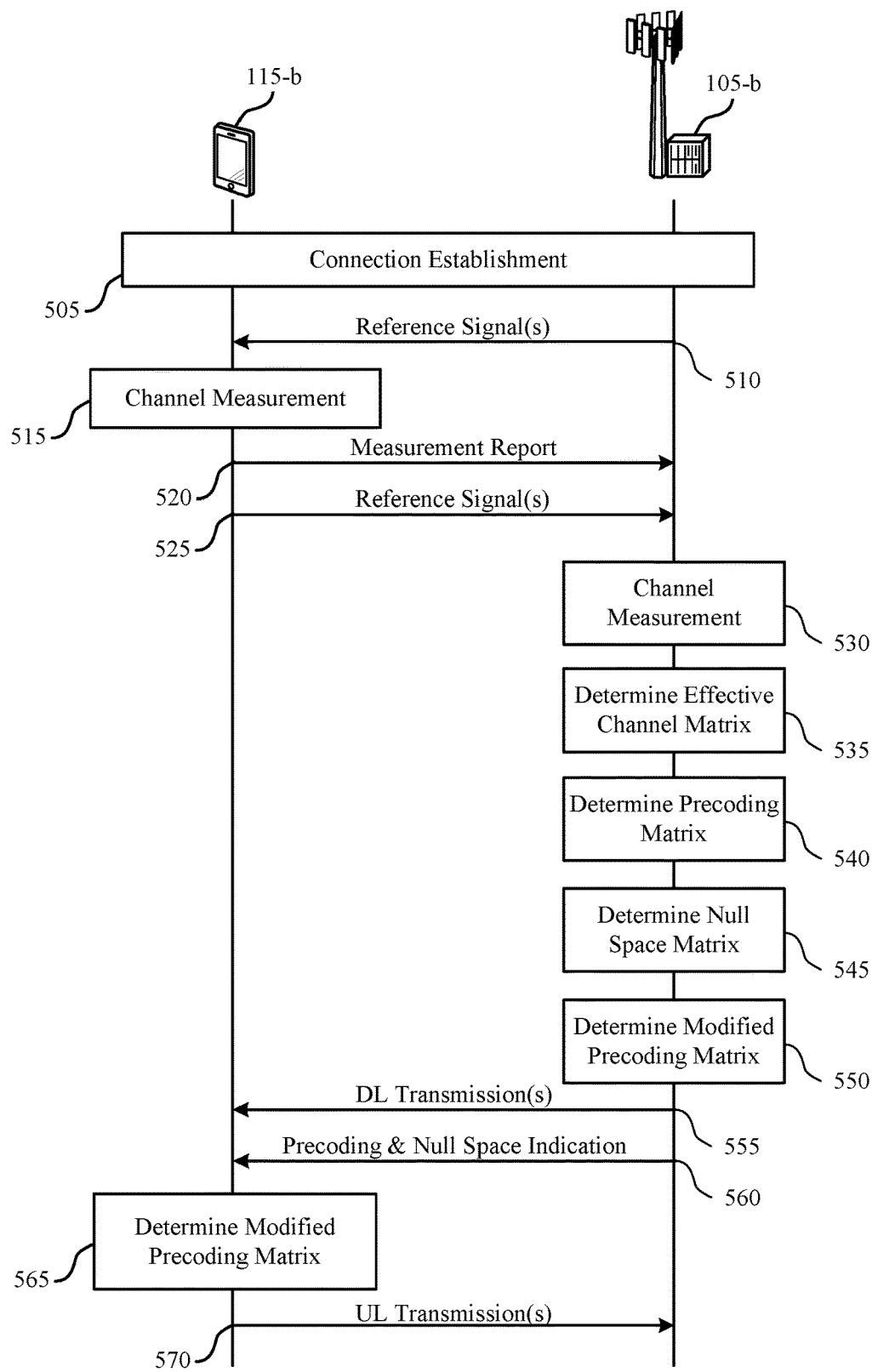
FIGS. 5-6 illustrate examples of process flows that support precoding techniques for wireless communications in accordance with aspects of the present disclosure.

FIG. 5 illustrates an example of a process flow 500 that supports precoding techniques for wireless communications in accordance with aspects of the present disclosure. In some examples, process flow 500 may implement aspects of wireless communications system 100. In some examples, process flow 500 may implement aspects of wireless communications system 100 or 200. Process flow 500 may be implemented by UE 115-b and base station 105-b, as described herein. Alternative examples of the following may be implemented, where some steps are performed in a different order than described or are not performed at all. In some cases, steps may include additional features not mentioned below, or further steps may be added.

At 505, the base station 105-b and UE 115-b may perform a connection establishment procedure (e.g., a RRC connection establishment or reestablishment procedure) in which communications may be configured.

At 510, the base station 105-b may transmit one or more reference signals that may be used for channel estimation. At 515, the UE 115-b may perform a channel measurement procedure based on the one or more reference signals (e.g., channel state information (CSI) reference signals), and may generate a measurement report (e.g., a CSI report). In some cases, the measurement report may include information related to an estimated channel between the UE 115-b and the base station 105-b, among other parameters (e.g., a rank indicator (RI), precoding matrix indicator (PMI), channel quality indicator (CQI), etc.). At 520, the UE 115-b may transmit the measurement report to the base station 105-b. Further, in some cases the UE 115-b may, at 525, transmit one or more reference signals (e.g., sounding reference signals (SRSs)). In such cases, at 530, the base station 105-*b* may perform channel measurement using the UE 115-*b* reference signals.

At 535, the base station 105-*b* may determine the effective channel matrix between the UE 115-*b* and the base station 105-*b*. At 540, the base station 105-*b* may determine a precoding matrix that is to be used for communications with the UE 115-*b*. In some cases, the precoding matrix may be determined for downlink communications based on established algorithms for determining a precoder, such as a SVD or SVD-SLR techniques. In some cases, a precoding matrix for uplink communications of the UE 115-*b* may also be identified, such as a precoding matrix that is selected from a table or a codebook (e.g., that may be signaled to the UE 115-*b* via PMI) based on the measurement report.

At 545, the base station 105-*b* may determine a null space matrix. The null space matrix for downlink communications may be determined, in some cases, based in the effective channel matrix such that the product of the effective channel matrix and the null space matrix is a vector of all zeros having a length that corresponds to the number of transmission layers (e.g., m transmission layers where the null space matrix is an n×m matrix in which n is the number of transmission chains). In some cases, the base station 105-*b* may determine a null space matrix for uplink communications of the UE 115-*b* as well, based on the measurement report.

At 550, the base station 105-*b* may determine a modified precoding matrix. The modified precoding matrix may be determined based on techniques as discussed herein, and may provide reduced variability in transmission power across transmit chains for downlink transmissions from the base station 105-*b*. At 555, the base station 105-*b* may transmit the downlink transmission(s) to the UE 115-*b*.

In some cases, the base station 105-*b* may serve a number of different UEs 115 and, at 560, may provide an indication of the corresponding precoding matrix and the null space matrix for each UE that is identified at the base station 105-*b*. In some cases, the null space matrix indication to the UE 115-*b* may be provided as a null space index that is mapped to a table or codebook of null space matrices (e.g., that is preconfigured or configured via RRC signaling). The indication of the precoding matrix to the UE 115-*b* may also be provided as a precoding matrix indicator (PMI) that is mapped to a table or codebook of precoding matrices (e.g., that is preconfigured of configured via RRC signaling).

At 565, the UE 115-*b* may determine a modified precoding matrix to be used in communications with the base station 105-*b*. The determination of the modified precoding matrix may be performed using techniques such as discussed herein, in which a redistribution matrix may be determined, and a product of the null space matrix and redistribution matrix may be applied as a linear combination with the indicated precoding matrix. At 570, the UE 115-*b* may transmit the uplink transmission(s) to the base station 105-*c* using the modified precoding matrix.

Figure 6:
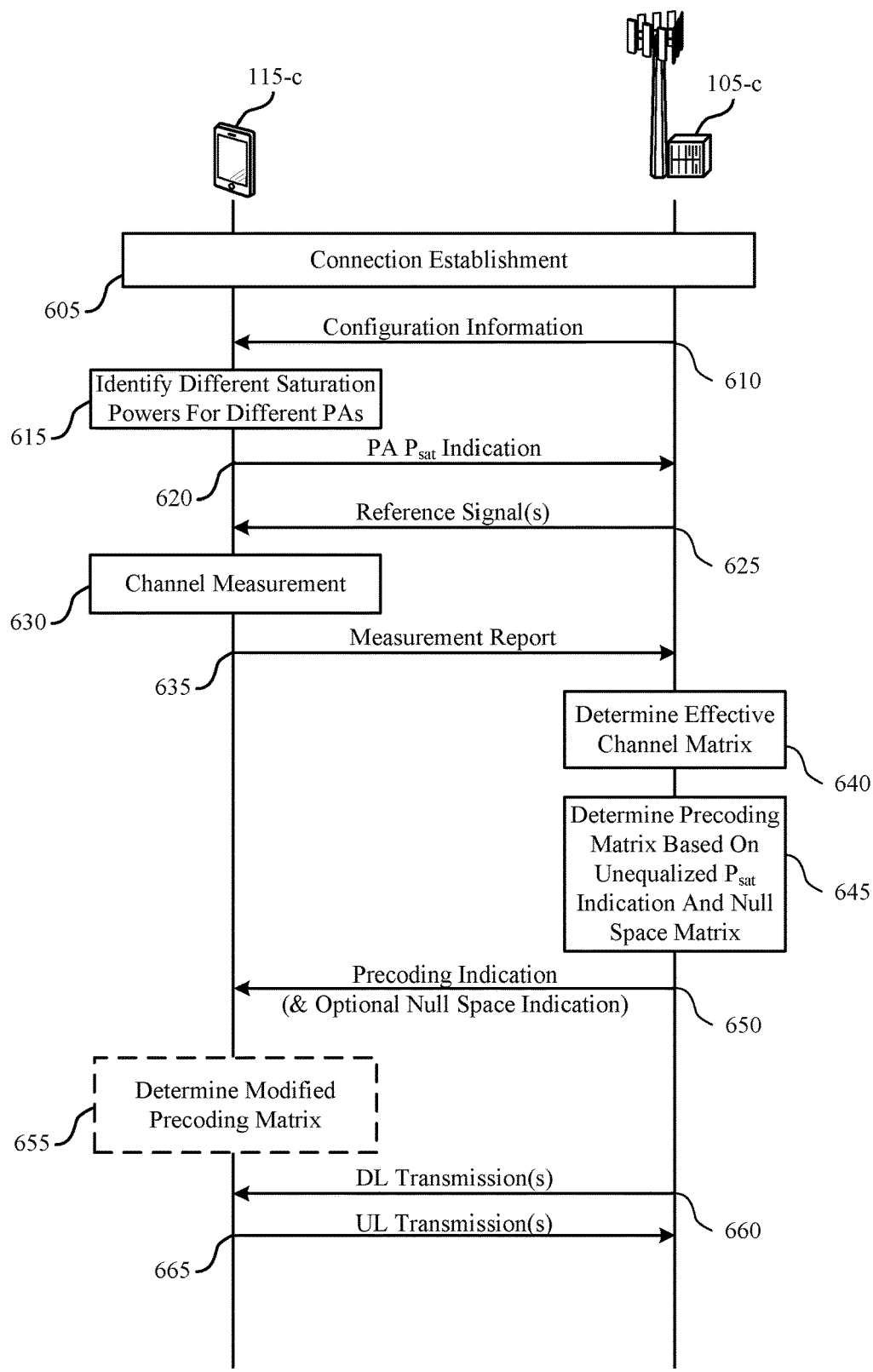

FIG. 6 illustrates an example of a process flow 600 that supports precoding techniques for wireless communications in accordance with aspects of the present disclosure. In some examples, process flow 600 may implement aspects of wireless communications system 100. In some examples, process flow 600 may implement aspects of wireless communications system 100 or 200. Process flow 600 may be implemented by UE 115-*c* and base station 105-*c*, as described herein. Alternative examples of the following may be implemented, where some steps are performed in a different order than described or are not performed at all. In some cases, steps may include additional features not mentioned below, or further steps may be added.

At 605, the base station 105-*c* and UE 115-*c* may perform a connection establishment procedure (e.g., a RRC connection establishment or reestablishment procedure) in which communications may be established and configured. At 610, the base station 105-*c* may transmit configuration information to the UE 115-*c*. Such configuration information may include, for example, configuration information for providing PA information associated with the UE 115-*c*, such as PA saturation points or related information.

At 615, the UE 115-*c* may identify different saturation points for different PAs at the UE 115-*c*. For example, the configuration information may configure codebook-based precoding for uplink transmissions, and the UE 115-*c* may have PAs in different transmit chains that have different saturation points (e.g., difference values of $P_{sat}$). For example, a first PA at the UE 115-*c* may be associated with a first RF chain and first antenna, and may have a first $P_{sat}$ of 26 dBm, and a second PA at the UE 115-*c* may be associated with a second RF chain and second antenna, and may have a second $P_{sat}$ of 23 dBm. In such examples, an equalized precoding matrix (e.g., based on each UE PA having a same $P_{sat}$) from the configured precoding codebooks may result in the first PA having a substantial backoff applied in order to provide operation of the second PA in accordance with the second $P_{sat}$. At 620, in order to inform the base station 105-*c* that the UE 115-*c* has such different saturation powers and thus that an unequalized precoding would be beneficial at the UE 115-*c*, a PA $P_{sat}$ indication may be transmitted to the base station 105-*c*.

At 625, the base station 105-*c* may transmit one or more reference signals that may be used for channel estimation. At 630, the UE 115-*c* may perform a channel measurement procedure based on the one or more reference signals (e.g., channel state information (CSI) reference signals), and may generate a measurement report (e.g., a CSI report). In some cases, the measurement report may include information related to an estimated channel between the UE 115-*c* and the base station 105-*c*, among other parameters (e.g., a rank indicator (RI), precoding matrix indicator (PMI) of an unequalized precoder, channel quality indicator (CQI), etc.). At 635, the UE 115-*c* may transmit the measurement report to the base station 105-*c*. Further, in some cases the UE 115-*c* may transmit one or more reference signals (e.g., SRSs as discussed with reference to FIG. 5), that may be used for channel measurement at the base station 105-*c*.

At 640, the base station 105-*c* may determine the effective channel matrix between the UE 115-*c* and the base station 105-*c*. At 645, the base station 105-*c* may determine a precoding matrix that is to be used for communications with the UE 115-*c* based on the unequalized $P_{sat}$ values of the UE 115-*c*, and a null space matrix. In some cases, the precoding matrix may be determined for downlink communications based on established algorithms for determining a precoder, such as a SVD or SVD-SLR techniques that take into account the unbalanced PA saturation levels. In some cases, a precoding matrix for uplink communications of the UE 115-*c* may also be identified, such as a precoding matrix that is selected from a table or a codebook (e.g., that may be signaled to the UE 115-*c* via PMI) based on the measurement report. In some cases, the base station 105-*c* may determine a precoding matrix that is an equalized precoding matrix, and the configuration information may indicate to the UE 115-*c* that the precoder may be modified based on the null space matrix (e.g., for codebook or non-codebook precoding).

At 650, the base station 105-*c* may provide an indication of the precoding matrix and optionally the null space matrix to the UE 115-*c*. In some cases, the null space matrix indication to the UE 115-*c* may be provided as a null space index that is mapped to a table or codebook of null space matrices (e.g., that is preconfigured or configured via RRC signaling). The indication of the precoding matrix to the UE 115-*c* may also be provided as a precoding matrix indicator (PMI) that is mapped to a table or codebook of precoding matrices (e.g., that is preconfigured of configured via RRC signaling). In other cases, non-codebook precoding may be used, and the UE 115-*c* may determine precoding based on channel measurements, taking into account the different PA saturation levels.

Optionally, at 655, the UE 115-*c* may determine a modified precoding matrix to be used in communications with the base station 105-*c*. The determination of the modified precoding matrix may be performed using techniques such as discussed herein, in which a redistribution matrix may be determined, and a product of the null space matrix and redistribution matrix may be applied as a linear combination with the indicated precoding matrix, which takes into account the different PA saturation levels at the UE 115-*c*. At 660, the base station 105-*c* may transmit downlink transmissions to the UE 115-*c*, and at 665 the UE 115-*c* may transmit the uplink transmission(s) to the base station 105-*c* using the determined precoding.

Figure 7:
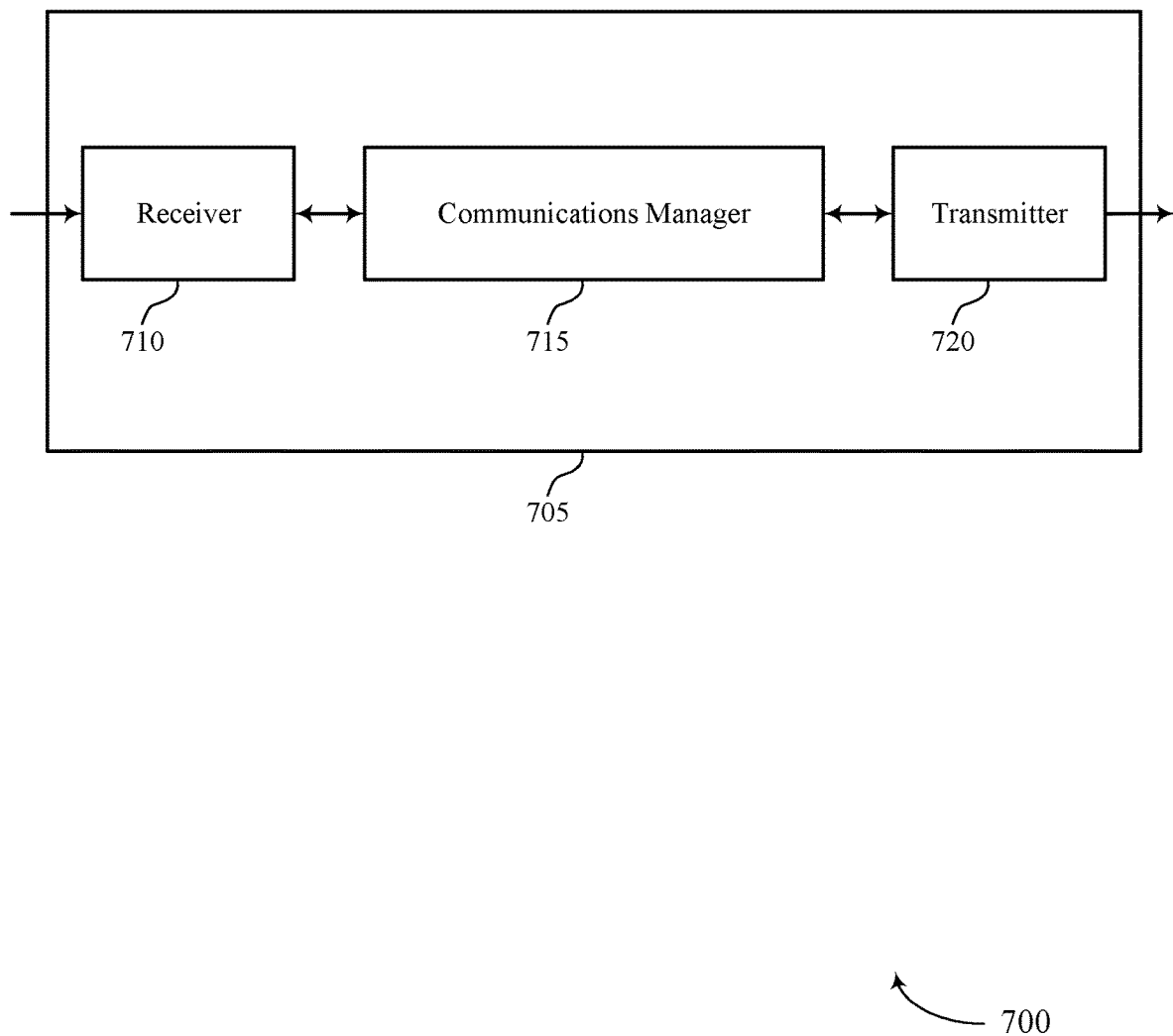
FIGS. 7 and 8 show block diagrams of devices that support precoding techniques for wireless communications in accordance with aspects of the present disclosure.

FIG. 7 shows a block diagram 700 of a device 705 that supports precoding techniques for wireless communications in accordance with aspects of the present disclosure. The device 705 may be an example of aspects of a UE 115 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to precoding techniques for wireless communications, etc.). Information may be passed on to other components of the device 705. The receiver 710 may be an example of aspects of the transceiver 1020 described with reference to FIG. 10. The receiver 710 may utilize a single antenna or a set of antennas.

In some cases, the communications manager 715 may receive, from a base station, an uplink grant that indicates a precoding matrix and a null space matrix associated with a channel between the UE and the base station, determine, based on the precoding matrix and the null space matrix, a redistribution matrix for redistribution of transmission power of an uplink communication associated with the uplink grant across a set of transmit chains of the UE, add a product of the null space matrix and the redistribution matrix to the precoding matrix to generate a modified precoding matrix, and apply the modified precoding matrix to the set of transmit chains for uplink transmission of the uplink communication to the base station. The communications manager 715 may be an example of aspects of the communications manager 1010 described herein.

In some cases, communications manager 715 may transmit, to a base station, a power amplifier saturation indication for a set of power amplifiers associated with a set of transmit chains at the UE, wherein at least one power amplifier of the set of power amplifiers has a different power amplifier saturation than one or more other power amplifiers of the set of power amplifiers, receive, from the base station, an uplink grant that indicates a precoding matrix associated with a channel between the UE and the base station, where the precoding matrix is an unbalanced precoding matrix based at least in part on the power amplifier saturation indication, and apply the precoding matrix to the set of transmit chains for uplink transmission of an uplink communication to the base station.

The communications manager 615 may as described herein be implemented to realize one or more potential advantages. One implementation may allow the device 605 to transmit using multiple transmit chains in which a variability across the multiple transmit chains is reduced relative to variability that would be present using the initial precoding matrix, which may allow for enhanced likelihood of successful communications. Further, implementations may allow the device 605 to increase signaling reliability, throughput, and user experience, while reducing overall power consumption, among other advantages.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
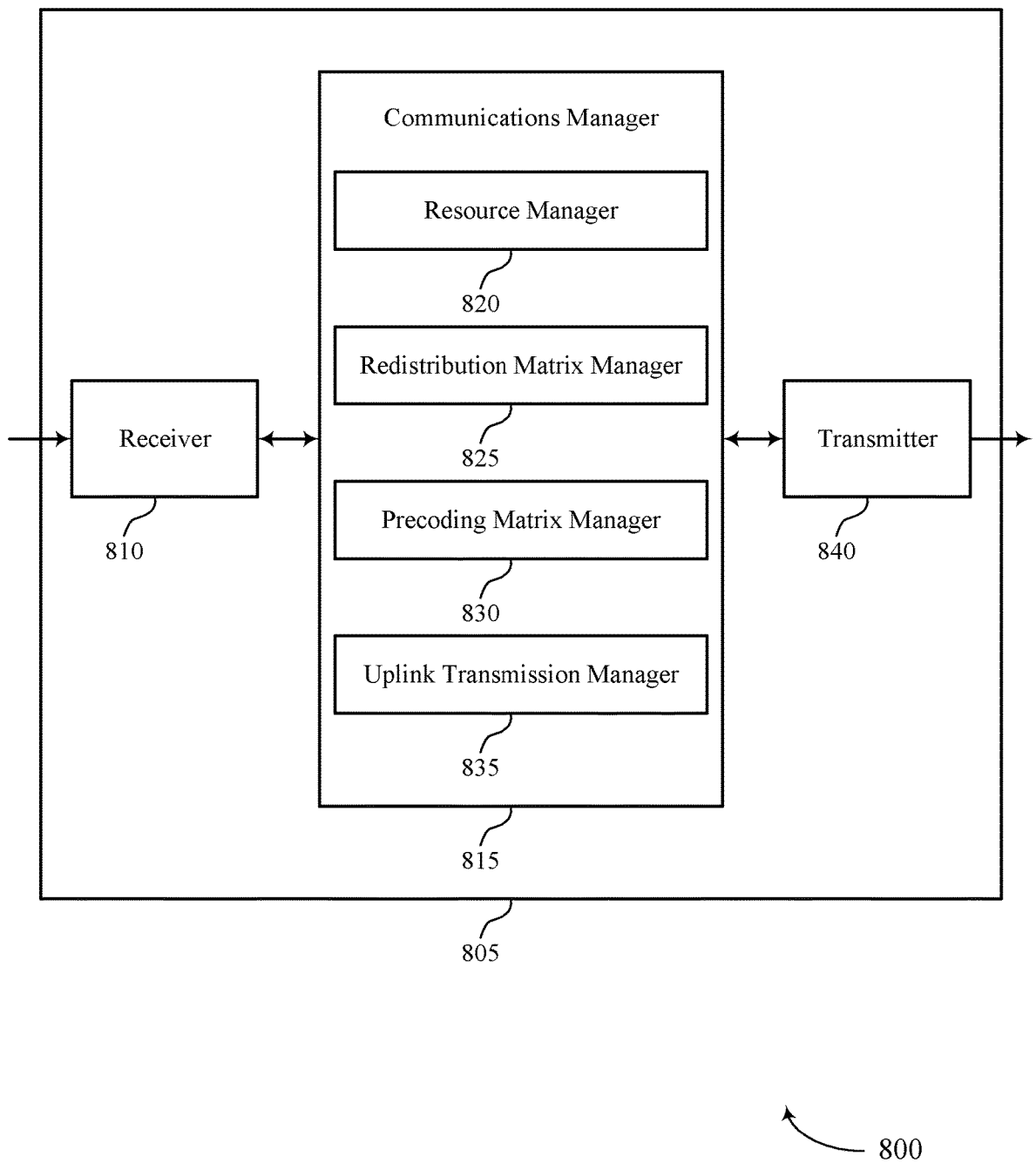

FIG. 8 shows a block diagram 800 of a device 805 that supports precoding techniques for wireless communications in accordance with aspects of the present disclosure. The device 805 may be an example of aspects of a device 705, or a UE 115 as described herein. The device 805 may include a receiver 810, a communications manager 815, and a transmitter 840. The device 805 may also include a processor. Each of these components may be in communication with one another (e.g., via one or more buses).

The receiver 810 may receive information such as packets, user data, or control information associated with various information channels (e.g., control channels, data channels, and information related to precoding techniques for wireless communications, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include a resource manager 820, a redistribution matrix manager 825, a precoding matrix manager 830, and an uplink transmission manager 835. The communications manager 815 may be an example of aspects of the communications manager 1010 described herein.

The resource manager 820 may receive, from a base station, an uplink grant that indicates a precoding matrix and a null space matrix associated with a channel between the UE and the base station.

The redistribution matrix manager 825 may determine, based on the precoding matrix and the null space matrix, a redistribution matrix for redistribution of transmission power of an uplink communication associated with the uplink grant across a set of transmit chains of the UE.

The precoding matrix manager 830 may add a product of the null space matrix and the redistribution matrix to the precoding matrix to generate a modified precoding matrix.

The uplink transmission manager 835 may apply the modified precoding matrix to the set of transmit chains for uplink transmission of the uplink communication to the base station.

The transmitter 840 may transmit signals generated by other components of the device 805. In some examples, the transmitter 840 may be collocated with a receiver 810 in a transceiver module. For example, the transmitter 840 may be an example of aspects of the transceiver 1020 described with reference to FIG. 10. The transmitter 840 may utilize a single antenna or a set of antennas.

Figure 9:
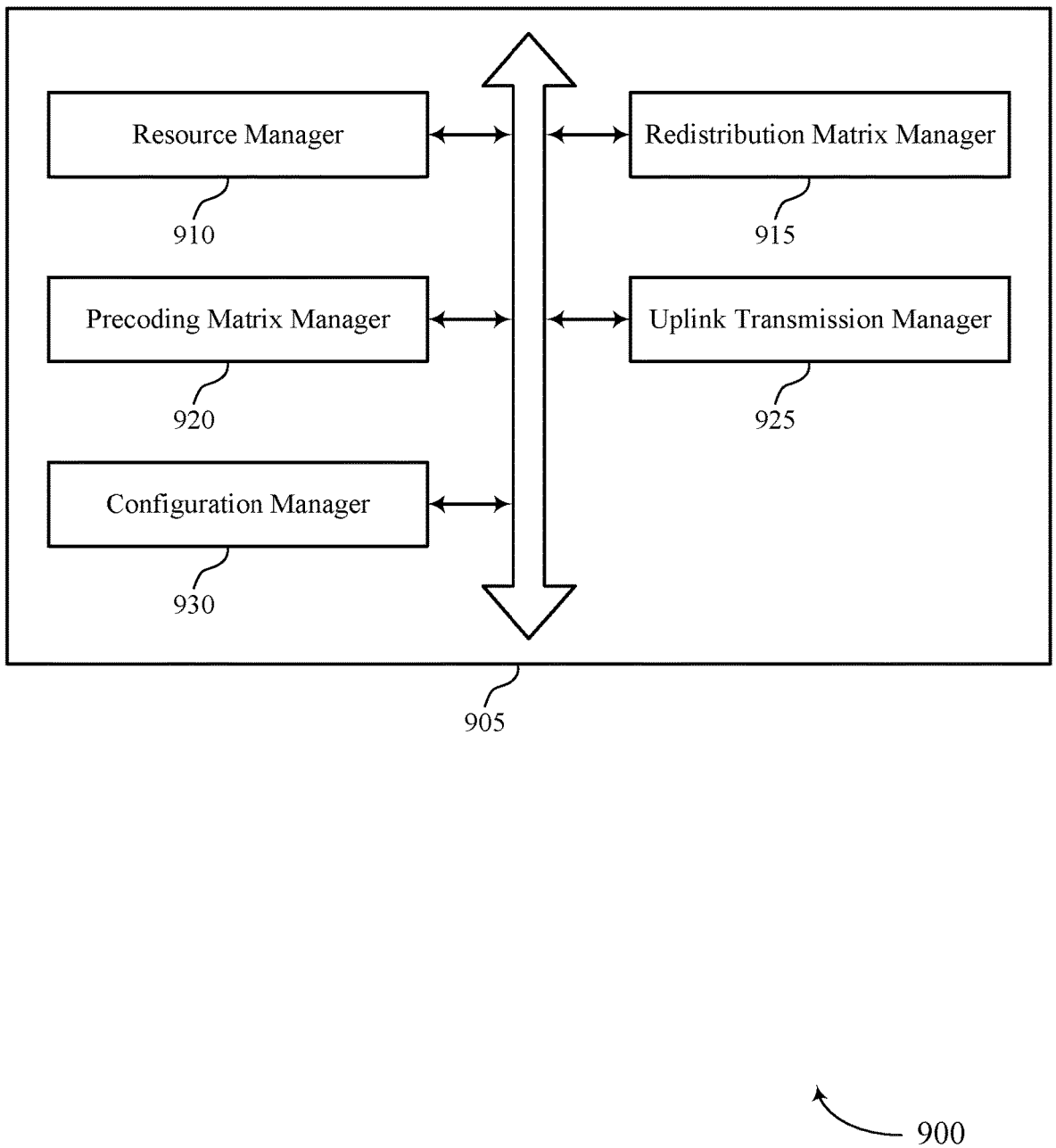
FIG. 9 shows a block diagram of a communications manager that supports precoding techniques for wireless communications in accordance with aspects of the present disclosure.

FIG. 9 shows a block diagram 900 of a communications manager 905 that supports precoding techniques for wireless communications in accordance with aspects of the present disclosure. The communications manager 905 may be an example of aspects of a communications manager 715, a communications manager 815, or a communications manager 1010 described herein. The communications manager 905 may include a resource manager 910, a redistribution matrix manager 915, a precoding matrix manager 920, an uplink transmission manager 925, and a configuration manager 930. Each of these modules may communicate, directly or indirectly, with one another (e.g., via one or more buses).

The resource manager 910 may receive, from a base station, an uplink grant that indicates a precoding matrix and a null space matrix associated with a channel between the UE and the base station.

The redistribution matrix manager 915 may determine, based on the precoding matrix and the null space matrix, a redistribution matrix for redistribution of transmission power of an uplink communication associated with the uplink grant across a set of transmit chains of the UE.

In some examples, the redistribution matrix manager 915 may perform an iterative algorithm to generate the redistribution matrix. In some examples, the redistribution matrix manager 915 may normalize each row of a set of rows of the precoding matrix to generate a set of normalized rows. In some examples, the redistribution matrix manager 915 may adjust each row of the precoding matrix based on a difference between the corresponding row of the precoding matrix and the associated normalized row to generate a set of adjusted rows. In some examples, the redistribution matrix manager 915 may evaluate a vector norm for each row of the set of adjusted row to determine if a variance of the vector norms is within a threshold variance value. In some examples, the redistribution matrix manager 915 may repeat, based on the variance of the vector norms being greater than the threshold variance value, the normalizing, adjusting, and evaluating.

In some examples, the redistribution matrix manager 915 may receive, from the base station, periodic updates to the null space matrix. In some cases, the redistribution matrix provides reduced power variance across the set of transmit chains relative to a power variance based only on the precoding matrix. In some cases, the null space matrix lies within a null space of an effective channel matrix associated with an estimated effective channel between the base station and the UE.

The precoding matrix manager 920 may add a product of the null space matrix and the redistribution matrix to the precoding matrix to generate a modified precoding matrix. In some examples, the precoding matrix manager 920 may identify a precoding matrix codebook associated with the indication of the precoding matrix, and a null space matrix codebook associated with the indication of the null space matrix. In some cases, the modified precoding matrix provides uplink transmissions that are indistinguishable at the base station from an unmodified precoding matrix.

The uplink transmission manager 925 may apply the modified precoding matrix to the set of transmit chains for uplink transmission of the uplink communication to the base station.

The configuration manager 930 may receive, from the base station, configuration information for performing power redistribution based on the null space matrix indication. In some cases, the configuration information is received in RRC signaling that configures the precoding matrix codebook and the null space matrix codebook.

Figure 10:
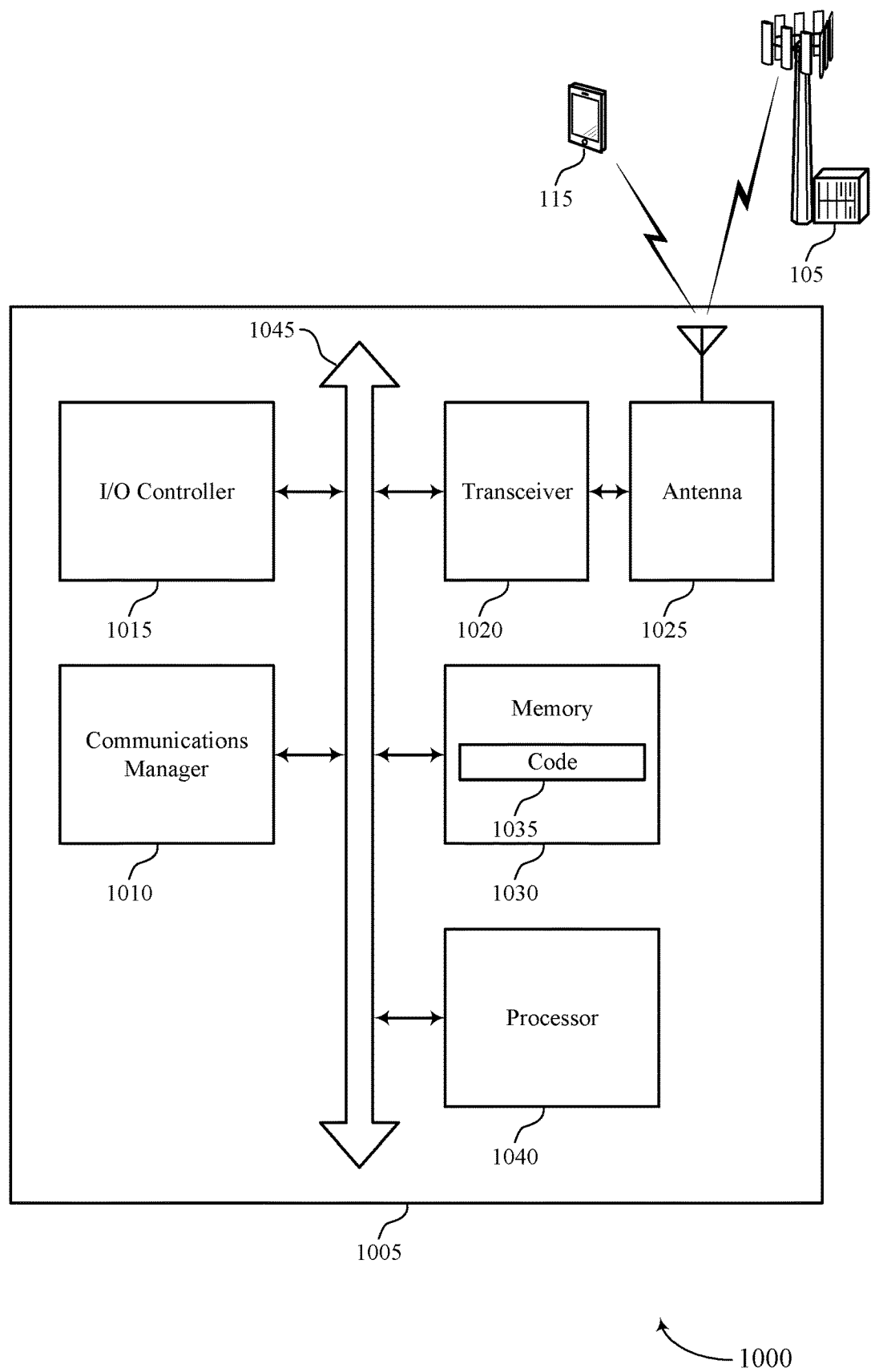
FIG. 10 shows a diagram of a system including a device that supports precoding techniques for wireless communications in accordance with aspects of the present disclosure.

FIG. 10 shows a diagram of a system 1000 including a device 1005 that supports precoding techniques for wireless communications in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

In some cases, the communications manager 1010 may receive, from a base station, an uplink grant that indicates a precoding matrix and a null space matrix associated with a channel between the UE and the base station, determine, based on the precoding matrix and the null space matrix, a redistribution matrix for redistribution of transmission power of an uplink communication associated with the uplink grant across a set of transmit chains of the UE, add a product of the null space matrix and the redistribution matrix to the precoding matrix to generate a modified precoding matrix, and apply the modified precoding matrix to the set of transmit chains for uplink transmission of the uplink communication to the base station.

In some cases, communications manager 1010 may transmit, to a base station, a power amplifier saturation indication for a set of power amplifiers associated with a set of transmit chains at the UE, wherein at least one power amplifier of the set of power amplifiers has a different power amplifier saturation than one or more other power amplifiers of the set of power amplifiers, receive, from the base station, an uplink grant that indicates a precoding matrix associated with a channel between the UE and the base station, where the precoding matrix is an unbalanced precoding matrix based at least in part on the power amplifier saturation indication, and apply the precoding matrix to the set of transmit chains for uplink transmission of an uplink communication to the base station.

The communications manager 1010 may as described herein be implemented to realize one or more potential advantages. One implementation may allow the device 1005 to transmit using multiple transmit chains in which a variability across the multiple transmit chains is reduced relative to variability that would be present using the initial precoding matrix, which may allow for enhanced likelihood of successful communications. Further, implementations may allow the device 1005 to increase signaling reliability, throughput, and user experience, while reducing overall power consumption, among other advantages.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include RAM and ROM. The memory 1030 may store computer-readable, computer-executable code 1035 including instructions that, when executed, cause the processor to perform various functions described herein. In some cases, the memory 1030 may contain, among other things, a BIOS which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting precoding techniques for wireless communications).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
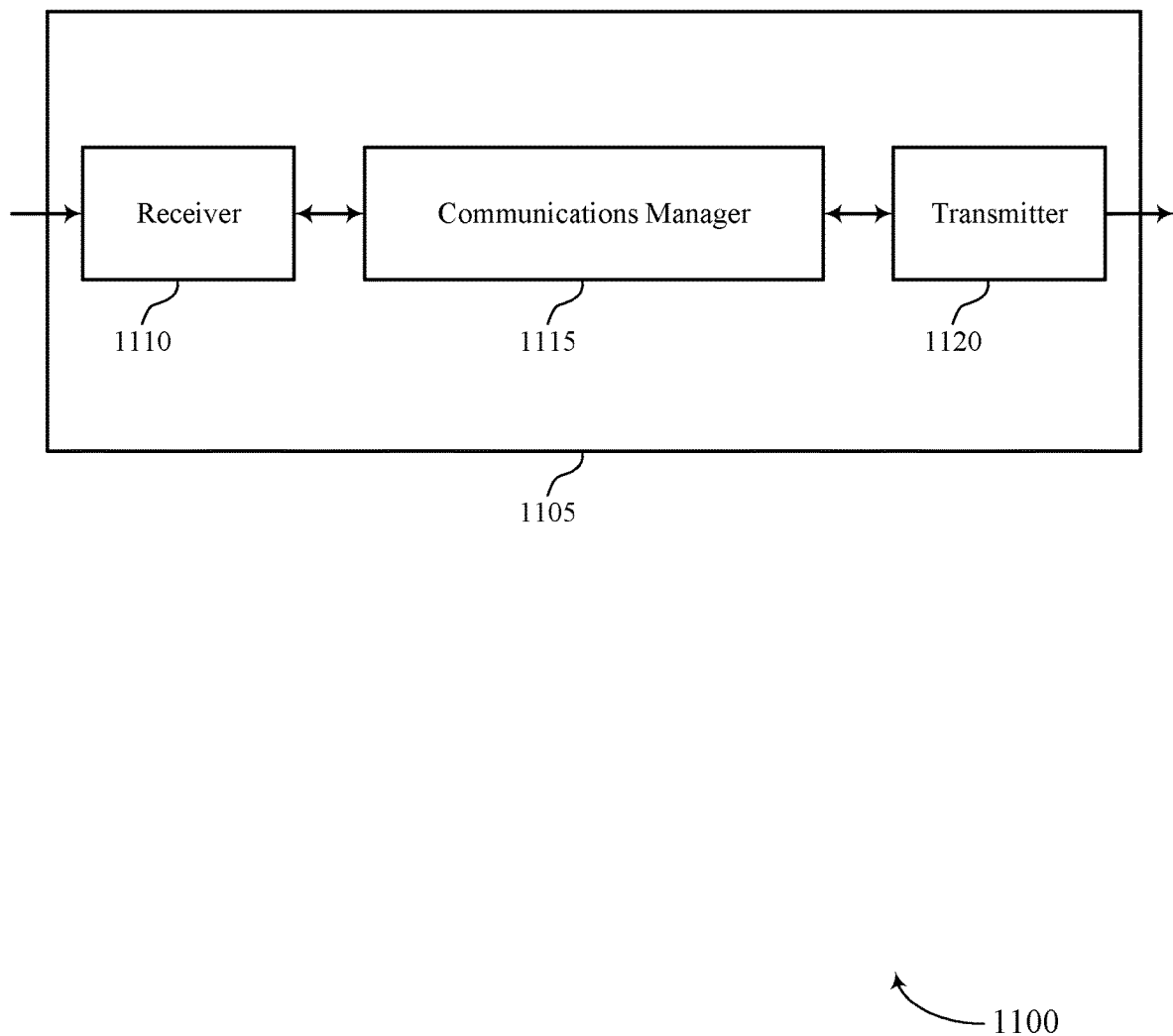
FIGS. 11 and 12 show block diagrams of devices that support precoding techniques for wireless communications in accordance with aspects of the present disclosure.

FIG. 11 shows a block diagram 1100 of a device 1105 that supports precoding techniques for wireless communications in accordance with aspects of the present disclosure. The device 1105 may be an example of aspects of a UE 115 or base station 105 as described herein. The device 1105 may include a receiver 1110, a communications manager 1115, and a transmitter 1120. The device 1105 may also include a processor. Each of these components may be in communication with one another (e.g., via one or more buses).

Receiver 1110 may receive information such as packets, user data, or control information associated with various information channels (e.g., control channels, data channels, and information related to precoding techniques for wireless communications, etc.). Information may be passed on to other components of the device 1105. The receiver 1110 may be an example of aspects of the transceiver 1420 or 1520 as described with reference to FIGS. 14 and 15. The receiver 1110 may utilize a single antenna or a set of antennas.

The communications manager 1115 may identify an estimated channel matrix for a wireless communication with a receiving device, determine, based on the estimated channel matrix, an initial precoding matrix for the receiving device and a null space matrix for the receiving device, determine, based on the initial precoding matrix and the null space matrix, a redistribution matrix that distributes transmission power of the wireless communication across a set of transmit chains of the transmitting device, add a product of the redistribution matrix and the null space matrix to the initial precoding matrix to generate a modified precoding matrix, apply the modified precoding matrix to the set of transmit chains for transmission of the wireless communication to the receiving device, and transmit, responsive to the applying, the wireless communication to the receiving device. The communications manager 1115 may be an example of aspects of the communications manager 1410 or 1510 as described herein.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 or 1520 as described with reference to FIGS. 14 and 15. The transmitter 1120 may utilize a single antenna or a set of antennas.

Figure 12:
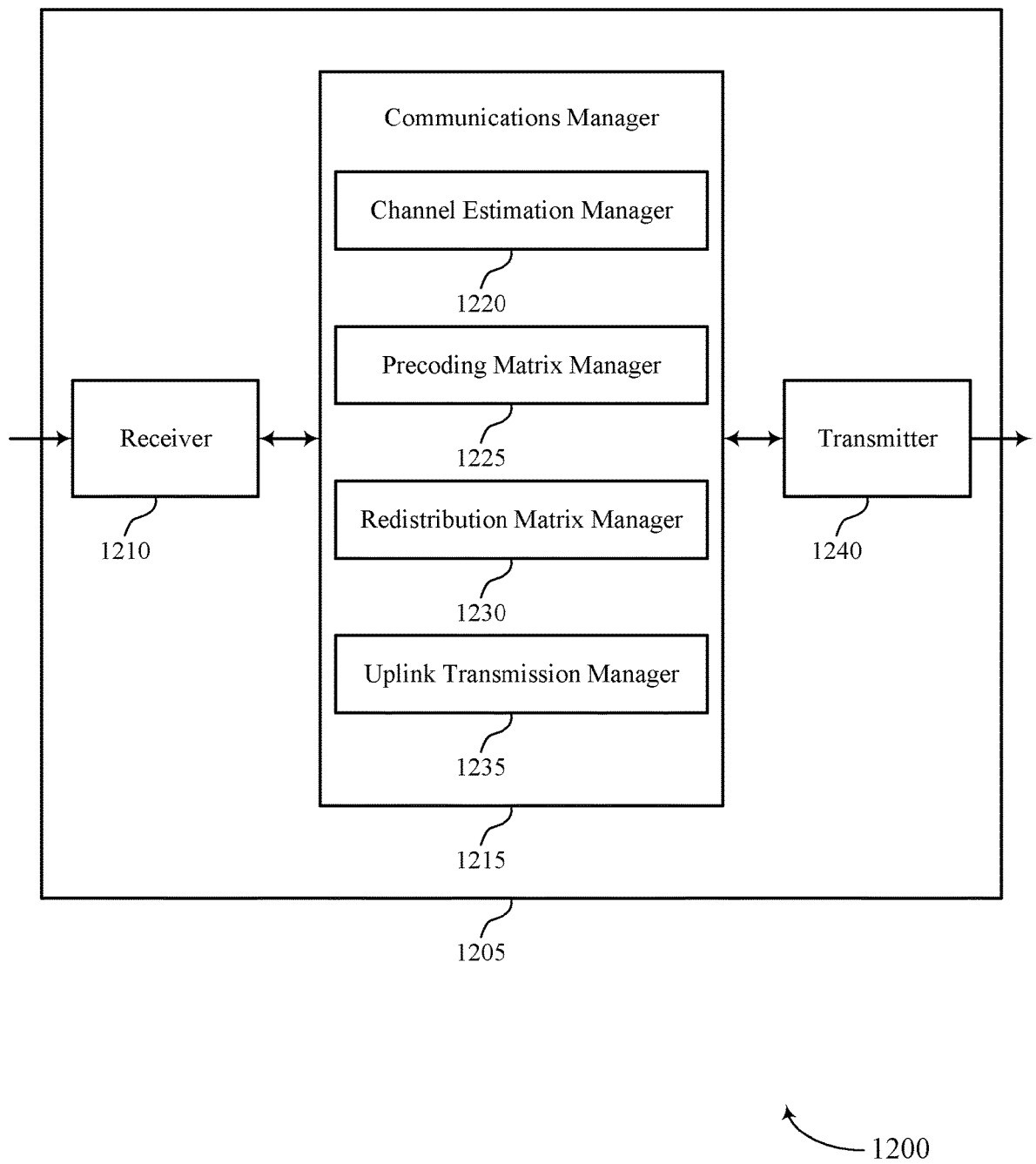

FIG. 12 shows a block diagram 1200 of a device 1205 that supports precoding techniques for wireless communications in accordance with aspects of the present disclosure. The device 1205 may be an example of aspects of a device 1105, a UE 115, or a base station 105 as described herein. The device 1205 may include a receiver 1210, a communications manager 1215, and a transmitter 1240. The device 1205 may also include a processor. Each of these components may be in communication with one another (e.g., via one or more buses).

Receiver 1210 may receive information such as packets, user data, or control information associated with various information channels (e.g., control channels, data channels, and information related to precoding techniques for wireless communications, etc.). Information may be passed on to other components of the device 1205. The receiver 1210 may be an example of aspects of the transceiver 1420 or 1520 as described with reference to FIGS. 14 and 15. The receiver 1210 may utilize a single antenna or a set of antennas.

The communications manager 1215 may be an example of aspects of the communications manager 1115 as described herein. The communications manager 1215 may include a channel estimation manager 1220, a precoding matrix manager 1225, a redistribution matrix manager 1230, and an uplink transmission manager 1235. The communications manager 1215 may be an example of aspects of the communications manager 1410 or 1510 as described herein.

The channel estimation manager 1220 may identify an estimated channel matrix for a wireless communication with a receiving device.

The precoding matrix manager 1225 may determine, based on the estimated channel matrix, an initial precoding matrix for the receiving device and a null space matrix for the receiving device.

The redistribution matrix manager 1230 may determine, based on the initial precoding matrix and the null space matrix, a redistribution matrix that distributes transmission power of the wireless communication across a set of transmit chains of the transmitting device, add a product of the redistribution matrix and the null space matrix to the initial precoding matrix to generate a modified precoding matrix, and apply the modified precoding matrix to the set of transmit chains for transmission of the wireless communication to the receiving device.

The uplink transmission manager 1235 may transmit, responsive to the applying, the wireless communication to the receiving device.

Transmitter 1240 may transmit signals generated by other components of the device 1205. In some examples, the transmitter 1240 may be collocated with a receiver 1210 in a transceiver module. For example, the transmitter 1240 may be an example of aspects of the transceiver 1420 or 1520 as described with reference to FIGS. 14 and 15. The transmitter 1240 may utilize a single antenna or a set of antennas.

Figure 13:
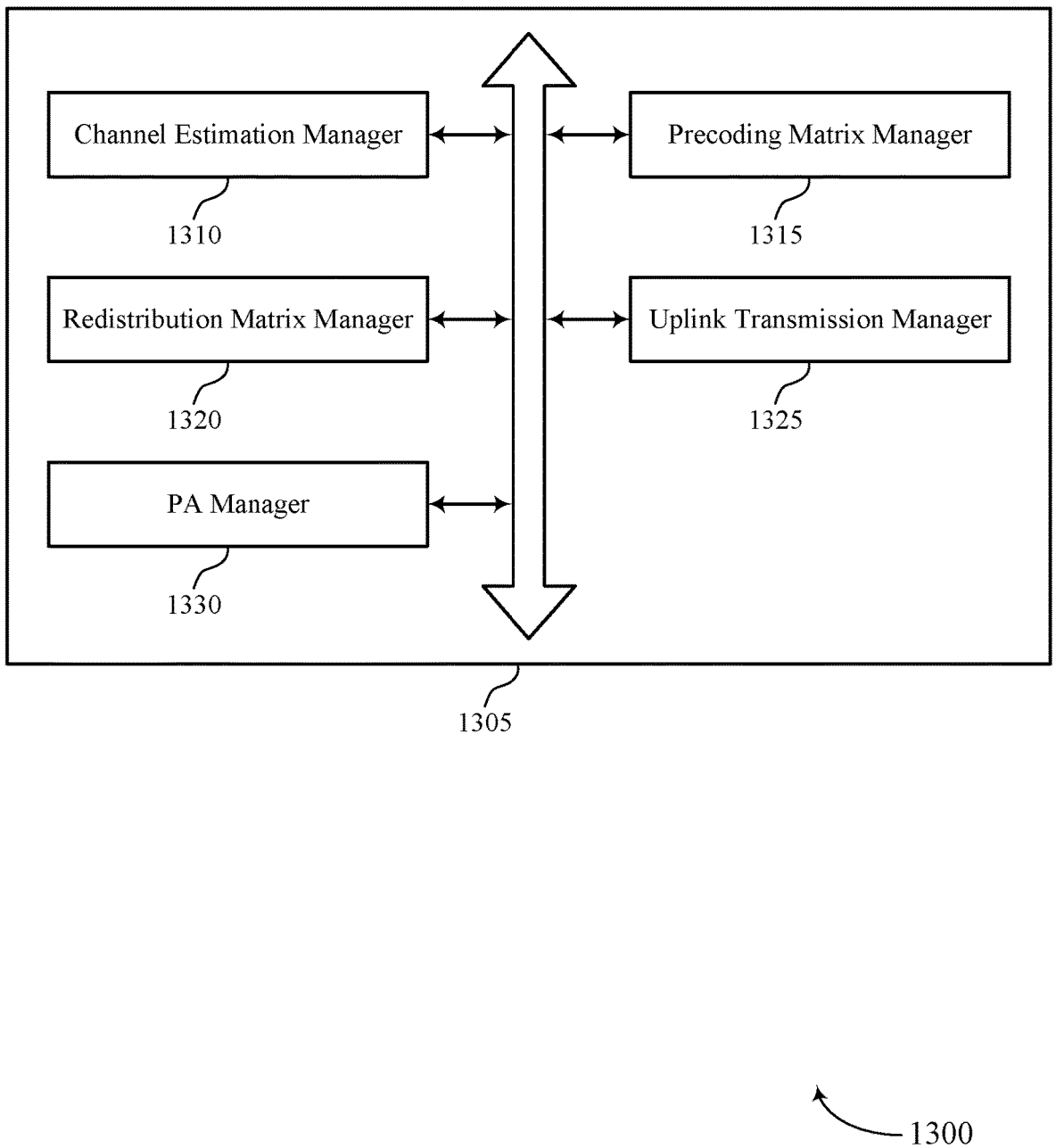
FIG. 13 shows a block diagram of a communications manager that supports precoding techniques for wireless communications in accordance with aspects of the present disclosure.

FIG. 13 shows a block diagram 1300 of a communications manager 1305 that supports precoding techniques for wireless communications in accordance with aspects of the present disclosure. The communications manager 1305 may be an example of aspects of a communications manager 1115, a communications manager 1215, or a communications manager 1410 described herein. The communications manager 1305 may include a channel estimation manager 1310, a precoding matrix manager 1315, a redistribution matrix manager 1320, an uplink transmission manager 1325, and a PA manager 1330. Each of these modules may communicate, directly or indirectly, with one another (e.g., via one or more buses).

The channel estimation manager 1310 may identify an estimated channel matrix for a wireless communication with a receiving device.

The precoding matrix manager 1315 may determine, based on the estimated channel matrix, an initial precoding matrix for the receiving device and a null space matrix for the receiving device.

The redistribution matrix manager 1320 may determine, based on the initial precoding matrix and the null space matrix, a redistribution matrix that distributes transmission power of the wireless communication across a set of transmit chains of the transmitting device. In some examples, the redistribution matrix manager 1320 may add a product of the redistribution matrix and the null space matrix to the initial precoding matrix to generate a modified precoding matrix. In some examples, the redistribution matrix manager 1320 may apply the modified precoding matrix to the set of transmit chains for transmission of the wireless communication to the receiving device.

In some examples, the redistribution matrix manager 1320 may perform an iterative algorithm to generate the redistribution matrix. In some examples, the redistribution matrix manager 1320 may normalize each row of a set of rows of the initial precoding matrix to generate a set of normalized rows. In some examples, the redistribution matrix manager 1320 may adjust each row of the initial precoding matrix based on a difference between the corresponding row of the initial precoding matrix and the associated normalized row to generate a set of adjusted rows. In some examples, the redistribution matrix manager 1320 may apply the set of adjusted rows to the null space matrix that is based on the estimated channel matrix and a pseudo-inverse of the estimated channel matrix to generate the modified precoding matrix. In some examples, the redistribution matrix manager 1320 may evaluate a vector norm for each row of the modified precoding matrix to determine if a variance of the vector norms is within a threshold variance value. In some examples, the redistribution matrix manager 1320 may repeat, based on the variance of the vector norms being greater than the threshold variance value, the normalizing, adjusting, applying, and evaluating.

In some cases, the product of the redistribution matrix and the null space matrix is within a null space of the channel estimation matrix. In some cases, the redistribution matrix provides reduced power variance across the set of transmit chains relative to a power variance based only on the initial precoding matrix. In some cases, the redistribution matrix is selected to provide a variability in norms across a set of rows of the modified precoding matrix that is less than a variability threshold. In some cases, the redistribution matrix is selected to provide a maximum norm across a set of rows of the modified precoding matrix that is less than a maximum norm threshold.

In some cases, the redistribution matrix is determined based on a convex optimization problem that provides, relative to the initial precoding matrix, a reduced maximum energy value for each row of the modified precoding matrix, or a reduced amount of variance for each row of the modified precoding matrix. In some cases, the redistribution matrix provides a data-independent modification of the initial precoding matrix.

The uplink transmission manager 1325 may transmit, responsive to the applying, the wireless communication to the receiving device.

The PA manager 1330 may set gains for one or more PAs based on an IBO. In some cases, the redistribution matrix provides a similar power amplifier backoff parameter for each of the set of transmit chains.

Figure 14:
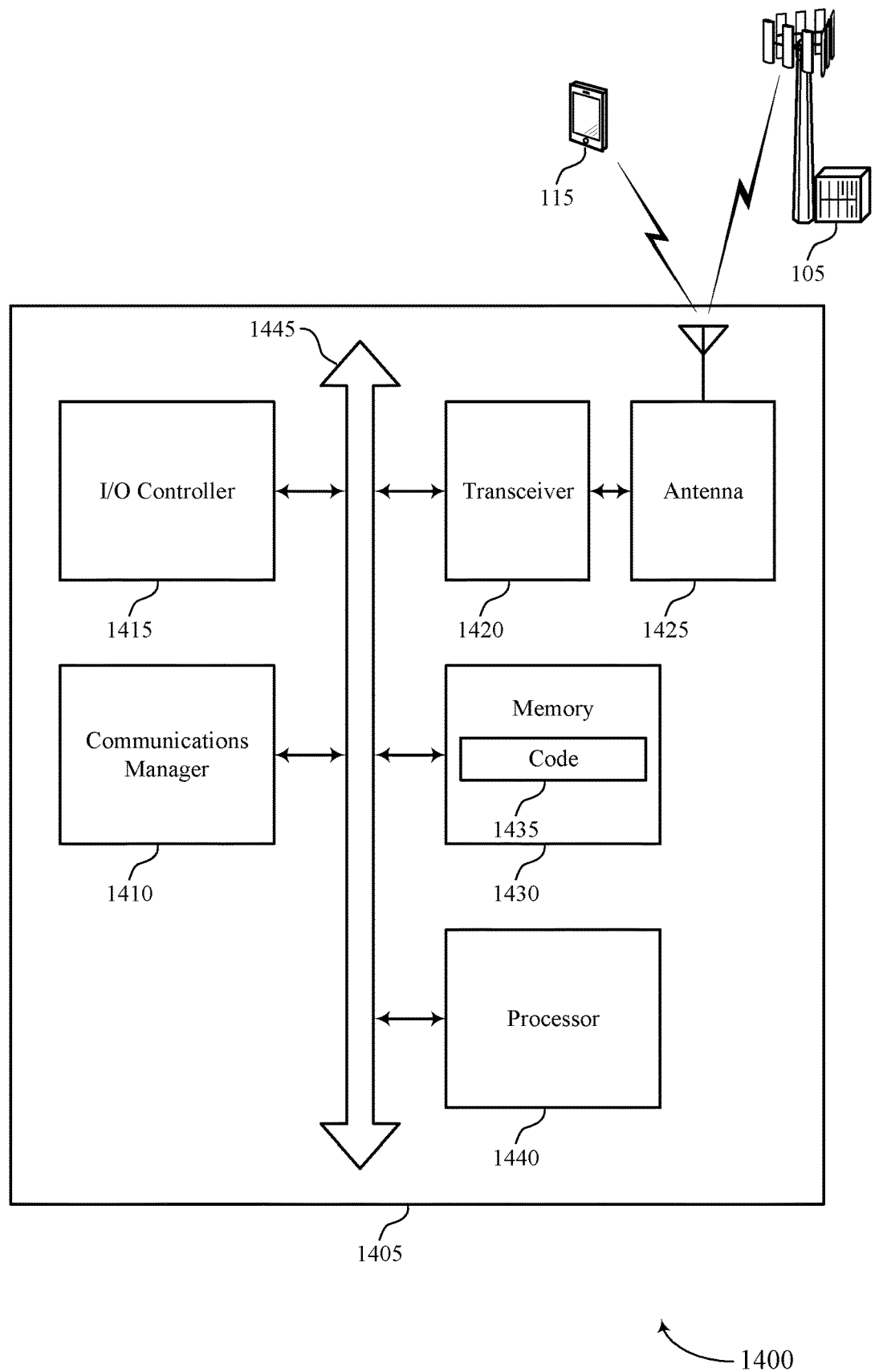
FIG. 14 shows a diagram of a system including a user equipment (UE) that supports precoding techniques for wireless communications in accordance with aspects of the present disclosure.

FIG. 14 shows a diagram of a system 1400 including a device 1405 that supports precoding techniques for wireless communications in accordance with aspects of the present disclosure. The device 1405 may be an example of or include the components of device 1105, device 1205, or a UE 115 as described herein. The device 1405 may include components for bi-directional voice and data communications including components for transmitting and receiving communications, including a communications manager 1410, a transceiver 1420, an antenna 1425, memory 1430, a processor 1440, and an I/O controller 1415. These components may be in electronic communication via one or more buses (e.g., bus 1445).

The communications manager 1410 may identify an estimated channel matrix for a wireless communication with a receiving device, determine, based on the estimated channel matrix, an initial precoding matrix for the receiving device and a null space matrix for the receiving device, determine, based on the initial precoding matrix and the null space matrix, a redistribution matrix that distributes transmission power of the wireless communication across a set of transmit chains of the transmitting device, add a product of the redistribution matrix and the null space matrix to the initial precoding matrix to generate a modified precoding matrix, apply the modified precoding matrix to the set of transmit chains for transmission of the wireless communication to the receiving device, and transmit, responsive to the applying, the wireless communication to the receiving device.

Transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof).

In some cases, the processor 1440 may be configured to operate a memory array using a memory controller. In other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting precoding techniques for wireless communications).

The I/O controller 1415 may manage input and output signals for the device 1405. The I/O controller 1415 may also manage peripherals not integrated into the device 1405. In some cases, the I/O controller 1415 may represent a physical connection or port to an external peripheral. In some cases, the I/O controller 1415 may utilize an operating system such as iOS®, ANDROID®, MS-DOS®, MS-WINDOWS®, OS/2®, UNIX®, LINUX®, or another known operating system. In other cases, the I/O controller 1415 may represent or interact with a modem, a keyboard, a mouse, a touchscreen, or a similar device. In some cases, the I/O controller 1415 may be implemented as part of a processor. In some cases, a user may interact with the device 1405 via the I/O controller 1415 or via hardware components controlled by the I/O controller 1415.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
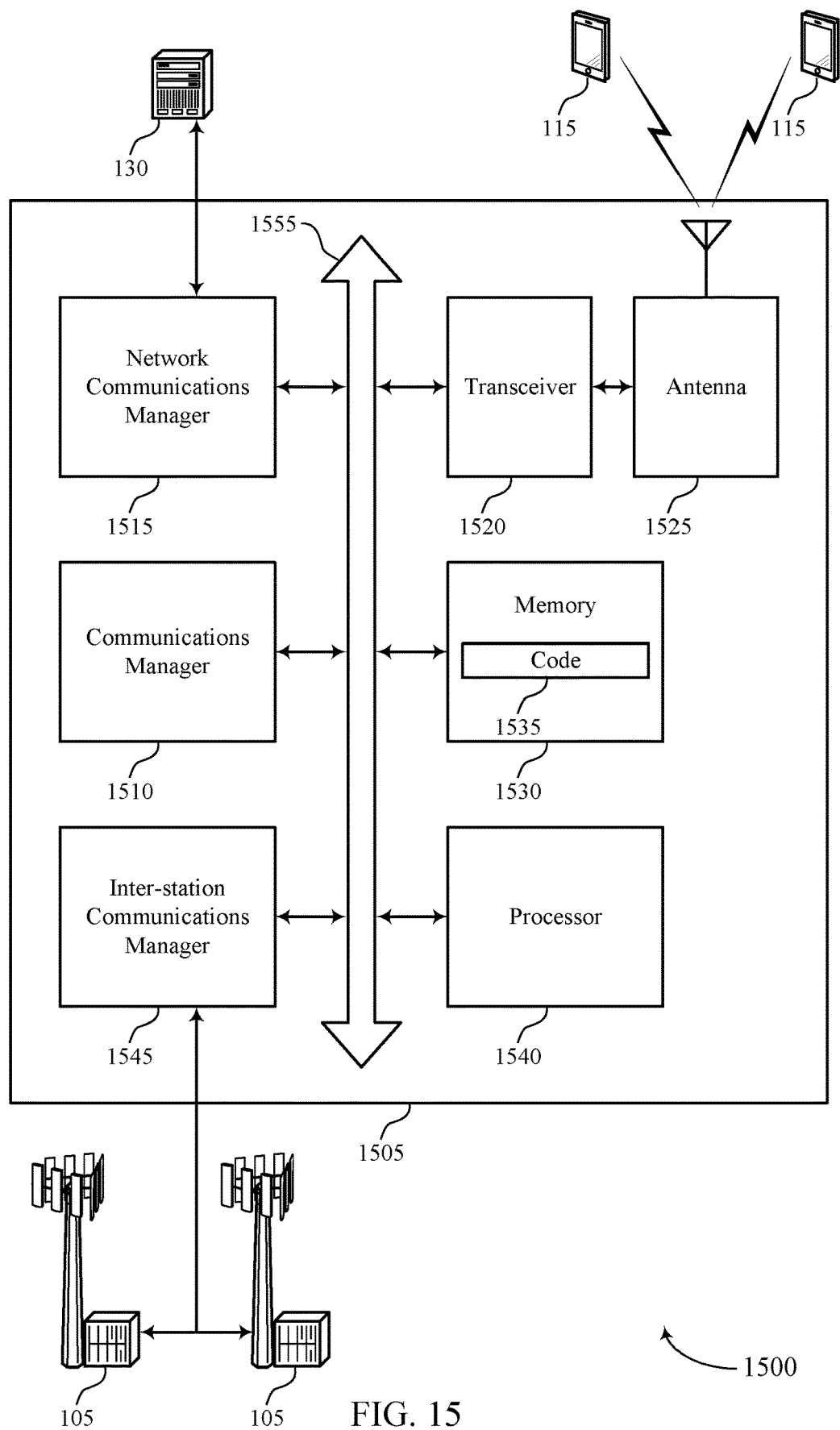
FIG. 15 shows a diagram of a system including a base station that supports precoding techniques for wireless communications in accordance with aspects of the present disclosure.

FIG. 15 shows a diagram of a system 1500 including a device 1505 that supports precoding techniques for wireless communications in accordance with aspects of the present disclosure. The device 1505 may be an example of or include the components of device 1105, device 1205, or a base station 105 as described herein. The device 1505 may include components for bi-directional voice and data communications including components for transmitting and receiving communications, including a communications manager 1510, a network communications manager 1550, a transceiver 1520, an antenna 1525, memory 1530, a processor 1540, and an inter-station communications manager 1555. These components may be in electronic communication via one or more buses (e.g., bus 1545).

The communications manager 1510 may identify an estimated channel matrix for a wireless communication with a receiving device, determine, based on the estimated channel matrix, an initial precoding matrix for the receiving device and a null space matrix for the receiving device, determine, based on the initial precoding matrix and the null space matrix, a redistribution matrix that distributes transmission power of the wireless communication across a set of transmit chains of the transmitting device, add a product of the redistribution matrix and the null space matrix to the initial precoding matrix to generate a modified precoding matrix, apply the modified precoding matrix to the set of transmit chains for transmission of the wireless communication to the receiving device, and transmit, responsive to the applying, the wireless communication to the receiving device.

Network communications manager 1550 may manage communications with the core network (e.g., via one or more wired backhaul links). For example, the network communications manager 1550 may manage the transfer of data communications for client devices, such as one or more UEs 115.

Transceiver 1520 may communicate bi-directionally, via one or more antennas, wired, or wireless links as described above. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include RAM, ROM, or a combination thereof. The memory 1530 may store computer-readable code 1535 including instructions that, when executed by a processor (e.g., the processor 1540) cause the device to perform various functions described herein. In some cases, the memory 1530 may contain, among other things, a BIOS which may control basic hardware or software operation such as the interaction with peripheral components or devices.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In other cases, a memory controller may be integrated into the processor 1540. The processor 1540 may be configured to execute computer-readable instructions stored in a memory (e.g., the memory 1530) to cause the device 1505 to perform various functions (e.g., functions or tasks supporting precoding techniques for wireless communications).

Inter-station communications manager 1555 may manage communications with other base station 105, and may include a controller or scheduler for controlling communications with UEs 115 in cooperation with other base stations 105. For example, the inter-station communications manager 1555 may coordinate scheduling for transmissions to UEs 115 for various interference mitigation techniques such as beamforming or joint transmission. In some examples, inter-station communications manager 1555 may provide an X2 interface within an LTE/LTE-A wireless communication network technology to provide communication between base stations 105.

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

Figure 16:
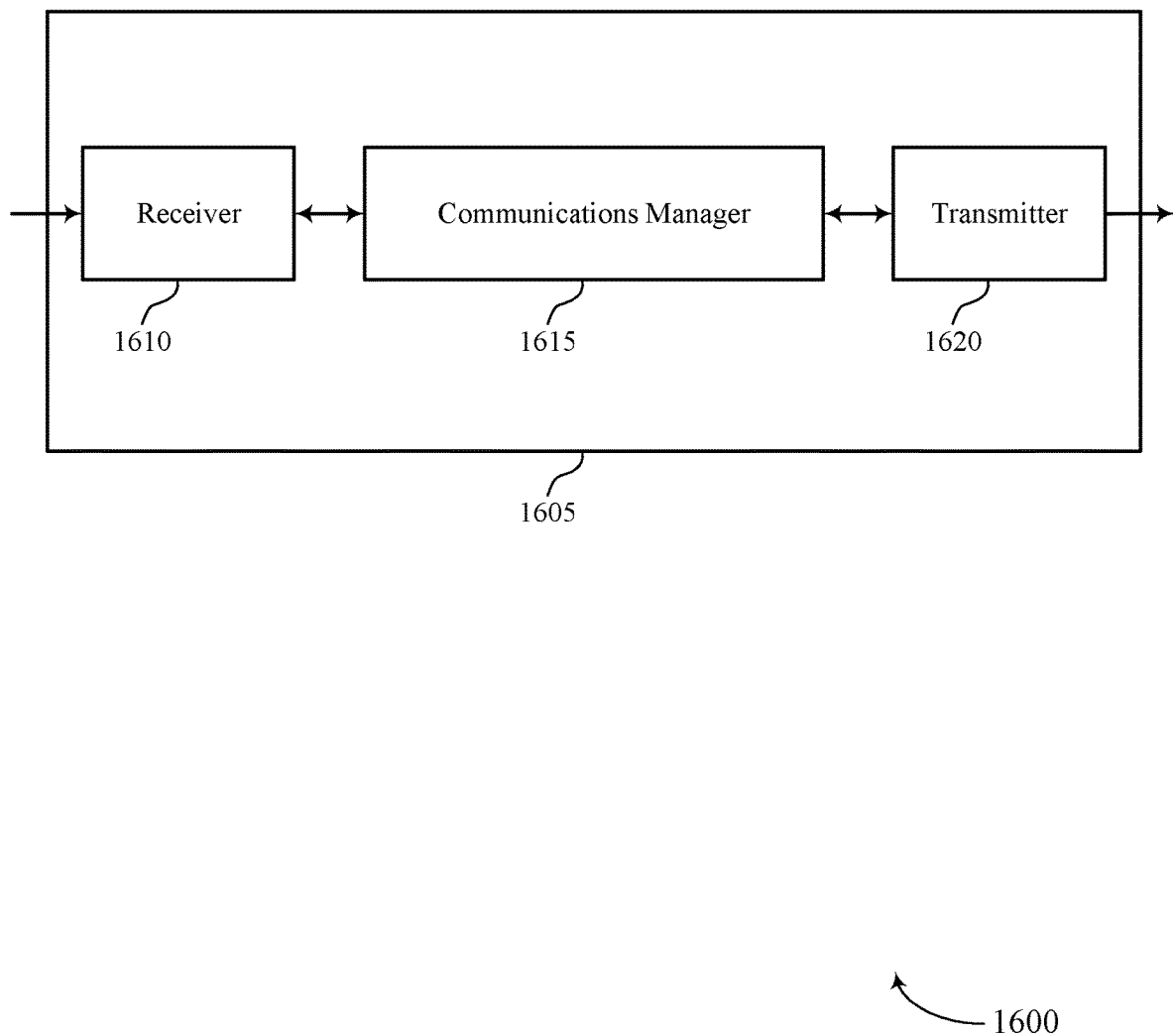
FIGS. 16 and 17 show block diagrams of devices that support precoding techniques for wireless communications in accordance with aspects of the present disclosure.

FIG. 16 shows a block diagram 1600 of a device 1605 that supports precoding techniques for wireless communications in accordance with aspects of the present disclosure. The device 1605 may be an example of aspects of a base station 105 as described herein. The device 1605 may include a receiver 1610, a communications manager 1615, and a transmitter 1620. The device 1605 may also include a processor. Each of these components may be in communication with one another (e.g., via one or more buses).

The receiver 1610 may receive information such as packets, user data, or control information associated with various information channels (e.g., control channels, data channels, and information related to precoding techniques for wireless communications, etc.). Information may be passed on to other components of the device 1605. The receiver 1610 may be an example of aspects of the transceiver 1920 described with reference to FIG. 19. The receiver 1610 may utilize a single antenna or a set of antennas.

The communications manager 1615 may determine, based on an estimated channel between the base station and a UE, a precoding matrix for communications with the UE and a null space matrix that represents a null space of the estimated channel, transmit, to the UE, an uplink grant that includes a precoding matrix indication that identifies the precoding matrix and a null space matrix indication that identifies the null space matrix, and receive an uplink communication from the UE responsive to the uplink grant. The communications manager 1615 may be an example of aspects of the communications manager 1910 described herein.

The communications manager 1615, or its sub-components, may be implemented in hardware, code (e.g., software or firmware) executed by a processor, or any combination thereof. If implemented in code executed by a processor, the functions of the communications manager 1615, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1615, or its sub-components, may be physically located at various positions, including being distributed such that portions of functions are implemented at different physical locations by one or more physical components. In some examples, the communications manager 1615, or its sub-components, may be a separate and distinct component in accordance with various aspects of the present disclosure. In some examples, the communications manager 1615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1620 may transmit signals generated by other components of the device 1605. In some examples, the transmitter 1620 may be collocated with a receiver 1610 in a transceiver module. For example, the transmitter 1620 may be an example of aspects of the transceiver 1920 described with reference to FIG. 19. The transmitter 1620 may utilize a single antenna or a set of antennas.

Figure 17:
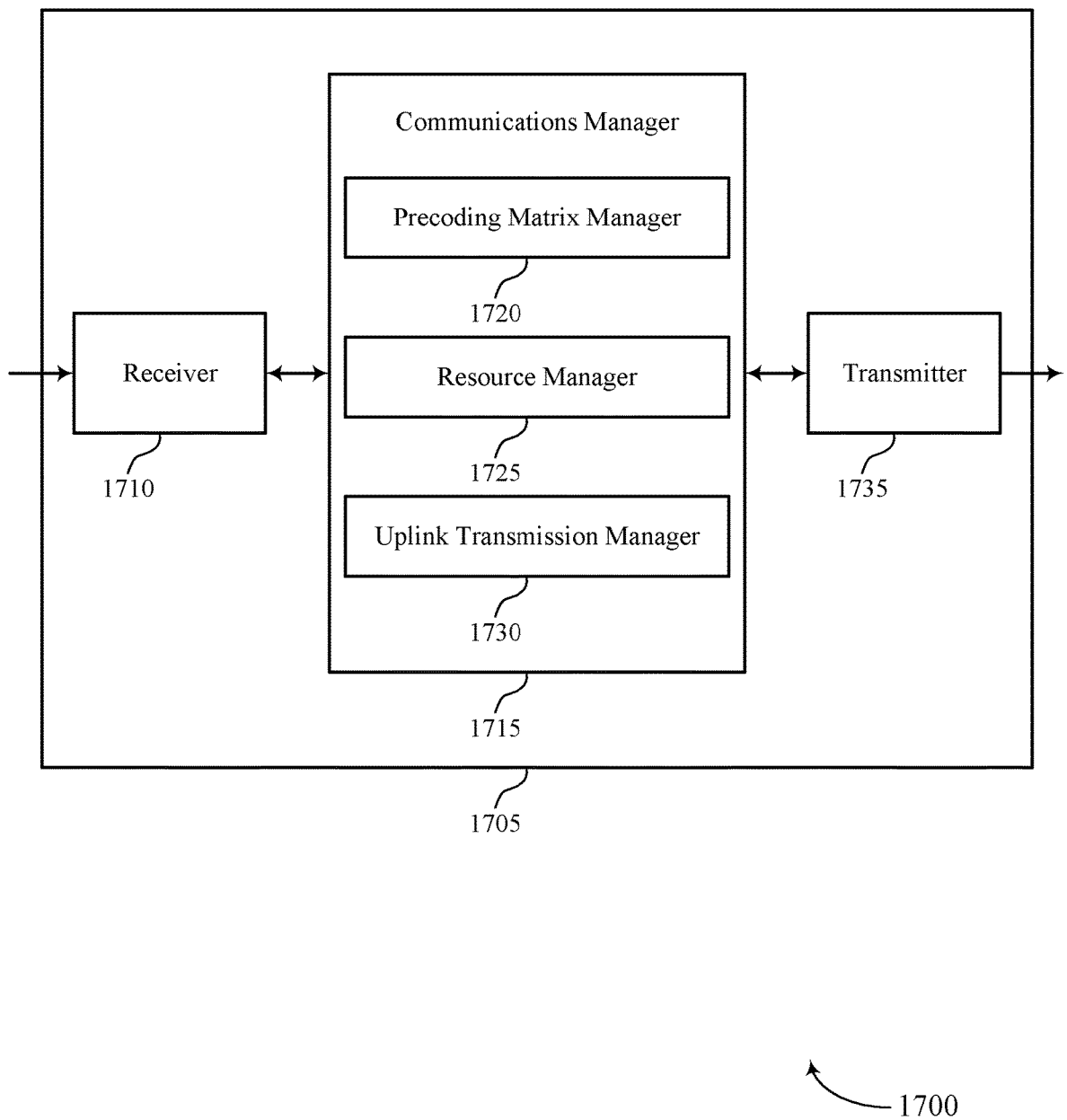

FIG. 17 shows a block diagram 1700 of a device 1705 that supports precoding techniques for wireless communications in accordance with aspects of the present disclosure. The device 1705 may be an example of aspects of a device 1605, or a base station 105 as described herein. The device 1705 may include a receiver 1710, a communications manager 1715, and a transmitter 1735. The device 1705 may also include a processor. Each of these components may be in communication with one another (e.g., via one or more buses).

The receiver 1710 may receive information such as packets, user data, or control information associated with various information channels (e.g., control channels, data channels, and information related to precoding techniques for wireless communications, etc.). Information may be passed on to other components of the device 1705. The receiver 1710 may be an example of aspects of the transceiver 1920 described with reference to FIG. 19. The receiver 1710 may utilize a single antenna or a set of antennas.

The communications manager 1715 may be an example of aspects of the communications manager 1615 as described herein. The communications manager 1715 may include a precoding matrix manager 1720, a resource manager 1725, and an uplink transmission manager 1730. The communications manager 1715 may be an example of aspects of the communications manager 1910 described herein.

The precoding matrix manager 1720 may determine, based on an estimated channel between the base station and a UE, a precoding matrix for communications with the UE and a null space matrix that represents a null space of the estimated channel.

The resource manager 1725 may transmit, to the UE, an uplink grant that includes a precoding matrix indication that identifies the precoding matrix and a null space matrix indication that identifies the null space matrix.

The uplink transmission manager 1730 may receive an uplink communication from the UE responsive to the uplink grant.

The transmitter 1735 may transmit signals generated by other components of the device 1705. In some examples, the transmitter 1735 may be collocated with a receiver 1710 in a transceiver module. For example, the transmitter 1735 may be an example of aspects of the transceiver 1920 described with reference to FIG. 19. The transmitter 1735 may utilize a single antenna or a set of antennas.

Figure 18:
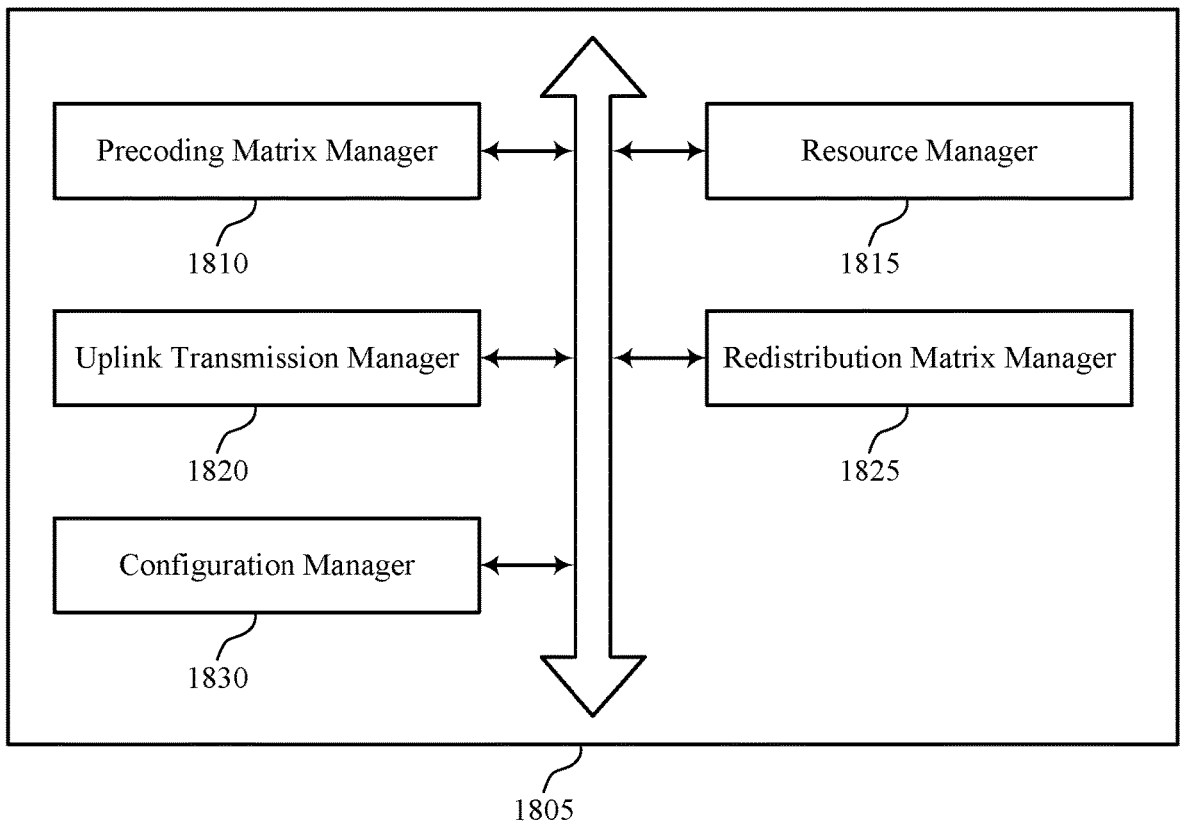
FIG. 18 shows a block diagram of a communications manager that supports precoding techniques for wireless communications in accordance with aspects of the present disclosure.

FIG. 18 shows a block diagram 1800 of a communications manager 1805 that supports precoding techniques for wireless communications in accordance with aspects of the present disclosure. The communications manager 1805 may be an example of aspects of a communications manager 1615, a communications manager 1715, or a communications manager 1910 described herein. The communications manager 1805 may include a precoding matrix manager 1810, a resource manager 1815, an uplink transmission manager 1820, a redistribution matrix manager 1825, and a configuration manager 1830. Each of these modules may communicate, directly or indirectly, with one another (e.g., via one or more buses).

The precoding matrix manager 1810 may determine, based on an estimated channel between the base station and a UE, a precoding matrix for communications with the UE and a null space matrix that represents a null space of the estimated channel.

The resource manager 1815 may transmit, to the UE, an uplink grant that includes a precoding matrix indication that identifies the precoding matrix and a null space matrix indication that identifies the null space matrix.

The uplink transmission manager 1820 may receive an uplink communication from the UE responsive to the uplink grant.

The redistribution matrix manager 1825 may determine, based on the precoding matrix and the null space matrix, a redistribution matrix that distributes transmission power of a downlink communication to the UE across a set of transmit chains of the base station. In some examples, the redistribution matrix manager 1825 may add a product of the null space matrix and the redistribution matrix to the precoding matrix to generate a modified precoding matrix. In some examples, the redistribution matrix manager 1825 may apply the modified precoding matrix to the set of transmit chains for downlink transmission of the downlink communication to the UE.

In some examples, the redistribution matrix manager 1825 may perform an iterative algorithm to generate the redistribution matrix. In some examples, the redistribution matrix manager 1825 may normalize each row of a set of rows of the precoding matrix to generate a set of normalized rows. In some examples, the redistribution matrix manager 1825 may adjust each row of the precoding matrix based on a difference between the corresponding row of the precoding matrix and the associated normalized row to generate a set of adjusted rows. In some examples, the redistribution matrix manager 1825 may apply the set of adjusted rows to the null space matrix based on the estimated channel and a pseudo-inverse of the estimated channel to generate a new precoding matrix. In some examples, the redistribution matrix manager 1825 may evaluate a vector norm for each row of the new precoding matrix to determine if a variance of the vector norms is within a threshold variance value. In some examples, the redistribution matrix manager 1825 may repeat, based on the variance of the vector norms being greater than the threshold variance value, the normalizing, adjusting, applying, and evaluating.

In some cases, the null space matrix provides a null space within the estimated channel in which channel power at multiple antennas can be redistributed for the precoding matrix, which can be exploited to reshape transmission power across multiple transmission antennas through a modified precoding matrix.

The configuration manager 1830 may configure the UE to perform a power redistribution procedure based on the null space matrix, where the power redistribution procedure reduces a power variance across a set of channels for the uplink communication relative to a power variance associated with the precoding matrix. In some examples, the configuration manager 1830 may transmit, via RRC signaling configuration information for a precoding matrix codebook and a null space matrix codebook. In some examples, the configuration manager 1830 may determine, based on an updated estimated channel, an updated number of UEs that transmit communications, or any combinations thereof, an update to the null space matrix. In some examples, the configuration manager 1830 may transmit an updated null space matrix indication to the UE.

In some cases, the precoding matrix indication is mapped to a first codebook entry associated with the precoding matrix, and null space matrix indication is mapped to a second codebook entry associated with the null space matrix. In some cases, the updated null space matrix is a sub-matrix with one or more fewer columns than the prior null space matrix based on one or more additional UEs that are to be served by the base station, or the updated null space matrix is an expanded matrix with one or more additional columns than the prior null space matrix based on one or more fewer UEs that are to be served by the base station.

Figure 19:
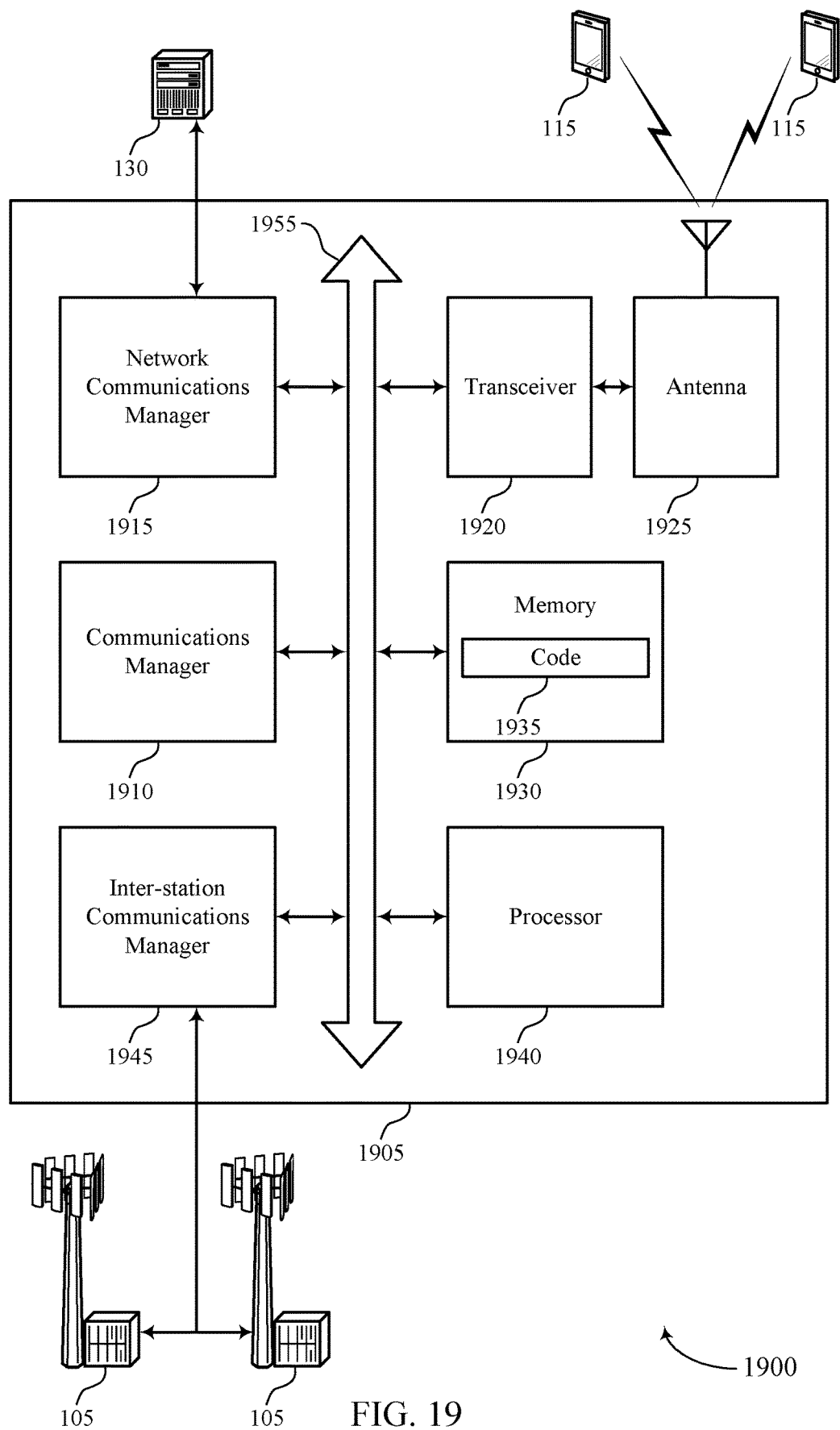
FIG. 19 shows a diagram of a system including a device that supports precoding techniques for wireless communications in accordance with aspects of the present disclosure.

FIG. 19 shows a diagram of a system 1900 including a device 1905 that supports precoding techniques for wireless communications in accordance with aspects of the present disclosure. The device 1905 may be an example of or include the components of device 1605, device 1705, or a base station 105 as described herein. The device 1905 may include components for bi-directional voice and data communications including components for transmitting and receiving communications, including a communications manager 1910, a network communications manager 1915, a transceiver 1920, an antenna 1925, memory 1930, a processor 1940, and an inter-station communications manager 1945. These components may be in electronic communication via one or more buses (e.g., bus 1955).

The communications manager 1910 may determine, based on an estimated channel between the base station and a UE, a precoding matrix for communications with the UE and a null space matrix that represents a null space of the estimated channel, transmit, to the UE, an uplink grant that includes a precoding matrix indication that identifies the precoding matrix and a null space matrix indication that identifies the null space matrix, and receive an uplink communication from the UE responsive to the uplink grant.

The network communications manager 1915 may manage communications with the core network (e.g., via one or more wired backhaul links). For example, the network communications manager 1915 may manage the transfer of data communications for client devices, such as one or more UEs 115.

The transceiver 1920 may communicate bi-directionally, via one or more antennas, wired, or wireless links as described above. For example, the transceiver 1920 may represent a wireless transceiver and may communicate bi-directionally with another wireless transceiver. The transceiver 1920 may also include a modem to modulate the packets and provide the modulated packets to the antennas for transmission, and to demodulate packets received from the antennas.

In some cases, the wireless device may include a single antenna 1925. However, in some cases the device may have more than one antenna 1925, which may be capable of concurrently transmitting or receiving multiple wireless transmissions.

The memory 1930 may include RAM, ROM, or a combination thereof. The memory 1930 may store computer-readable code 1935 including instructions that, when executed by a processor (e.g., the processor 1940) cause the device to perform various functions described herein. In some cases, the memory 1930 may contain, among other things, a BIOS which may control basic hardware or software operation such as the interaction with peripheral components or devices.

The processor 1940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1940 may be configured to operate a memory array using a memory controller. In some cases, a memory controller may be integrated into processor 1940. The processor 1940 may be configured to execute computer-readable instructions stored in a memory (e.g., the memory 1930) to cause the device 1905 to perform various functions (e.g., functions or tasks supporting precoding techniques for wireless communications).

The inter-station communications manager 1945 may manage communications with other base station 105, and may include a controller or scheduler for controlling communications with UEs 115 in cooperation with other base stations 105. For example, the inter-station communications manager 1945 may coordinate scheduling for transmissions to UEs 115 for various interference mitigation techniques such as beamforming or joint transmission. In some examples, the inter-station communications manager 1945 may provide an X2 interface within an LTE/LTE-A wireless communication network technology to provide communication between base stations 105.

The code 1935 may include instructions to implement aspects of the present disclosure, including instructions to support wireless communications. The code 1935 may be stored in a non-transitory computer-readable medium such as system memory or other type of memory. In some cases, the code 1935 may not be directly executable by the processor 1940 but may cause a computer (e.g., when compiled and executed) to perform functions described herein.

Figure 20:
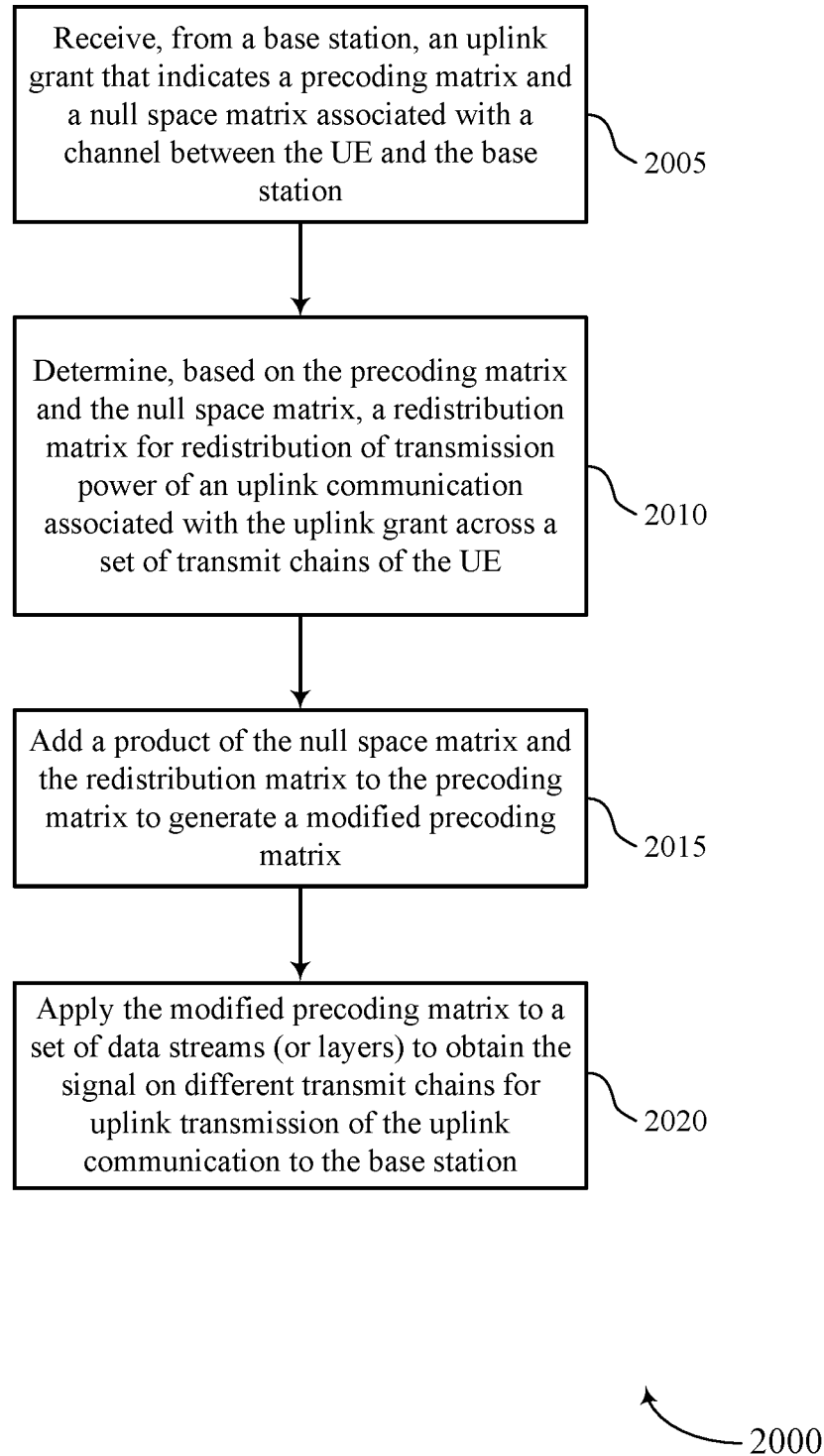
FIGS. 20 through 27 show flowcharts illustrating methods that support precoding techniques for wireless communications in accordance with aspects of the present disclosure.

FIG. 20 shows a flowchart illustrating a method 2000 that supports precoding techniques for wireless communications in accordance with aspects of the present disclosure. The operations of method 2000 may be implemented by a UE 115 or its components as described herein. For example, the operations of method 2000 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 2005, the UE may receive, from a base station, an uplink grant that indicates a precoding matrix and a null space matrix associated with a channel between the UE and the base station. The operations of 2005 may be performed according to the methods described herein. In some examples, aspects of the operations of 2005 may be performed by a resource manager as described with reference to FIGS. 7 through 10.

At 2010, the UE may determine, based on the precoding matrix and the null space matrix, a redistribution matrix for redistribution of transmission power of an uplink communication associated with the uplink grant across a set of transmit chains of the UE. The operations of 2010 may be performed according to the methods described herein. In some examples, aspects of the operations of 2010 may be performed by a redistribution matrix manager as described with reference to FIGS. 7 through 10.

At 2015, the UE may add a product of the null space matrix and the redistribution matrix to the precoding matrix to generate a modified precoding matrix. The operations of 2015 may be performed according to the methods described herein. In some examples, aspects of the operations of 2015 may be performed by a precoding matrix manager as described with reference to FIGS. 7 through 10.

At 2020, the UE may apply the modified precoding matrix to a set of data streams (or layers) to obtain the signal on different transmission chains for uplink transmission of the uplink communication to the base station. The operations of 2020 may be performed according to the methods described herein. In some examples, aspects of the operations of 2020 may be performed by an uplink transmission manager as described with reference to FIGS. 7 through 10.

Figure 21:
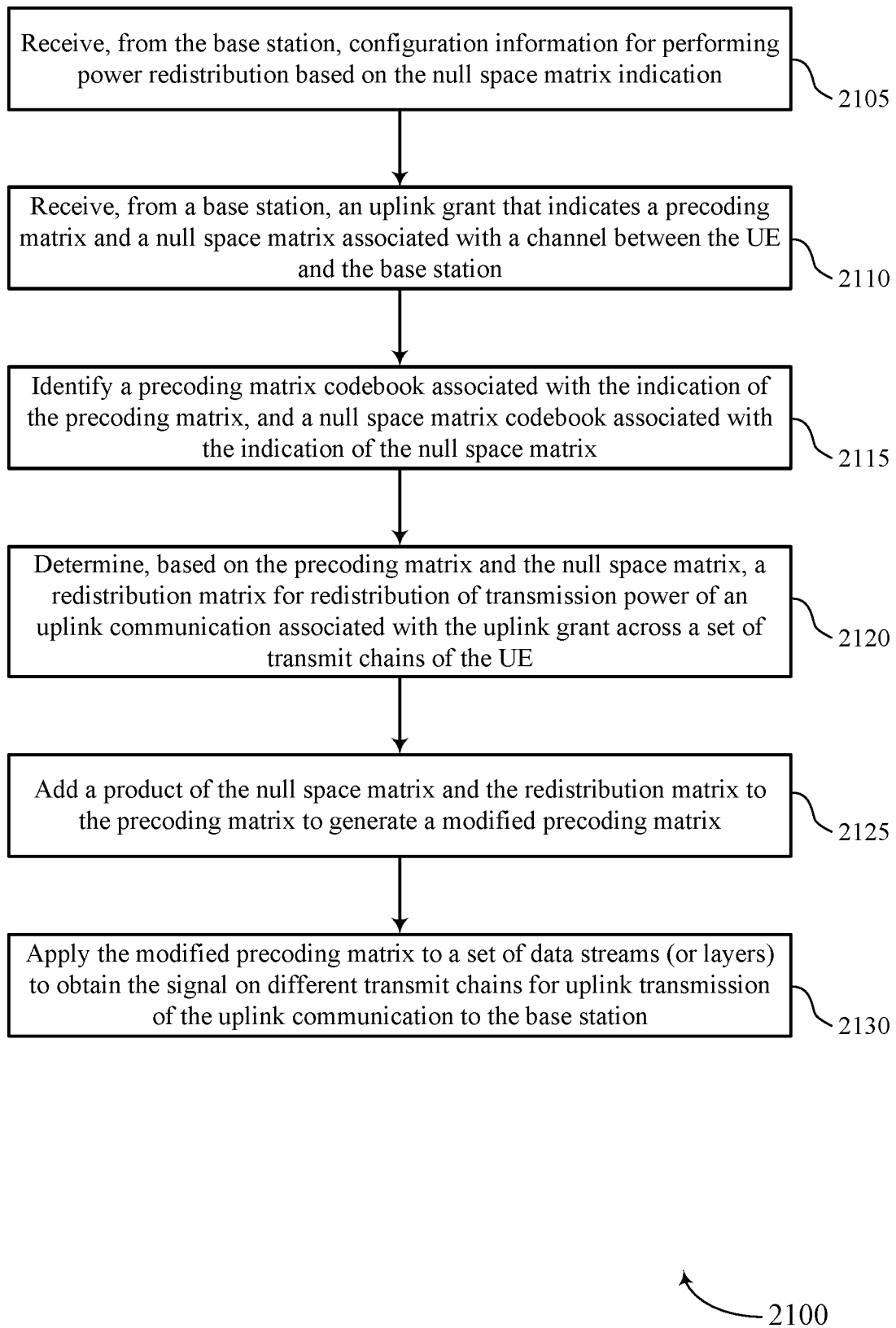

FIG. 21 shows a flowchart illustrating a method 2100 that supports precoding techniques for wireless communications in accordance with aspects of the present disclosure. The operations of method 2100 may be implemented by a UE 115 or its components as described herein. For example, the operations of method 2100 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 2105, the UE may receive, from the base station, configuration information for performing power redistribution based on the null space matrix indication. The operations of 2105 may be performed according to the methods described herein. In some examples, aspects of the operations of 2105 may be performed by a configuration manager as described with reference to FIGS. 7 through 10. In some cases, the configuration information is received in RRC signaling that configures the precoding matrix codebook and the null space matrix codebook.

At 2110, the UE may receive, from a base station, an uplink grant that indicates a precoding matrix and a null space matrix associated with a channel between the UE and the base station. The operations of 2110 may be performed according to the methods described herein. In some examples, aspects of the operations of 2110 may be performed by a resource manager as described with reference to FIGS. 7 through 10.

At 2115, the UE may identify a precoding matrix codebook associated with the indication of the precoding matrix, and a null space matrix codebook associated with the indication of the null space matrix. The operations of 2115 may be performed according to the methods described herein. In some examples, aspects of the operations of 2115 may be performed by a precoding matrix manager as described with reference to FIGS. 7 through 10.

At 2120, the UE may determine, based on the precoding matrix and the null space matrix, a redistribution matrix for redistribution of transmission power of an uplink communication associated with the uplink grant across a set of transmit chains of the UE. The operations of 2120 may be performed according to the methods described herein. In some examples, aspects of the operations of 2120 may be performed by a redistribution matrix manager as described with reference to FIGS. 7 through 10.

At 2125, the UE may add a product of the null space matrix and the redistribution matrix to the precoding matrix to generate a modified precoding matrix. The operations of 2125 may be performed according to the methods described herein. In some examples, aspects of the operations of 2125 may be performed by a precoding matrix manager as described with reference to FIGS. 7 through 10.

At 2130, the UE may apply the modified precoding matrix to a set of data streams (or layers) to obtain the signal on different transmission chains for uplink transmission of the uplink communication to the base station. The operations of 2130 may be performed according to the methods described herein. In some examples, aspects of the operations of 2130 may be performed by an uplink transmission manager as described with reference to FIGS. 7 through 10.

Figure 22:
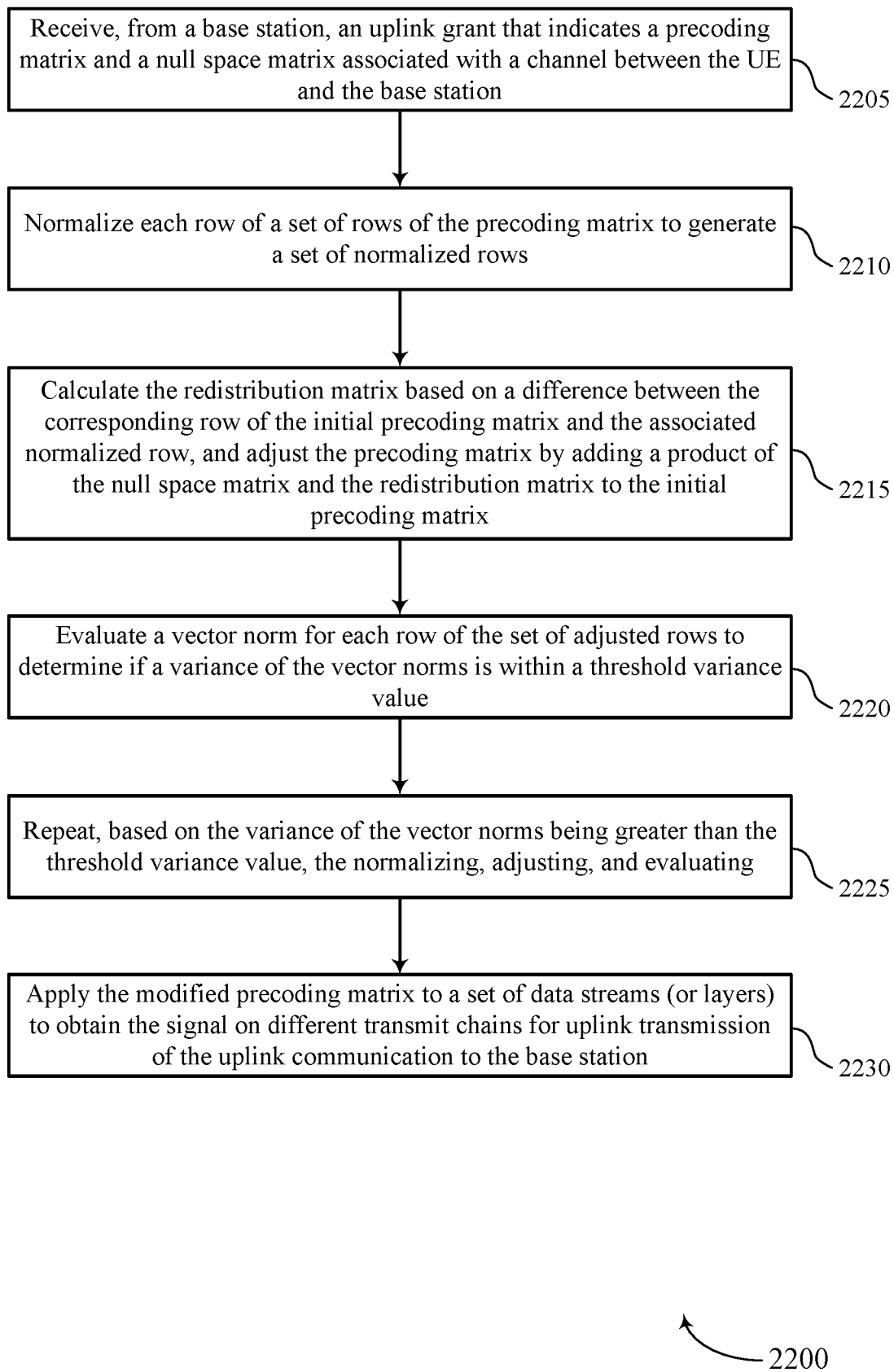

FIG. 22 shows a flowchart illustrating a method 2200 that supports precoding techniques for wireless communications in accordance with aspects of the present disclosure. The operations of method 2200 may be implemented by a UE 115 or its components as described herein. For example, the operations of method 2200 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 2205, the UE may receive, from a base station, an uplink grant that indicates a precoding matrix and a null space matrix associated with a channel between the UE and the base station. The operations of 2205 may be performed according to the methods described herein. In some examples, aspects of the operations of 2205 may be performed by a resource manager as described with reference to FIGS. 7 through 10.

At 2210, the UE may normalize each row of a set of rows of the precoding matrix to generate a set of normalized rows. The operations of 2210 may be performed according to the methods described herein. In some examples, aspects of the operations of 2210 may be performed by a redistribution matrix manager as described with reference to FIGS. 7 through 10.

At 2215, the UE may calculate the redistribution matrix based on a difference between the corresponding row of the initial precoding matrix and the associated normalized row, and adjust the precoding matrix by adding a product of the null space matrix and the redistribution matrix to the initial precoding matrix. The operations of 2215 may be performed according to the methods described herein. In some examples, aspects of the operations of 2215 may be performed by a redistribution matrix manager as described with reference to FIGS. 7 through 10.

At 2220, the UE may evaluate a vector norm for each row of the set of adjusted rows to determine if a variance of the vector norms is within a threshold variance value. The operations of 2220 may be performed according to the methods described herein. In some examples, aspects of the operations of 2220 may be performed by a redistribution matrix manager as described with reference to FIGS. 7 through 10.

At 2225, the UE may repeat, based on the variance of the vector norms being greater than the threshold variance value, the normalizing, adjusting, and evaluating. The operations of 2225 may be performed according to the methods described herein. In some examples, aspects of the operations of 2225 may be performed by a redistribution matrix manager as described with reference to FIGS. 7 through 10.

At 2230, the UE may apply the modified precoding matrix to a set of data streams (or layers) to obtain the signal on different transmission chains for uplink transmission of the uplink communication to the base station. The operations of 2230 may be performed according to the methods described herein. In some examples, aspects of the operations of 2230 may be performed by an uplink transmission manager as described with reference to FIGS. 7 through 10.

Figure 23:
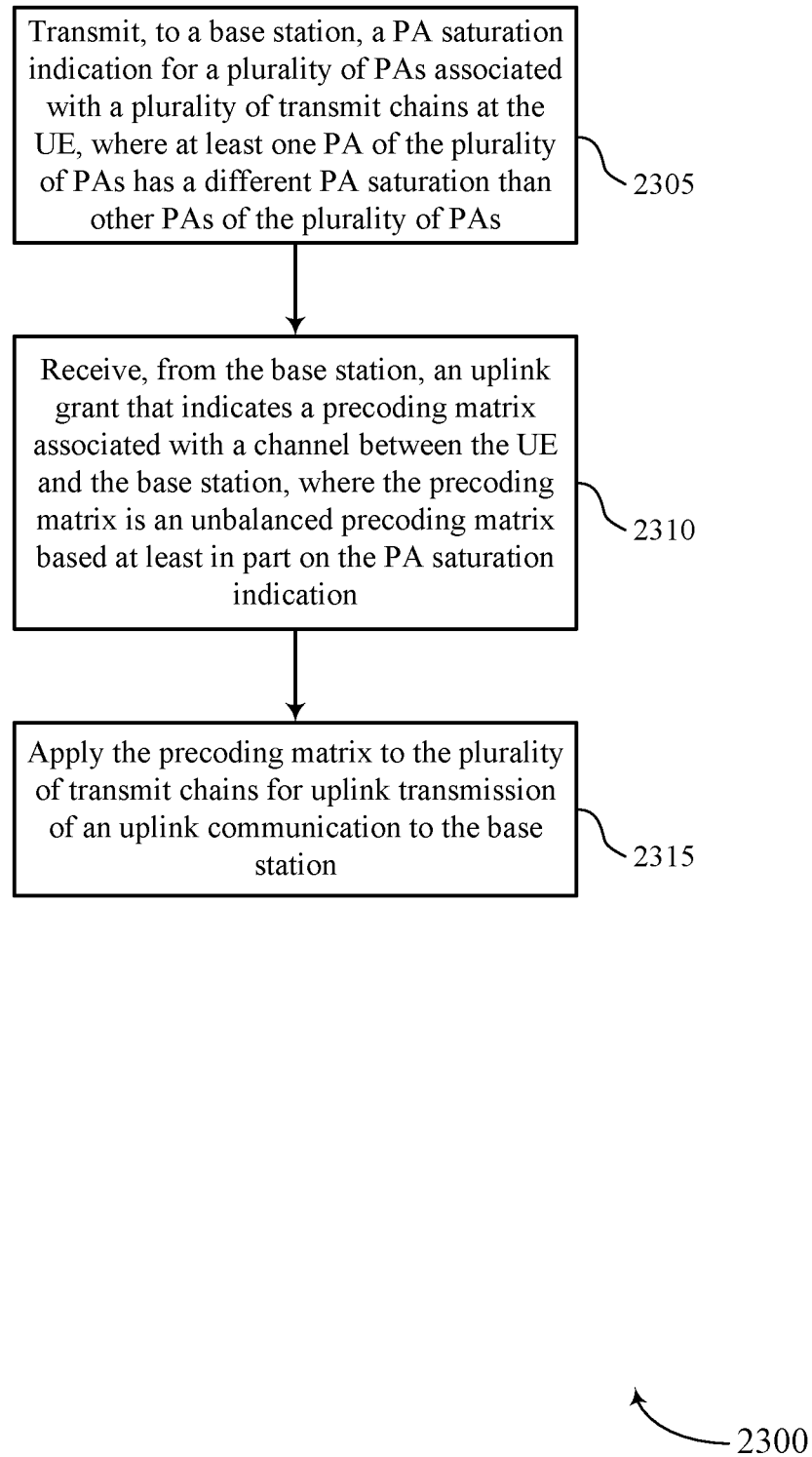

FIG. 23 shows a flowchart illustrating a method 2300 that supports precoding techniques for wireless communications in accordance with aspects of the present disclosure. The operations of method 2300 may be implemented by a UE 115 or its components as described herein. For example, the operations of method 2300 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 2305, the UE may transmit, to a base station, a PA saturation indication for a plurality of PAs associated with a plurality of transmit chains at the UE, where at least one PA of the plurality of PAs has a different PA saturation than other PAs of the plurality of PAs. The operations of 2305 may be performed according to the methods described herein. In some examples, aspects of the operations of 2305 may be performed by a resource manager as described with reference to FIGS. 7 through 10.

At 2310, the UE may receive, from the base station, an uplink grant that indicates a precoding matrix associated with a channel between the UE and the base station, where the precoding matrix is an unbalanced precoding matrix based at least in part on the PA saturation indication. The operations of 2310 may be performed according to the methods described herein. In some examples, aspects of the operations of 2310 may be performed by a precoding matrix manager as described with reference to FIGS. 7 through 10.

At 2315, the UE may apply the precoding matrix to the plurality of transmit chains for uplink transmission of an uplink communication to the base station. The operations of 2315 may be performed according to the methods described herein. In some examples, aspects of the operations of 2315 may be performed by an uplink transmission manager as described with reference to FIGS. 7 through 10.

Figure 24:
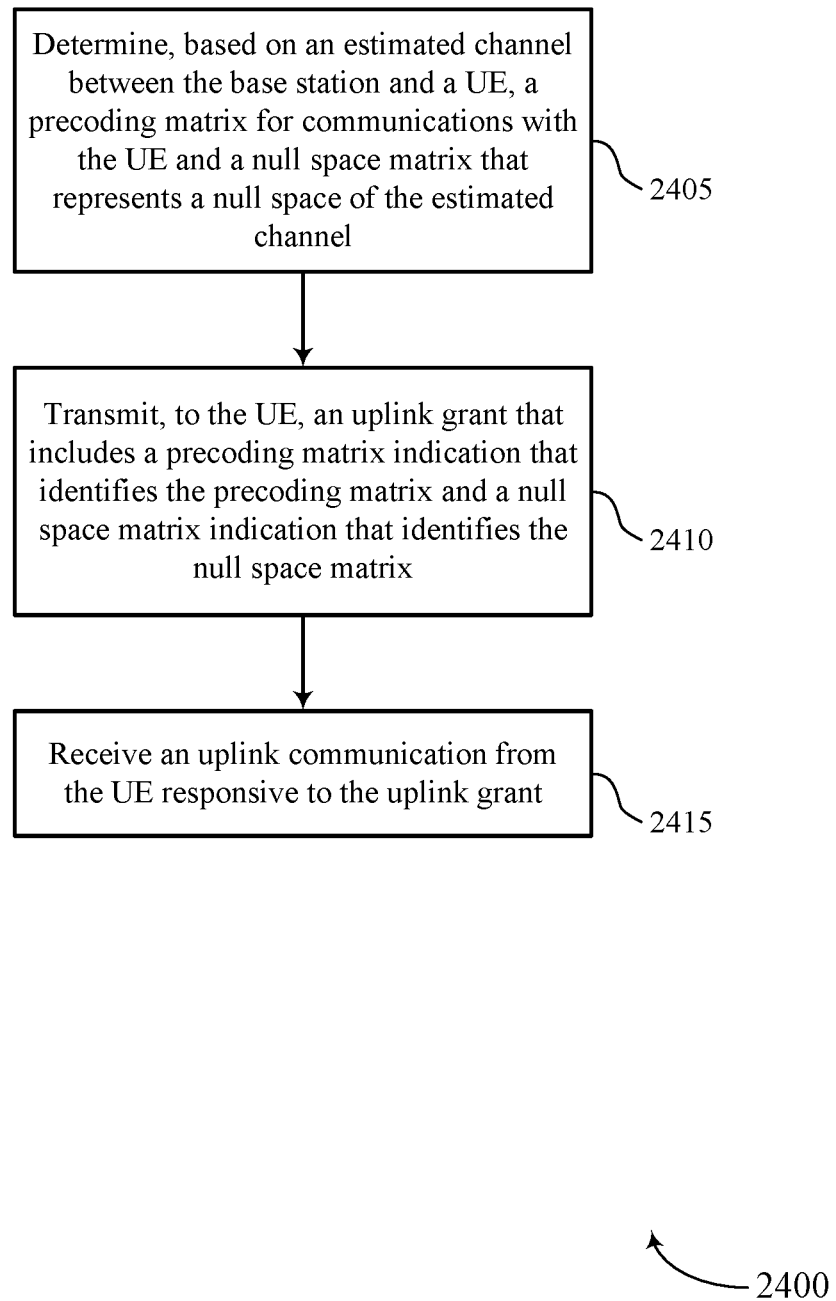

FIG. 24 shows a flowchart illustrating a method 2400 that supports precoding techniques for wireless communications in accordance with aspects of the present disclosure. The operations of method 2400 may be implemented by a base station 105 or its components as described herein. For example, the operations of method 2400 may be performed by a communications manager as described with reference to FIGS. 16 through 19. In some examples, a base station may execute a set of instructions to control the functional elements of the base station to perform the functions described below. Additionally or alternatively, a base station may perform aspects of the functions described below using special-purpose hardware.

At 2405, the base station may determine, based on an estimated channel between the base station and a UE, a precoding matrix for communications with the UE and a null space matrix that represents a null space of the estimated channel. The operations of 2405 may be performed according to the methods described herein. In some examples, aspects of the operations of 2405 may be performed by a precoding matrix manager as described with reference to FIGS. 16 through 19.

At 2410, the base station may transmit, to the UE, an uplink grant that includes a precoding matrix indication that identifies the precoding matrix and a null space matrix indication that identifies the null space matrix. The operations of 2410 may be performed according to the methods described herein. In some examples, aspects of the operations of 2410 may be performed by a resource manager as described with reference to FIGS. 16 through 19.

At 2415, the base station may receive an uplink communication from the UE responsive to the uplink grant. The operations of 2415 may be performed according to the methods described herein. In some examples, aspects of the operations of 2415 may be performed by an uplink transmission manager as described with reference to FIGS. 16 through 19.

Figure 25:
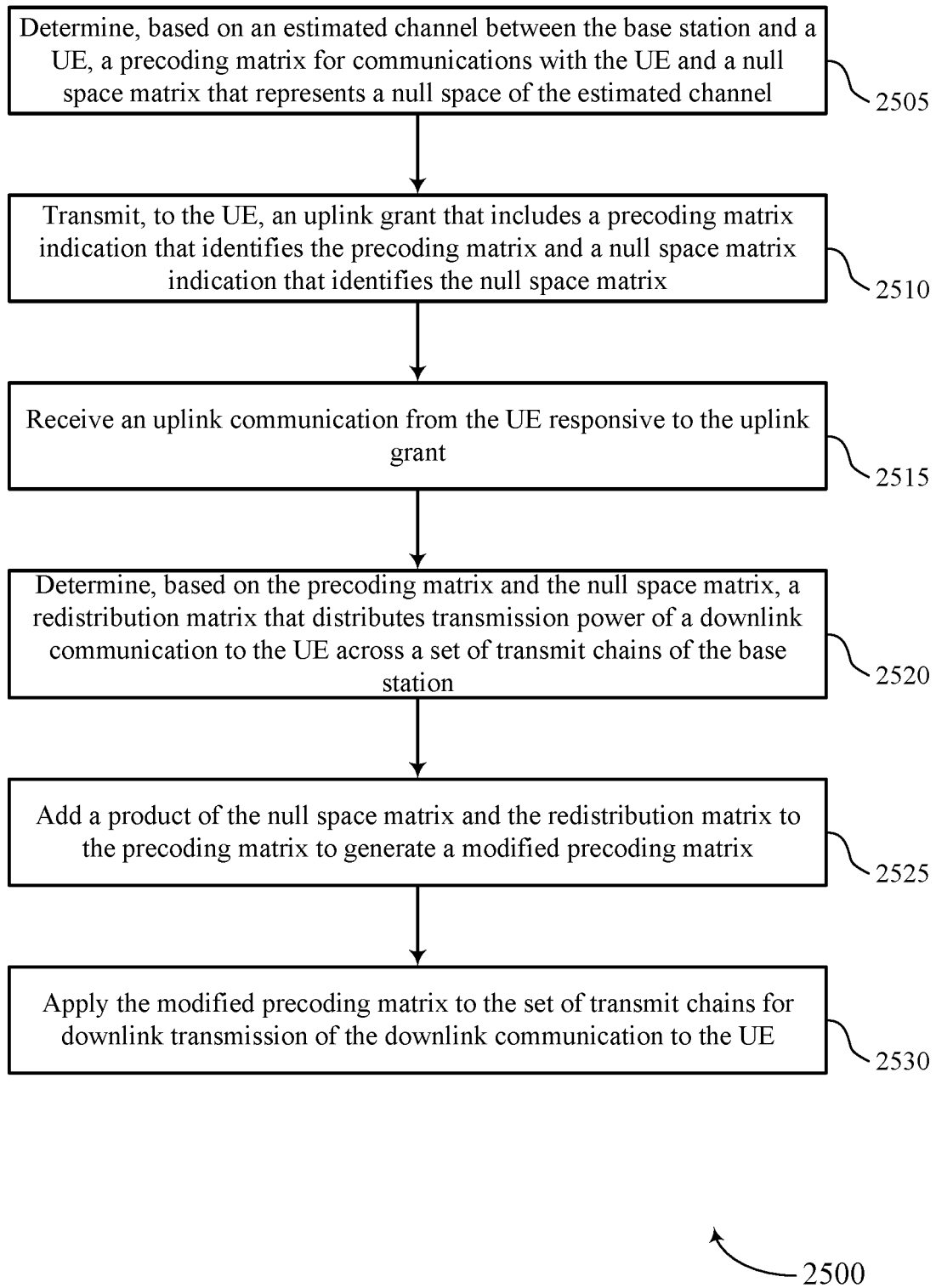

FIG. 25 shows a flowchart illustrating a method 2500 that supports precoding techniques for wireless communications in accordance with aspects of the present disclosure. The operations of method 2500 may be implemented by a base station 105 or its components as described herein. For example, the operations of method 2500 may be performed by a communications manager as described with reference to FIGS. 16 through 19. In some examples, a base station may execute a set of instructions to control the functional elements of the base station to perform the functions described below. Additionally or alternatively, a base station may perform aspects of the functions described below using special-purpose hardware.

At 2505, the base station may determine, based on an estimated channel between the base station and a UE, a precoding matrix for communications with the UE and a null space matrix that represents a null space of the estimated channel. The operations of 2505 may be performed according to the methods described herein. In some examples, aspects of the operations of 2505 may be performed by a precoding matrix manager as described with reference to FIGS. 16 through 19.

At 2510, the base station may transmit, to the UE, an uplink grant that includes a precoding matrix indication that identifies the precoding matrix and a null space matrix indication that identifies the null space matrix. The operations of 2510 may be performed according to the methods described herein. In some examples, aspects of the operations of 2510 may be performed by a resource manager as described with reference to FIGS. 16 through 19.

At 2515, the base station may receive an uplink communication from the UE responsive to the uplink grant. The operations of 2515 may be performed according to the methods described herein. In some examples, aspects of the operations of 2515 may be performed by an uplink transmission manager as described with reference to FIGS. 16 through 19.

At 2520, the base station may determine, based on the precoding matrix and the null space matrix, a redistribution matrix that distributes transmission power of a downlink communication to the UE across a set of transmit chains of the base station. The operations of 2520 may be performed according to the methods described herein. In some examples, aspects of the operations of 2520 may be performed by a redistribution matrix manager as described with reference to FIGS. 16 through 19.

At 2525, the base station may add a product of the null space matrix and the redistribution matrix to the precoding matrix to generate a modified precoding matrix. The operations of 2525 may be performed according to the methods described herein. In some examples, aspects of the operations of 2525 may be performed by a redistribution matrix manager as described with reference to FIGS. 16 through 19.

At 2530, the base station may apply the modified precoding matrix to the set of transmit chains for downlink transmission of the downlink communication to the UE. The operations of 2530 may be performed according to the methods described herein. In some examples, aspects of the operations of 2530 may be performed by a redistribution matrix manager as described with reference to FIGS. 16 through 19.

Figure 26:
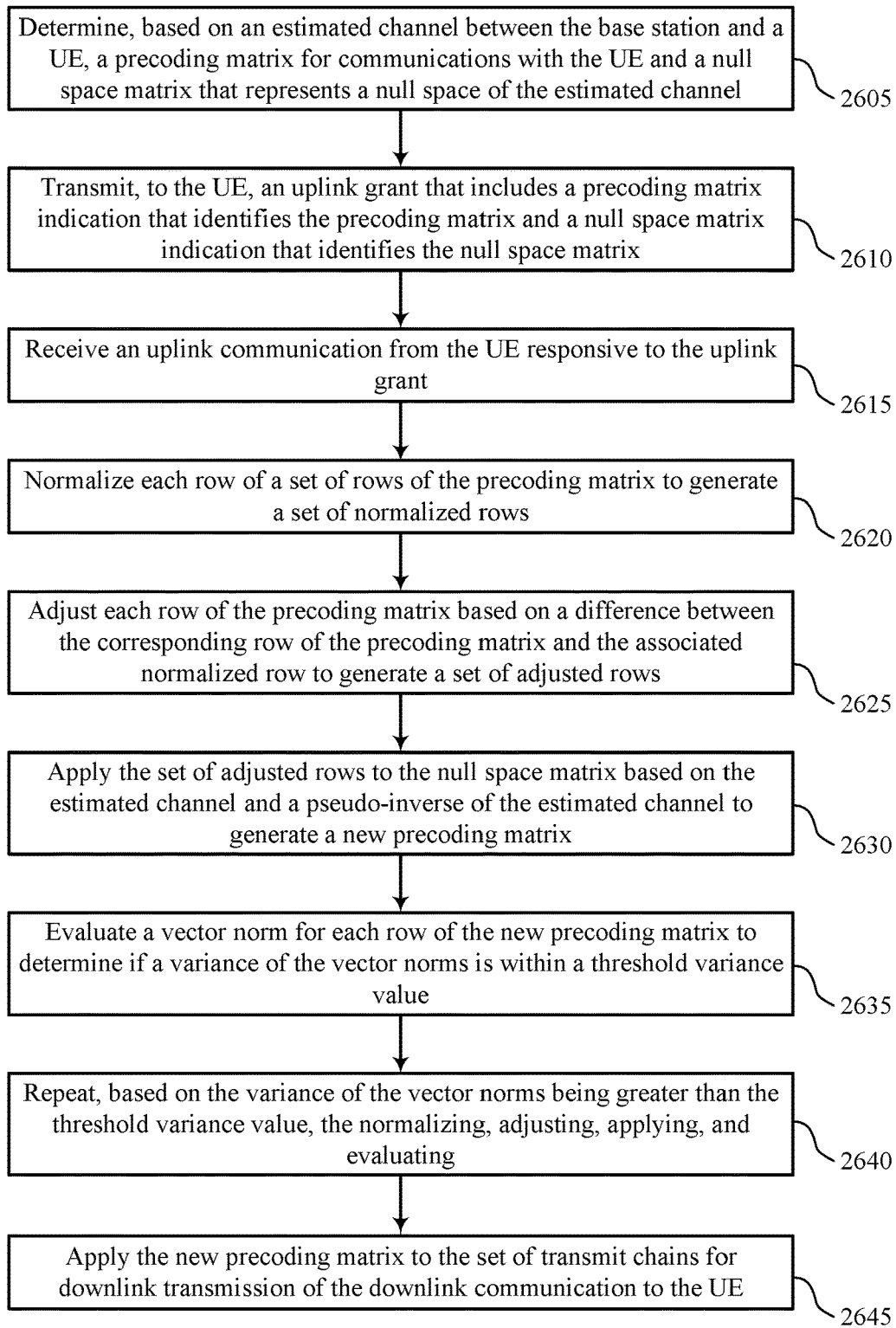

FIG. 26 shows a flowchart illustrating a method 2600 that supports precoding techniques for wireless communications in accordance with aspects of the present disclosure. The operations of method 2600 may be implemented by a base station 105 or its components as described herein. For example, the operations of method 2600 may be performed by a communications manager as described with reference to FIGS. 16 through 19. In some examples, a base station may execute a set of instructions to control the functional elements of the base station to perform the functions described below. Additionally or alternatively, a base station may perform aspects of the functions described below using special-purpose hardware.

At 2605, the base station may determine, based on an estimated channel between the base station and a UE, a precoding matrix for communications with the UE and a null space matrix that represents a null space of the estimated channel. The operations of 2605 may be performed according to the methods described herein. In some examples, aspects of the operations of 2605 may be performed by a precoding matrix manager as described with reference to FIGS. 16 through 19.

At 2610, the base station may transmit, to the UE, an uplink grant that includes a precoding matrix indication that identifies the precoding matrix and a null space matrix indication that identifies the null space matrix. The operations of 2610 may be performed according to the methods described herein. In some examples, aspects of the operations of 2610 may be performed by a resource manager as described with reference to FIGS. 16 through 19.

At 2615, the base station may receive an uplink communication from the UE responsive to the uplink grant. The operations of 2615 may be performed according to the methods described herein. In some examples, aspects of the operations of 2615 may be performed by an uplink transmission manager as described with reference to FIGS. 16 through 19.

At 2620, the base station may normalize each row of a set of rows of the precoding matrix to generate a set of normalized rows. The operations of 2620 may be performed according to the methods described herein. In some examples, aspects of the operations of 2620 may be performed by a redistribution matrix manager as described with reference to FIGS. 16 through 19.

At 2625, the base station may adjust each row of the precoding matrix based on a difference between the corresponding row of the precoding matrix and the associated normalized row to generate a set of adjusted rows. The operations of 2625 may be performed according to the methods described herein. In some examples, aspects of the operations of 2625 may be performed by a redistribution matrix manager as described with reference to FIGS. 16 through 19.

At 2630, the base station may apply the set of adjusted rows to the null space matrix based on the estimated channel and a pseudo-inverse of the estimated channel to generate a new precoding matrix. The operations of 2630 may be performed according to the methods described herein. In some examples, aspects of the operations of 2630 may be performed by a redistribution matrix manager as described with reference to FIGS. 16 through 19.

At 2635, the base station may evaluate a vector norm for each row of the new precoding matrix to determine if a variance of the vector norms is within a threshold variance value. The operations of 2635 may be performed according to the methods described herein. In some examples, aspects of the operations of 2635 may be performed by a redistribution matrix manager as described with reference to FIGS. 16 through 19.

At 2640, the base station may repeat, based on the variance of the vector norms being greater than the threshold variance value, the normalizing, adjusting, applying, and evaluating. The operations of 2640 may be performed according to the methods described herein. In some examples, aspects of the operations of 2640 may be performed by a redistribution matrix manager as described with reference to FIGS. 16 through 19.

At 2645, the base station may apply the new precoding matrix to the set of transmit chains for downlink transmission of the downlink communication to the UE. The operations of 2645 may be performed according to the methods described herein. In some examples, aspects of the operations of 2645 may be performed by a redistribution matrix manager as described with reference to FIGS. 16 through 19.

Figure 27:
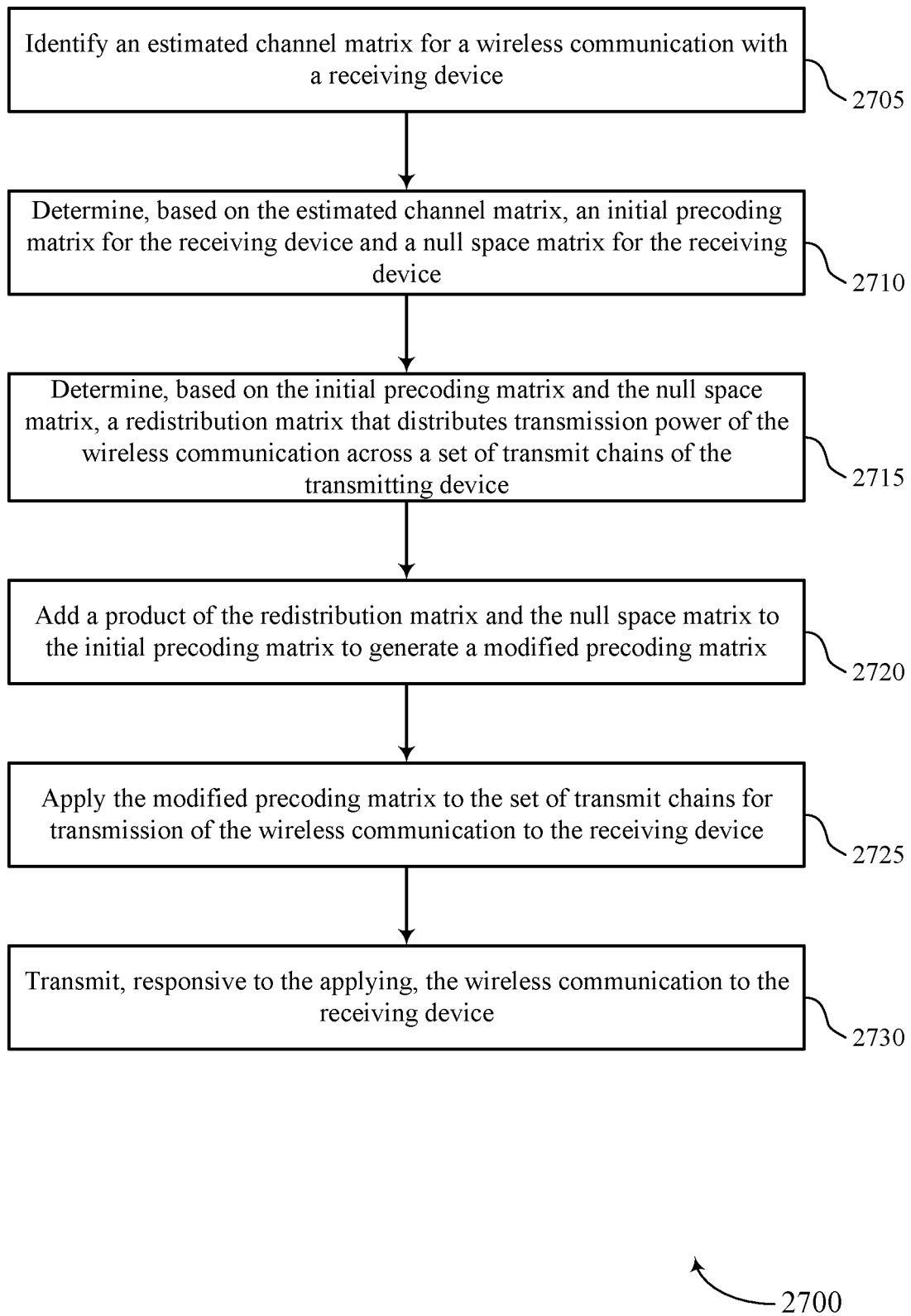

FIG. 27 shows a flowchart illustrating a method 2700 that supports precoding techniques for wireless communications in accordance with aspects of the present disclosure. The operations of method 2700 may be implemented by a UE 115 or base station 105 or its components as described herein. For example, the operations of method 2700 may be performed by a communications manager as described with reference to FIGS. 11 through 15. In some examples, a UE or base station may execute a set of instructions to control the functional elements of the UE or base station to perform the functions described below. Additionally or alternatively, a UE or base station may perform aspects of the functions described below using special-purpose hardware.

At 2705, the UE or base station may identify an estimated channel matrix for a wireless communication with a receiving device. The operations of 2705 may be performed according to the methods described herein. In some examples, aspects of the operations of 2705 may be performed by a channel estimation manager as described with reference to FIGS. 11 through 15.

At 2710, the UE or base station may determine, based on the estimated channel matrix, an initial precoding matrix for the receiving device and a null space matrix for the receiving device. The operations of 2710 may be performed according to the methods described herein. In some examples, aspects of the operations of 2710 may be performed by a precoding matrix manager as described with reference to FIGS. 11 through 15.

At 2715, the UE or base station may determine, based on the initial precoding matrix and the null space matrix, a redistribution matrix that distributes transmission power of the wireless communication across a set of transmit chains of the transmitting device. The operations of 2715 may be performed according to the methods described herein. In some examples, aspects of the operations of 2715 may be performed by a redistribution matrix manager as described with reference to FIGS. 11 through 15.

At 2720, the UE or base station may add a product of the redistribution matrix and the null space matrix to the initial precoding matrix to generate a modified precoding matrix. The operations of 2720 may be performed according to the methods described herein. In some examples, aspects of the operations of 2720 may be performed by a redistribution matrix manager as described with reference to FIGS. 11 through 15.

At 2725, the UE or base station may apply the modified precoding matrix to the set of transmit chains for transmission of the wireless communication to the receiving device. The operations of 2725 may be performed according to the methods described herein. In some examples, aspects of the operations of 2725 may be performed by a redistribution matrix manager as described with reference to FIGS. 11 through 15.

At 2730, the UE or base station may transmit, responsive to the applying, the wireless communication to the receiving device. The operations of 2730 may be performed according to the methods described herein. In some examples, aspects of the operations of 2730 may be performed by an uplink transmission manager as described with reference to FIGS. 11 through 15.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communications at a UE, comprising: receiving, from a base station, an uplink grant that indicates a precoding matrix and a null space matrix associated with a channel between the UE and the base station; determining, based at least in part on the precoding matrix and the null space matrix, a redistribution matrix for redistribution of transmission power of an uplink communication associated with the uplink grant across a plurality of transmit chains of the UE; adding a product of the null space matrix and the redistribution matrix to the precoding matrix to generate a modified precoding matrix; and applying the modified precoding matrix to the plurality of transmit chains for uplink transmission of the uplink communication to the base station.

Aspect 2: The method of aspect 1, wherein the redistribution matrix provides reduced power variance across the plurality of transmit chains relative to a power variance based only on the precoding matrix.

Aspect 3: The method of any of aspects 1 through 2, further comprising: identifying a precoding matrix codebook associated with the indication of the precoding matrix, and a null space matrix codebook associated with the indication of the null space matrix.

Aspect 4: The method of aspect 3, further comprising: receiving, from the base station, configuration information for performing power redistribution based on the null space matrix indication.

Aspect 5: The method of aspect 4, wherein the configuration information is received in RRC signaling that configures the precoding matrix codebook and the null space matrix codebook.

Aspect 6: The method of any of aspects 1 through 5, wherein the determining further comprises: performing an iterative algorithm to generate the redistribution matrix.

Aspect 7: The method of aspect 6, wherein the performing the iterative algorithm comprises: normalizing each row of a plurality of rows of the precoding matrix to generate a plurality of normalized rows; adjusting each row of the precoding matrix based at least in part on a difference between the corresponding row of the precoding matrix and the associated normalized row to generate a plurality of adjusted rows; evaluating a vector norm for each row of the plurality of adjusted row to determine if a variance of the vector norms is within a threshold variance value; and repeating, based at least in part on the variance of the vector norms being greater than the threshold variance value, the normalizing, adjusting, and evaluating.

Aspect 8: The method of any of aspects 1 through 7, wherein the null space matrix lies within a null space of an effective channel matrix associated with an estimated effective channel between the base station and the UE.

Aspect 9: The method of any of aspects 1 through 8, wherein the modified precoding matrix provides uplink transmissions that are indistinguishable at the base station from an unmodified precoding matrix.

Aspect 10: The method of any of aspects 1 through 9, further comprising: receiving, from the base station, periodic updates to the null space matrix.

Aspect 11: A method for wireless communications at a base station, comprising: determining, based at least in part on an estimated channel between the base station and a UE, a precoding matrix for communications with the UE and a null space matrix that represents a null space of the estimated channel; transmitting, to the UE, an uplink grant that includes a precoding matrix indication that identifies the precoding matrix and a null space matrix indication that identifies the null space matrix; and receiving an uplink communication from the UE responsive to the uplink grant.

Aspect 12: The method of aspect 11, wherein the null space matrix provides a null space within the estimated channel in which channel power at multiple antennas can be redistributed for the precoding matrix, which can be exploited to reshape transmission power across multiple transmission antennas through a modified precoding matrix.

Aspect 13: The method of any of aspects 11 through 12, wherein the precoding matrix indication is mapped to a first codebook entry associated with the precoding matrix, and null space matrix indication is mapped to a second codebook entry associated with the null space matrix.

Aspect 14: The method of aspect 13, further comprising: configuring the UE to perform a power redistribution procedure based at least in part on the null space matrix, wherein the power redistribution procedure reduces a power variance across a plurality of channels for the uplink communication relative to a power variance associated with the precoding matrix.

Aspect 15: The method of aspect 14, wherein the configuring further comprises: transmitting, via RRC signaling configuration information for a precoding matrix codebook and a null space matrix codebook.

Aspect 16: The method of any of aspects 11 through 15, further comprising: determining, based at least in part on the precoding matrix and the null space matrix, a redistribution matrix that distributes transmission power of a downlink communication to the UE across a plurality of transmit chains of the base station; adding a product of the null space matrix and the redistribution matrix to the precoding matrix to generate a modified precoding matrix; and applying the modified precoding matrix to the plurality of transmit chains for downlink transmission of the downlink communication to the UE.

Aspect 17: The method of aspect 16, wherein the determining the redistribution matrix comprises: performing an iterative algorithm to generate the redistribution matrix.

Aspect 18: The method of aspect 17, wherein the performing the iterative algorithm comprises: normalizing each row of a plurality of rows of the precoding matrix to generate a plurality of normalized rows; adjusting each row of the precoding matrix based at least in part on a difference between the corresponding row of the precoding matrix and the associated normalized row to generate a plurality of adjusted rows; applying the plurality of adjusted rows to the null space matrix based at least in part on the estimated channel and a pseudo-inverse of the estimated channel to generate a new precoding matrix; evaluating a vector norm for each row of the new precoding matrix to determine if a variance of the vector norms is within a threshold variance value; and repeating, based at least in part on the variance of the vector norms being greater than the threshold variance value, the normalizing, adjusting, applying, and evaluating.

Aspect 19: The method of any of aspects 11 through 18, further comprising: determining, based at least in part on an updated estimated channel, an updated number of UEs that transmit communications, or any combinations thereof, an update to the null space matrix; and transmitting an updated null space matrix indication to the UE.

Aspect 20: The method of aspect 19, wherein the updated null space matrix is a sub-matrix with one or more fewer columns than the prior null space matrix based on one or more additional UEs that are to be served by the base station, or the updated null space matrix is an expanded matrix with one or more additional columns than the prior null space matrix based on one or more fewer UEs that are to be served by the base station.

Aspect 21: A method for wireless communications at a UE, comprising: transmitting, to a base station, a power amplifier saturation indication for a plurality of power amplifiers associated with a plurality of transmit chains at the UE, wherein at least one power amplifier of the plurality of power amplifiers has a different power amplifier saturation than one or more other power amplifiers of the plurality of power amplifiers; receiving, from the base station, an uplink grant that includes an indication of a precoding matrix associated with a channel between the UE and the base station, wherein the precoding matrix is an unbalanced precoding matrix based at least in part on the power amplifier saturation indication; and applying the precoding matrix to the plurality of transmit chains for uplink transmission of an uplink communication to the base station.

Aspect 22: The method of aspect 21, further comprising: receiving, from the base station, configuration information for transmitting the power amplifier saturation indication to the base station.

Aspect 23: The method of aspect 22, wherein the configuration information is received in RRC signaling.

Aspect 24: The method of any of aspects 21 through 23, further comprising: performing an iterative algorithm to generate a redistribution matrix.

Aspect 25: The method of aspect 24, wherein the performing the iterative algorithm comprises: normalizing each row of a plurality of rows of the precoding matrix to generate a plurality of normalized rows; adjusting each row of the precoding matrix based at least in part on a difference between the corresponding row of the precoding matrix and the associated normalized row to generate a plurality of adjusted rows; evaluating a vector norm for each row of the plurality of adjusted row to determine if a variance of the vector norms is within a threshold variance value; and repeating, based at least in part on the variance of the vector norms being greater than the threshold variance value, the normalizing, adjusting, and evaluating.

Aspect 26: A method for wireless communications at a transmitting device, comprising: identifying an estimated channel matrix for a wireless communication with a receiving device; determining, based at least in part on the estimated channel matrix, an initial precoding matrix for the receiving device and a null space matrix for the receiving device; determining, based at least in part on the initial precoding matrix and the null space matrix, a redistribution matrix that distributes transmission power of the wireless communication across a plurality of transmit chains of the transmitting device; adding a product of the redistribution matrix and the null space matrix to the initial precoding matrix to generate a modified precoding matrix; applying the modified precoding matrix to the plurality of transmit chains for transmission of the wireless communication to the receiving device; and transmitting, responsive to the applying, the wireless communication to the receiving device.

Aspect 27: The method of aspect 26, wherein the product of the redistribution matrix and the null space matrix is within a null space of the channel estimation matrix.

Aspect 28: The method of any of aspects 26 through 27, wherein the redistribution matrix provides reduced power variance across the plurality of transmit chains relative to a power variance based only on the initial precoding matrix.

Aspect 29: The method of any of aspects 26 through 28, wherein the redistribution matrix is selected to provide a variability in norms across a plurality of rows of the modified precoding matrix that is less than a variability threshold.

Aspect 30: The method of any of aspects 26 through 29, wherein the redistribution matrix is selected to provide a maximum norm across a plurality of rows of the modified precoding matrix that is less than a maximum norm threshold.

Aspect 31: The method of any of aspects 26 through 30, wherein the redistribution matrix is determined based at least in part on a convex optimization problem that provides, relative to the initial precoding matrix, a reduced maximum energy value for each row of the modified precoding matrix, or a reduced amount of variance for each row of the modified precoding matrix.

Aspect 32: The method of any of aspects 26 through 31, wherein the redistribution matrix provides a data-independent modification of the initial precoding matrix.

Aspect 33: The method of any of aspects 26 through 32, wherein the redistribution matrix provides a similar power amplifier backoff parameter for each of the plurality of transmit chains.

Aspect 34: The method of any of aspects 26 through 33, wherein the determining the redistribution matrix comprises: performing an iterative algorithm to generate the redistribution matrix.

Aspect 35: The method of aspect 34, wherein the performing the iterative algorithm comprises: normalizing each row of a plurality of rows of the initial precoding matrix to generate a plurality of normalized rows; adjusting each row of the initial precoding matrix based at least in part on a difference between the corresponding row of the initial precoding matrix and the associated normalized row to generate a plurality of adjusted rows; applying the plurality of adjusted rows to the null space matrix that is based at least in part on the estimated channel matrix and a pseudo-inverse of the estimated channel matrix to generate the modified precoding matrix; evaluating a vector norm for each row of the modified precoding matrix to determine if a variance of the vector norms is within a threshold variance value; and repeating, based at least in part on the variance of the vector norms being greater than the threshold variance value, the normalizing, adjusting, applying, and evaluating.

Aspect 36: An apparatus for wireless communications at a UE, comprising a processor; memory coupled with the processor; and instructions stored in the memory and executable by the processor to cause the apparatus to perform a method of any of aspects 1 through 10.

Aspect 37: An apparatus for wireless communications at a UE, comprising at least one means for performing a method of any of aspects 1 through 10.

Aspect 38: A non-transitory computer-readable medium storing code for wireless communications at a UE, the code comprising instructions executable by a processor to perform a method of any of aspects 1 through 10.

Aspect 39: An apparatus for wireless communications at a base station, comprising a processor; memory coupled with the processor; and instructions stored in the memory and executable by the processor to cause the apparatus to perform a method of any of aspects 11 through 20.

Aspect 40: An apparatus for wireless communications at a base station, comprising at least one means for performing a method of any of aspects 11 through 20.

Aspect 41: A non-transitory computer-readable medium storing code for wireless communications at a base station, the code comprising instructions executable by a processor to perform a method of any of aspects 11 through 20.

Aspect 42: An apparatus for wireless communications at a UE, comprising a processor; memory coupled with the processor; and instructions stored in the memory and executable by the processor to cause the apparatus to perform a method of any of aspects 21 through 25.

Aspect 43: An apparatus for wireless communications at a UE, comprising at least one means for performing a method of any of aspects 21 through 25.

Aspect 44: A non-transitory computer-readable medium storing code for wireless communications at a UE, the code comprising instructions executable by a processor to perform a method of any of aspects 21 through 25.

Aspect 45: An apparatus for wireless communications at a transmitting device, comprising a processor; memory coupled with the processor; and instructions stored in the memory and executable by the processor to cause the apparatus to perform a method of any of aspects 26 through 35.

Aspect 46: An apparatus for wireless communications at a transmitting device, comprising at least one means for performing a method of any of aspects 26 through 35.

Aspect 47: A non-transitory computer-readable medium storing code for wireless communications at a transmitting device, the code comprising instructions executable by a processor to perform a method of any of aspects 26 through 35.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
receiving an uplink grant that indicates a null space matrix associated with a channel between the UE and an access network entity;
determining, based at least in part on the null space matrix, a redistribution matrix for redistribution of transmission power of an uplink communication associated with the uplink grant across a plurality of transmit chains of the UE;
generating a modified precoding matrix based at least in part on one or more of the null space matrix or the redistribution matrix; and
applying the modified precoding matrix to the plurality of transmit chains for uplink transmission of the uplink communication to the access network entity.

2. The method of claim 1, wherein the uplink grant further provides an indication of the precoding matrix, and the redistribution matrix provides reduced power variance across the plurality of transmit chains relative to a power variance based only on an unmodified precoding matrix.

3. The method of claim 2, further comprising:
identifying a precoding matrix codebook associated with the indication of the unmodified precoding matrix, and a null space matrix codebook associated with the indication of the null space matrix.

4. The method of claim 3, further comprising:
receiving configuration information for performing power redistribution based on the null space matrix indication.

5. The method of claim 4, wherein the configuration information is received in radio resource control (RRC) signaling that configures the precoding matrix codebook and the null space matrix codebook.

6. The method of claim 1, wherein the determining further comprises:
performing an iterative algorithm to generate the redistribution matrix.

7. The method of claim 6, wherein the performing the iterative algorithm comprises:
normalizing each row of a plurality of rows of a precoding matrix to generate a plurality of normalized rows;
adjusting each row of the precoding matrix based at least in part on a difference between the corresponding row of the precoding matrix and the associated normalized row to generate a plurality of adjusted rows;
evaluating a vector norm for each row of the plurality of adjusted rows to determine if a variance of the vector norms is within a threshold variance value; and
repeating, based at least in part on the variance of the vector norms being greater than the threshold variance value, the normalizing, adjusting, and evaluating.

8. The method of claim 1, wherein the determining the redistribution matrix comprises:
identifying for a plurality of power amplifiers associated with the plurality of transmit chains, one or more different power amplifier saturation values; and
determining the redistribution matrix based at least in part on the null space matrix and the one or more different power amplifier saturation values.

9. A method for wireless communications at an access network entity, comprising:
determining, based at least in part on an estimated channel of a user equipment (UE), a precoding matrix for communications with the UE and a null space matrix that represents a null space of the estimated channel;
transmitting, to the UE, an uplink grant that includes a precoding matrix indication that identifies the precoding matrix and a null space matrix indication that identifies the null space matrix; and
receiving an uplink communication from the UE responsive to the uplink grant.

10. The method of claim 9, wherein the precoding matrix indication is mapped to a first codebook entry associated with the precoding matrix, and the null space matrix indication is mapped to a second codebook entry associated with the null space matrix.

11. The method of claim 10, further comprising:
configuring the UE to perform a power redistribution procedure based at least in part on the null space matrix, wherein the power redistribution procedure reduces a power variance across a plurality of channels for the uplink communication relative to a power variance associated with the precoding matrix.

12. The method of claim 9, further comprising:
determining, based at least in part on the precoding matrix and the null space matrix, a redistribution matrix that distributes transmission power of a downlink communication to the UE across a plurality of transmit chains;
generating a modified precoding matrix based at least in part on one or more of the null space matrix and the redistribution matrix; and
applying the modified precoding matrix to the plurality of transmit chains for downlink transmission of the downlink communication to the UE.

13. The method of claim 9, further comprising:
determining, based at least in part on an updated estimated channel, an updated number of UEs that transmit communications, or any combinations thereof, an update to the null space matrix; and
transmitting an updated null space matrix indication to the UE.

14. The method of claim 13, wherein the updated null space matrix is a sub-matrix with one or more fewer columns than a prior null space matrix based on one or more additional UEs that are to be served by the access network entity, or the updated null space matrix is an expanded matrix with one or more additional columns than the prior null space matrix based on one or more fewer UEs that are to be served by the access network entity.

15. An apparatus for wireless communications at a user equipment (UE), comprising:
a processor,
memory coupled with the processor; and
instructions stored in the memory and executable by the processor to cause the apparatus to:
receive an uplink grant that indicates a null space matrix associated with a channel between the UE and an access network entity;
determine, based at least in part on the null space matrix, a redistribution matrix for redistribution of transmission power of an uplink communication associated with the uplink grant across a plurality of transmit chains of the UE;
generate a modified precoding matrix based at least in part on one or more of the null space matrix or the redistribution matrix; and
apply the modified precoding matrix to the plurality of transmit chains for uplink transmission of the uplink communication to the access network entity.

16. The apparatus of claim 15, wherein the redistribution matrix provides reduced power variance across the plurality of transmit chains relative to a power variance based only on an unmodified precoding matrix.

17. The apparatus of claim 15, wherein the instructions are further executable by the processor to cause the apparatus to:
identify a precoding matrix codebook associated with an indicated precoding matrix, and a null space matrix codebook associated with the null space matrix.

18. The apparatus of claim 17, wherein the instructions are further executable by the processor to cause the apparatus to:
identify, for a plurality of power amplifiers associated with the plurality of transmit chains, one or more different power amplifier saturation values; and
determine the redistribution matrix based at least in part on the null space matrix and the one or more different power amplifier saturation values.

19. The apparatus of claim 17, wherein the instructions are further executable by the processor to cause the apparatus to:
receive configuration information for performing power redistribution based on the null space matrix indication.

20. The apparatus of claim 19, wherein the configuration information is received in radio resource control (RRC) signaling that configures the precoding matrix codebook and the null space matrix codebook.

21. The apparatus of claim 15, wherein the instructions are further executable by the processor to cause the apparatus to:
perform an iterative algorithm to generate the redistribution matrix.

22. The apparatus of claim 21, wherein the instructions are further executable by the processor to cause the apparatus to:
normalize each row of a plurality of rows of a precoding matrix to generate a plurality of normalized rows;
adjust each row of the precoding matrix based at least in part on a difference between the corresponding row of the precoding matrix and the associated normalized row to generate a plurality of adjusted rows;
evaluate a vector norm for each row of the plurality of adjusted rows to determine if a variance of the vector norms is within a threshold variance value; and
repeat, based at least in part on the variance of the vector norms being greater than the threshold variance value, the normalizing, adjusting, and evaluating.

23. The apparatus of claim 15 wherein the null space matrix lies within a null space of an effective channel matrix associated with an estimated effective channel between the access network entity and the UE.

24. The apparatus of claim 15, wherein the modified precoding matrix provides uplink transmissions that are indistinguishable from an unmodified precoding matrix.

25. The apparatus of claim 15, wherein the instructions are further executable by the processor to cause the apparatus to:
receive periodic updates to the null space matrix.

26. An apparatus for wireless communications at an access network entity, comprising:
a processor, memory coupled with the processor; and
instructions stored in the memory and executable by the processor to cause the apparatus to:
determine, based at least in part on an estimated channel of a user equipment (UE), a precoding matrix for communications with the UE and a null space matrix that represents a null space of the estimated channel;
transmit, to the UE, an uplink grant that includes a precoding matrix indication that identifies the precoding matrix and a null space matrix indication that identifies the null space matrix; and
receive an uplink communication from the UE responsive to the uplink grant.

27. The apparatus of claim 26, wherein the precoding matrix indication is mapped to a first codebook entry associated with the precoding matrix, and the null space matrix indication is mapped to a second codebook entry associated with the null space matrix.

28. The apparatus of claim 27, wherein the instructions are further executable by the processor to cause the apparatus to:
configure the UE to perform a power redistribution procedure based at least in part on the null space matrix, wherein the power redistribution procedure reduces a power variance across a plurality of channels for the uplink communication relative to a power variance associated with the precoding matrix.

29. The apparatus of claim 26, wherein the instructions are further executable by the processor to cause the apparatus to:
determine, based at least in part on the precoding matrix and the null space matrix, a redistribution matrix that distributes transmission power of a downlink communication to the UE across a plurality of transmit chains;
generate a modified precoding matrix based at least in part on one or more of the null space matrix and the redistribution matrix; and
apply the modified precoding matrix to the plurality of transmit chains for downlink transmission of the downlink communication to the UE.

30. The apparatus of claim 26, wherein the instructions are further executable by the processor to cause the apparatus to:
determine, based at least in part on an updated estimated channel, an updated number of UEs that transmit communications, or any combinations thereof, an update to the null space matrix; and
transmit an updated null space matrix indication to the UE.

* * * * *